United States Patent
Apelker et al.

(10) Patent No.: US 9,946,230 B2
(45) Date of Patent: Apr. 17, 2018

(54) AUTOMATED LOAD CONTROL SYSTEM AND METHOD

(76) Inventors: Ronen Apelker, Ceasarea (IL); Allon Apelker, Ceasarea (IL)

(*) Notice: Subject to any disclaimer, the term of this patent is extended or adjusted under 35 U.S.C. 154(b) by 910 days.

(21) Appl. No.: 13/699,628

(22) PCT Filed: May 26, 2011

(86) PCT No.: PCT/IL2011/000410
§ 371 (c)(1),
(2), (4) Date: Jan. 14, 2013

(87) PCT Pub. No.: WO2011/148378
PCT Pub. Date: Dec. 1, 2011

(65) Prior Publication Data
US 2013/0200725 A1      Aug. 8, 2013

Related U.S. Application Data

(60) Provisional application No. 61/350,094, filed on Jun. 1, 2010, provisional application No. 61/344,133, filed on May 28, 2010.

(51) Int. Cl.
| | |
|---|---|
| *G05B 11/01* | (2006.01) |
| *G05B 15/02* | (2006.01) |
| *H05B 37/02* | (2006.01) |

(52) U.S. Cl.
CPC ............ *G05B 11/01* (2013.01); *G05B 15/02* (2013.01); *H05B 37/0272* (2013.01); *G05B 2219/2642* (2013.01); *Y02B 20/48* (2013.01); *Y10T 307/766* (2015.04); *Y10T 307/773* (2015.04)

(58) Field of Classification Search
CPC ................... G05B 15/02; G05B 11/01; G05B 2219/2642; H05B 37/0272; Y10T 307/766; Y10T 307/773; Y02B 20/48
USPC ......................................................... 307/117
See application file for complete search history.

(56) References Cited

U.S. PATENT DOCUMENTS

| | | | | |
|---|---|---|---|---|
| 4,357,665 | A * | 11/1982 | Korff ................... | G01R 21/133 307/35 |
| 5,251,153 | A * | 10/1993 | Nielsen ................. | G06F 3/0489 137/551 |
| 5,621,256 | A * | 4/1997 | Crane et al. .................. | 307/125 |
| 6,067,243 | A * | 5/2000 | Suzuki ................ | H02M 7/2173 363/127 |
| 7,761,186 | B2 * | 7/2010 | Keller et al. .................. | 700/277 |

(Continued)

FOREIGN PATENT DOCUMENTS

JP          2005135640       *   5/2005

*Primary Examiner* — Hal Kaplan
*Assistant Examiner* — Toan Vu
(74) *Attorney, Agent, or Firm* — Reches Patents

(57) ABSTRACT

A system for controlling electrical loads in a house, apartment, office or any other living environment, comprising the following units: Smart load control unit (LCU), Remote control unit (RCU), Sensors unit (SU), Computer interface unit (CIU), Infrared control unit (IRU) and Keypad unit (KU). Each LCU is so devised as to replace a wall switch or other electrical load power control device and comprises means for controlling an electric power delivered to the load responsive to a user's commands. Each RCU comprises means for activating LCU units, and each SU comprises sensor means. Each unit further includes means for connecting by wireless to the other units to exchange data or commands therebetween.

33 Claims, 39 Drawing Sheets

(56) References Cited

U.S. PATENT DOCUMENTS

| | | | |
|---|---|---|---|
| 8,091,795 B1* | 1/2012 | McLellan et al. | 236/51 |
| 2003/0074088 A1* | 4/2003 | Gonzales et al. | 700/19 |
| 2003/0187524 A1* | 10/2003 | Hashimoto | G08C 17/02 700/83 |
| 2005/0138071 A1* | 6/2005 | Goodman | G06F 1/14 |
| 2006/0006701 A1* | 1/2006 | Wells | B60J 7/0573 296/223 |
| 2006/0161270 A1* | 7/2006 | Luskin et al. | 700/22 |
| 2006/0259201 A1* | 11/2006 | Brown | G06Q 10/06 700/291 |
| 2007/0174642 A1* | 7/2007 | Cornwell | G06F 1/26 713/300 |
| 2007/0247134 A1* | 10/2007 | Ryan | H02J 13/001 323/318 |
| 2007/0273307 A1* | 11/2007 | Westrick | H05B 37/0218 315/312 |
| 2007/0293208 A1 | 12/2007 | Loh | |
| 2008/0183307 A1* | 7/2008 | Clayton | G05B 19/042 700/8 |
| 2008/0313566 A1* | 12/2008 | Barnum | G06F 3/0482 715/825 |
| 2008/0319556 A1* | 12/2008 | Perry | H05B 37/0227 700/14 |
| 2009/0256483 A1* | 10/2009 | Gehman | H05B 37/0272 315/129 |
| 2009/0278479 A1 | 11/2009 | Platner | |
| 2010/0140070 A1* | 6/2010 | Simard | G04C 23/347 200/33 R |
| 2010/0244706 A1* | 9/2010 | Steiner | G01J 1/02 315/149 |
| 2010/0289643 A1* | 11/2010 | Trundle et al. | 340/545.1 |
| 2011/0029139 A1* | 2/2011 | Altonen | E06B 9/68 700/278 |
| 2011/0057517 A1* | 3/2011 | Zhang | H02J 3/01 307/105 |
| 2011/0095608 A1* | 4/2011 | Jonsson | G01D 4/002 307/39 |
| 2013/0038218 A1* | 2/2013 | Xu | G05B 15/02 315/151 |

\* cited by examiner

AUTOMATED LOAD CONTROL SYSTEM AND METHOD

The present invention relates to a system for controlling and monitoring electrical loads in a house, apartment, office or any other living environment, by replacing the wall switches of the lights shutters or any other load.

BACKGROUND ART

At present, manually operated wall switches are used for controlling lights and shutters in a house or apartment. Such an arrangement is tedious and does not provide any level of automation of comfort—the user always has to activate each electrical light and equipment. Lights may be forgotten On, or the user has to find his way in darkness.

There is no efficient use of ambient light when available.

Thus, the present manual system is uncomfortable to users and wastes energy.

There is a prior art solution of home automation system, however it is very expensive: A central control and power switching unit is required, to control and switch all the loads in the house. Some systems require extensive changes in the house wiring, to connect the central unit to all the loads in the house.

If changes are made in the house, such as additions or rooms divisions, expensive changes are required in the central unit and the wiring to it.

some other systems use wireless communication, which does not need Extensive house wiring, but needs some kind of central control unit that must be in range with the wireless switches.

Due to wireless range limitation and reliability, the expensive wired systems are still in the lead.

Most home automation systems are mostly manually operated by the user, and are not native automatic systems.

There is not known prior art solution of home automation system that is native automatic including power consumption for every load, without using any kind of central controlling unit.

LIST OF PRIOR ART CITATIONS

WO2010140094(A1): WAKE-UP OF LIGHT SENSOR IN A LIGHTING SYSTEM

JP11-329759: AUTOMATIC LIGHTING SWITCH SYSTEM FOR INTERIOR ILLUMINATION OF HALL OR THE LIKE

US2010315196: System with Presence Detector, Method with Presence Detector, Presence Detector, Radio Receiver US2010171430: AUTOMATICALLY CONTROLLED LIGHTING DEVICE, AND AN INSTALLATION INCLUDING A PLURALITY OF SUCH DEVICES US2008224026: RF controlled sequential lighting system US2007241928: Wireless Remote Control US2010052939: Lighting System and Related Method Capable of Reducing Electricity Consumption U.S. Pat. No. 5,905,442: Method and apparatus for controlling and determining the status of electrical devices from remote locations CN101420805: Automatic control system for wireless communication lamp light switch and controlling method therefor CN2775764Y: Intelligent wireless lighting switch EP1450383(A1): intelligent switch assembly and system CN2525736Y: Intelligent radio remote control electric switch device KR20080107002: ELECTRIC FACILITY CONTROL USING MULTI-SENSOR AND ZIGBEE COMMUNICATION US2006044152: Master-slave oriented two-way rf wireless lighting control system US2004130456: Intelligent switch assembly and system

DISCLOSURE OF INVENTION

The invention relates to a system for controlling electrical loads in a house or apartment, office or any other living environment. Each of the wall switches for lights, shutters or any other load can be replaced with a 1 functions.

This is the smart Load Control Unit (LCU).

Since a new LCU replaces an old switch and connects to the electric wires there, there is no need to change the electric wiring in the house.

In its Manual mode, the new LCU performs as the old switch.

In addition, the new LCU can implement various Automatic and Semi-Automatic modes of operation.

The new LCU can operate alone or in coordination with other parts of the new system. The connections between the new switches LCUs and other parts of the system is by wireless, so no additional wiring is required in the house.

Other parts of the system may include a computer interface unit, sensor

Unit remote control unit, infrared control unit and keypad unit.

All these units are optional and can be installed in various numbers of each type.

The system is inexpensive and its installation is simple and low cost.

Thus, the invention is an Automated load control system or an Intelligent Green House System—IGH. The vision is of a new generation of a real time automated standalone systems which will bring new smart, intelligent and affordable wireless automated load control system to many households in the world.

The IGH system controls mainly lights, electrical shutters, electrical outlets and Infrared remote-controlled electrical appliances. The IGH system is not limited to those devices; it is versatile and adaptable to various needs.

The IGH System is really automated, unique and simple to operate. The system can be used by most households in the world, with the benefits of a great reliability, ease of use, Manual or Automatic operation.

The system is user friendly and energy saving. The IGH system is efficient in its daily operation and will contribute to making our planet a greener place.

The IGH system can replace most of the standard lights and shutters switches in the world, to the new smart Load control unit—LCU.

The LCU can be installed easily and to replace existing wall box switches, without the needs of any infrastructure changes; it has advanced operations and automation functions embedded inside each LCU.

There is an optional interactive display on the faceplate of the LCU which creates a "miniature computer with monitor" inside each LCU, and an R.F. remote configuration and programming method created especially for the units without the display.

With the abilities shown above and today's energy saving needs, a real-time power consumption measurement and an optional display device were developed and inserted inside each LCU unit. In addition to other functions, the IGHU unit helps the user to monitor the electrical power consumption on a particular LCU unit electrical load.

A wireless sensors unit-IGHS invented with a solar panel installed on the unit faceplate makes it self powered. The IGHS has many sensors that support some of the automated features of the LGU units.

A reduced error rate R.F wireless protocol pertains in the present invention.

This unique protocol enables all types of units in the IGH system, to send and receive messages.

The wireless protocol uses a cyclic redundancy check for each Message, to reduce the bit error rate and prevent receiving invalid messages.

For details, see for example the section below "Automated load control system Messages protocol".

A method developed to setup all the IGH system units automatically and easily, with the assistance of the IGH system's unique R.F. protocol.

A simple to operate and user-friendly remote control RCU and keypad KU were invented, capable of controlling any unit in the IGH system. The remote control can create, store and execute normal operations and a variety of scenarios by a unique teaching method. The keypad can execute operational commands to one or more selected channels or to a group of channels.

A wireless computer interface unit CIU now invented enables any software developers to have two way communications with each installed unit in the IGH system. Using a simple user-friendly two way communication protocol, any software developer can create easily any desired application.

An new infrared control unit IRU enables to create a bridge from the IGH system units, to any infrared remote-controlled electrical appliance.

These appliances (air-conditioning, TV, Stereo, etc.), can now be controlled by and integrated into the IGH system.

More types of IGH system units can be used, that will expand the system abilities for more options and different markets.

MODES FOR CARRYING OUT THE INVENTION

The present invention will now be detailed, with reference to the drawings.

Although the invention is described by way of example and using preferred embodiments, it is to be understood that various other embodiments and improvements will occur to persons skilled in the art upon reading the present disclosure and drawings; such ramifications are within the scope and spirit of the present invention.

Throughout the present disclosure, the following abbreviations may be used:

Bat.—battery
BRI—brightness command
CALC—calculated
CIU—Computer Interface Unit
CLS—Clear selection
FN—Function
GRP—Group
HH.MM.SS—hours, minutes, seconds—two decimal digits each
ID—identification code
IDS—secondary—identification code
IRU—Infrared Control Unit
KU—Keypad Unit
LCU—smart Load Control Unit
LED—light emitting diode.
MCU—micro controller unit
MSG—message
OLED—Organic LED
RCU—Remote Control Unit
RF—radio frequency
SU—Sensors unit
T-OFF—execute schedulers OFF command
T-ON—execute schedulers ON command
USB—universal serial bus The subsequent disclosure is generally as follows: First the invention is described at the system level, including its hardware and software/method of operation aspects.

Subsequently, each subsystem (unit) is detailed, including its hardware/electrical structure, front panel/interface with the user, and software/method of operation.

The subsystems are generally detailed in the following order: Smart load control unit (LCU), Remote control unit (RCU), Sensors unit (SU), Computer interface unit (CIU), Infrared control unit (IRU), Keypad unit (KU).

Note: In some embodiments, an AC LCU (smart Load Control Unit) is mentioned by way of example; this is not intended to limit the scope of the present invention, which can be used to control loads for either/both types of electric power supply, AC and DC. Persons skilled in the art will appreciate that a different embodiment of the LCU may be required for each type of power source, AC or DC. For example, with DC one cannot count on automatic turn-off of an SCR or triac at the end of a half cycle of the AC voltage.

Figure 1:
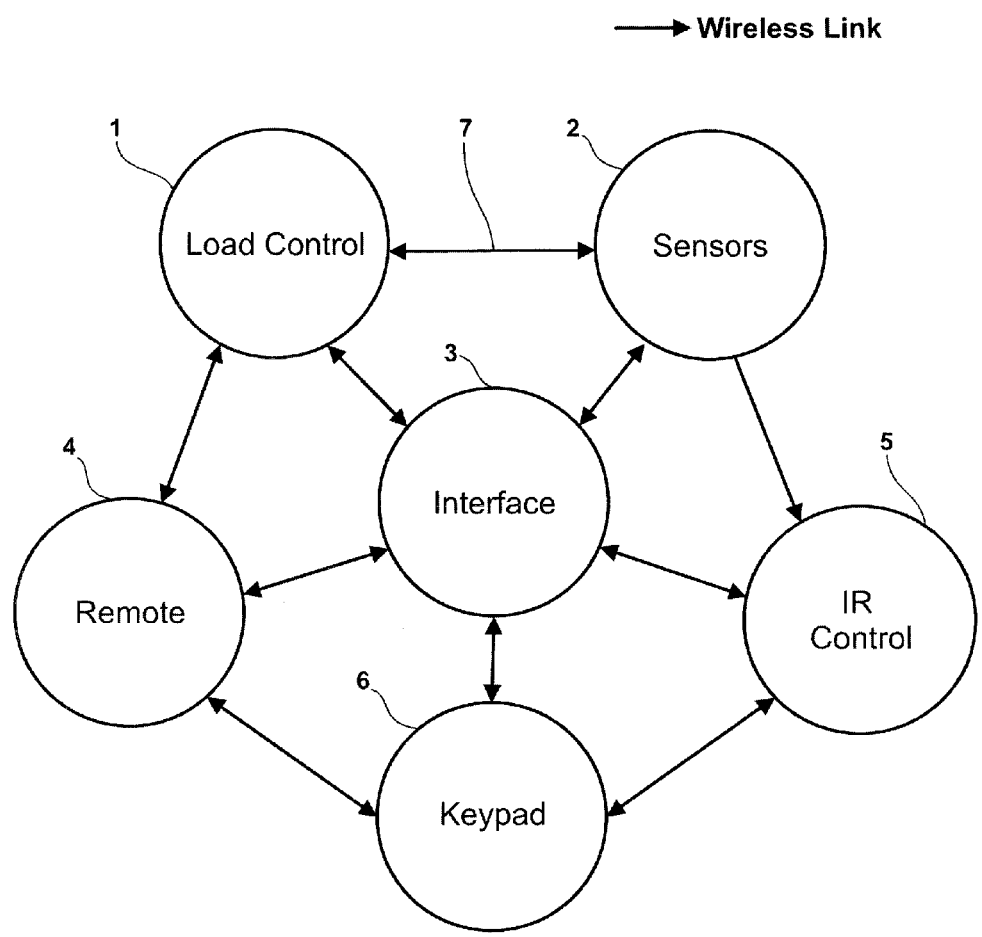
FIG. 1 An automated load control system block diagram

FIG. 1 details an automated load control system block diagram, including:

A smart load control unit (LCU) 1, which communicates with most of the automated load control system units, A sensors unit 2 can transmit a collection of sensors data messages to the automated load control system, A remote control unit 4 and keypad unit 6 can transmit commands to at least one smart load control unit 1, A computer interface unit 3 can receive all the wireless information, to transmit commands to any smart load control unit 1 and to the infrared control unit 5, An infrared control unit 5 can learn most infrared remote controls messages and to transmit those messages by the automated load control system.

Figure 2:
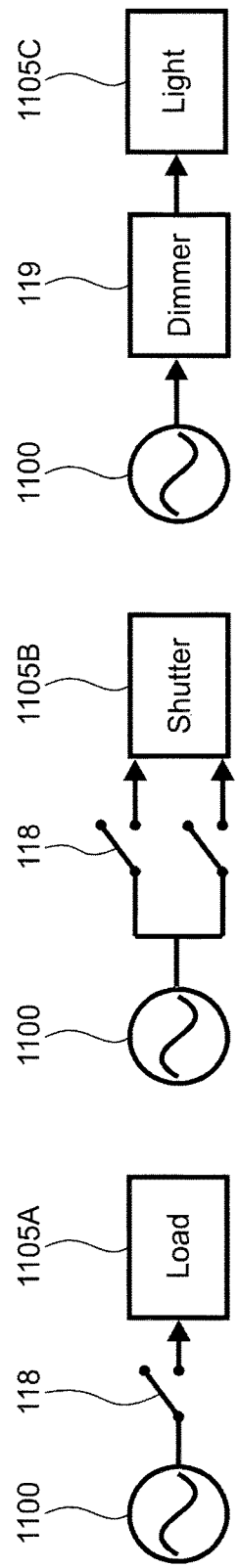
FIG. 2 A prior art system for controlling loads locally and manually

FIG. 2 A prior art system for controlling loads locally and manually.

Wall switches 118 may connect any load 1105A to a source of electric power 1100. The switches 118 are operated manually. Some loads require two switches, for example to control the movement of shutters 1105B.

Illumination devices 1105C may use a light dimmer 119.

Figure 3:
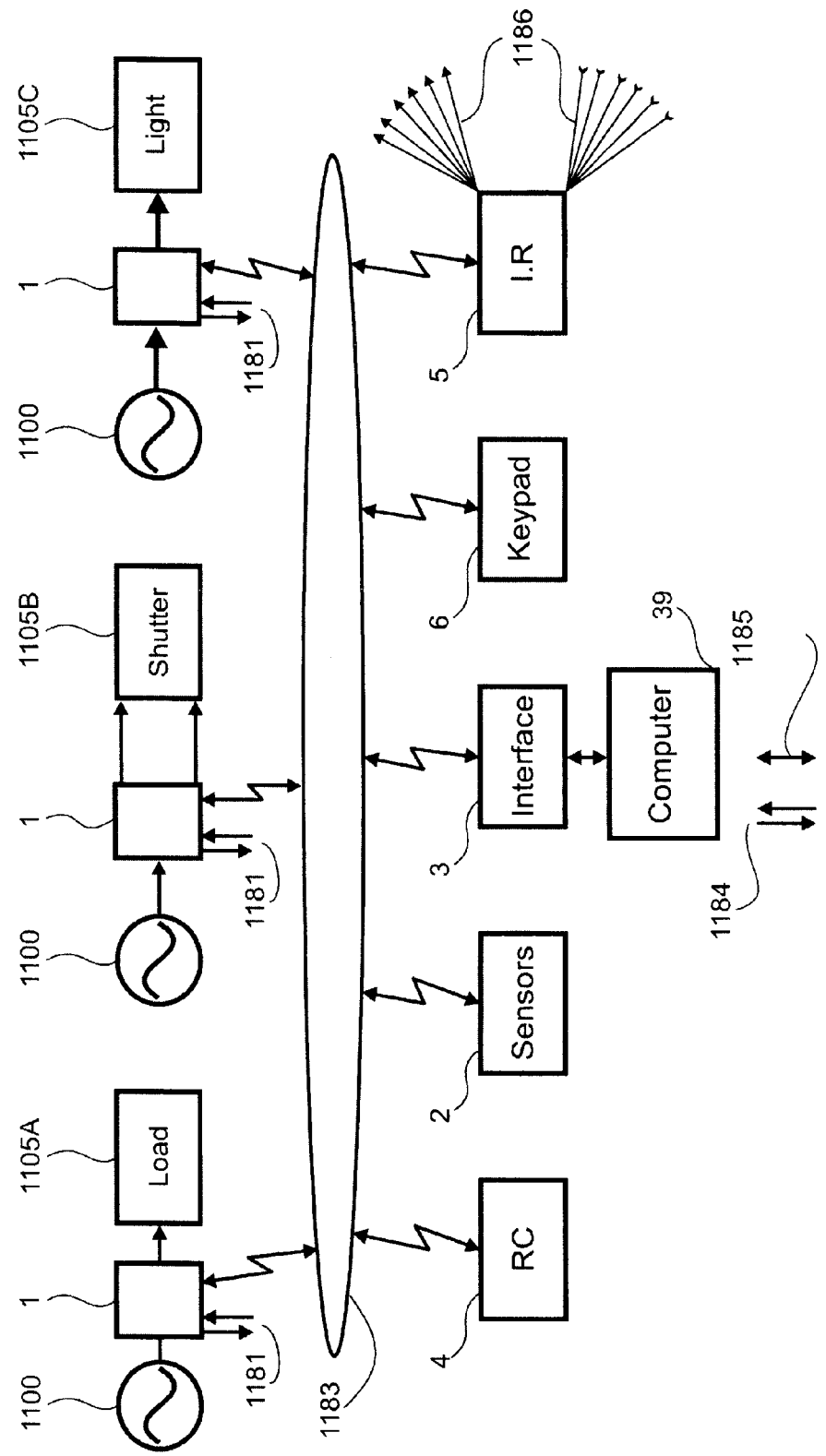
FIG. 3 An automated load control system block diagram

FIG. 3 An automated load control system block diagram. According to the present invention, each of the switches 118, 119 can be replaced with a smart switch unit LCU 1. A smart switch 1 can be controlled either locally through input and output means 1181, or remotely through a wireless channel 117 in a wireless channels medium 1183.

Each LCU 1 is installed so as to replace a prior art switch 118 or 119, and is connected to electrical wires there.

Therefore there is no need for changes in the electrical infrastructure in the house; the wiring remains just the same. This allows for an easy and low cost replacement of existing electric switches with the new system.

The LCUs 1 can be remotely controlled, through medium 1183, using various means such as remote unit 4, sensor unit 2, a computer 39 through a wireless interface 3, a keypad 6 and/or an infrared control 5 (for those appliances which are controlled via IR channels 1186).

The computer 39 can use local input and output means 1184, such as a display and keyboard or graphic interface; or the computer may be controlled from a remote location via channel 1185, such as the Internet or a cellular system.

FIGS. 1 and 3 show a block diagram of the present invention an automated load control system. The system comprises a smart load control unit 1, Sensors unit 2, remote control unit 4, keypad unit 6, infrared control unit 5, and computer interface unit 3.

In the present invention, the Automated load control system is able to control the energy supply to the load 24, according to user preference stored in the automated load control system. It is understood, however, that the invention is not limited to control and switching energy supply; it can control and switch DC energy supply or any other type of electric energy.

The smart load control unit 1 is the core of the automated load control system. It may comprise many devices and sensors that enable it to act as a standalone situation awareness and energy saving system, based on stored information, internal schedule tasks manager and if available wireless information received from the Sensors unit 2, with many intelligent smart operation and energy saving options and modes.

The wireless sensors unit 2 can transmit the current room light, current room temperature, room occupation room optional smoke detector information and real time clock. The remote control unit 4 or the keypad unit 6, able to transmit operation mode selection or activation command to at least one smart load control unit 1.

The infrared control unit 5 can learn at least one infrared remote control function that operates any specific infrared controlled electrical appliances and to use the recorded infrared information to operate the same electrical appliances, when needed by the automated load control system.

The computer interface unit 3 can receive and to transmit information via the wireless link 6, to/from the automated load control system.

The computer interface unit 3 connects to the computer via standard USB port.

The computer interface unit 3 can transmit different commands such as status request or activation or operation commands to the Smart load control unit 1, and to receive back wireless feedbacks from the smart load control unit 1.

In the present invention, energy saving is achieved when the user uses less energy by dimming the lights, turns the light or any load OFF automatically and activates automatic shutter control to keep optimum requested sun light in the room. This native fully automated solution will reduce or eliminate any wasted energy.

Automated Load Control System Messages Protocol

This section details by way of example a protocol for achieving reliable, error-free or reduced rate of errors communications in the system.

In one embodiment, every MSG include 4 SYNC bytes and 4 identification bytes and its 10 information bytes with CRC calculated information.

The receiver will not accept the message to its buffer until all 4 SYNC bytes are matched.

The 4 identification bytes and all the information bytes are stored in the receiver buffer. A CRC calculation is performed in accordance with the received information, bytes compare to the CRC info received. Identification bytes are validated.

In the present invention, the wireless messages are numbered as follows:

A Message number 11, receive mode from sensors unit 2, current room light level scale to 255 levels, room temperature level scale to 255 levels, motion detected, time, day and status of the internal battery of the sensors unit.

A Message number 16, receive mode from sensors unit 2, current room light level scale to 255 levels, room temperature level scale to 255 levels, time, day and status of the internal battery of the sensors unit.

A Message number 2-9 receive mode from the remote control 4/keypad unit 6, will activate according to the command number brightness level on the load 1105, A message number 1, receive mode from the remote control 4/keypad unit 6, will change the state of the Smart AC load control unit 1, to OFF, A Message number 10, receive mode from the remote control 4/keypad unit 6 will change the state of the Smart AC load control unit 1, to ON, A Message number 13, receive mode from the remote control 4/keypad unit 6, will execute a dimming process by the Smart AC load control unit 1, A Message number 12, receive mode from the remote control 4/keypad unit 6, will execute a brightness process perform by the Smart AC load control unit 1, A Message number 99, receive mode from the remote control 4/keypad unit 6, will stop dimming/brightness process perform by the Smart AC load control unit 1, A Message number 14, receive mode from the remote control 4, will toggle between the tree operation modes of the Smart AC load control unit 1, MANUAL, SEMI, AUTO, A Message number 15, receive mode from the remote control 4, will change to SLEEP operation mode of the Smart AC load control unit 1, A message number 80, receive mode from the computer interface unit 3, getting required brightness level 1-99 or request ON command 100 or request OFF command 0 and execute the command by the Smart AC load control unit 1, if in use with the Shutter load 1105, then command 80 will be use to execute open command by the Smart AC load control unit 1.

A message number 81 receive mode from the computer interface unit 3, getting required operation mode selection commands 1-4, request MANUAL mode command 1, or SEMI mode command 2, or AUTO mode command 3, or SLEEP mode command 4, or SCHEDULER ON command 5, or SCHEDULER OFF command 6 and execute the command by the Smart AC load control unit 1, A Message number 85 with shutter load 1105, receive mode from the computer interface unit 3, will execute close command by the Smart AC load control unit 1, A message number 69, receive and transmit mode from the computer interface unit 3, or due to operation status change of the Smart AC load control unit 1, will transmit ROOM, UNIT SY, UNIT ID, COMMAND NUMBER, last status 1 for OFF state and 2 for ON state.

Last brightness level in use 1-100, last mode in use 1 for MANUAL, 2 for SEMI, 3 for AUTO, 4 for SLEEP, +10 for SCHEDULER ON, +number of error.

A Message number 70 receive and transmit mode from the computer interface unit 3, the Smart AC load control unit 1, will transmit ROOM, UNIT SY, UNIT ID, COMMAND NUMBER, power consumption, room temperature, room light level.

A message number 71 receive and transmit mode from the computer interface unit 3, the Smart AC load control unit 1, will transmit ROOM, UNIT SY, UNIT ID, COMMAND NUMBER, stored selected values of MOTION TIMER, SLEEP TIMER, SAFETY TIMER.

A message number 72 receive and transmit mode from the computer interface unit 3, the Smart AC load control unit 1, will transmit ROOM, UNIT SY, UNIT ID, COMMAND NUMBER, stored selected values of MOTION TIMER, SLEEP TIMER, SAFETY TIMER.

Message number 74 receive and transmit mode from the computer interface unit 3, the Smart AC load control unit 1 will transmit ROOM, UNIT SY, UNIT ID, COMMAND NUMBER, internal temperature in the Smart AC load control unit.

A message number 75 receive and transmit mode from the computer interface unit 3, the Smart AC load control unit 1, will transmit ROOM, UNIT SY, UNIT ID, COMMAND NUMBER, pre selected minimum switch delay, maximum switch delay time, gate time.

A message number 76 "HI LOAD", transmit mode to the computer interface unit 3, the Smart AC load control unit 1, will transmit ROOM, UNIT SY, UNIT ID, COMMAND NUMBER, when High load detected.

A message number 77 "NO LOAD" transmit mode to the computer interface unit 3, the Smart AC load control unit 1, will transmit ROOM, UNIT SY, UNIT ID, COMMAND NUMBER, when No load detected.

A message number 78 "LOAD IS NOW OK", transmit mode to the computer interface unit 3, the Smart AC load control unit 1, will transmit ROOM, UNIT SY, UNIT ID, COMMAND NUMBER, when No load detected.

A message number 82, status of shutter, transmit/receive mode by request from computer interface unit 3, or at status change of the Smart AC load control unit 1. The Smart AC load control unit 1, will transmit ROOM, UNIT SY, UNIT ID, COMMAND NUMBER, fully open or fully close status.

A message number 83, shutter was moving up or shutter was moving down, the Smart AC load control unit 1, will transmit ROOM, UNIT SY, UNIT ID, COMMAND NUMBER, move up, move down.

A message number 84 shutter status at a change of status or by request from the computer interface unit 3, Smart AC load control unit 1, will transmit ROOM, UNIT SY, UNIT ID, COMMAND NUMBER, move up, move down, fully open fully close, mode MANUAL, SEMI, AUTO, SLEEP.

A message number 100-254 program status request from the computer interface unit 3, Smart AC load control unit 1, will transmit ROOM, UNIT SY, UNIT ID, MENU NUMBER, VALUE.

*AB—with or without optional text and graphic display 1108.

*A—with optional text and graphic display 1108 without modes and status LEDS.

*B—without optional text and graphic display 1108 with modes and status LEDS.

*1—light unit

*2—shutter unit

*3—power unit

Smart Load Control Unit (LCU)

Figure 4:
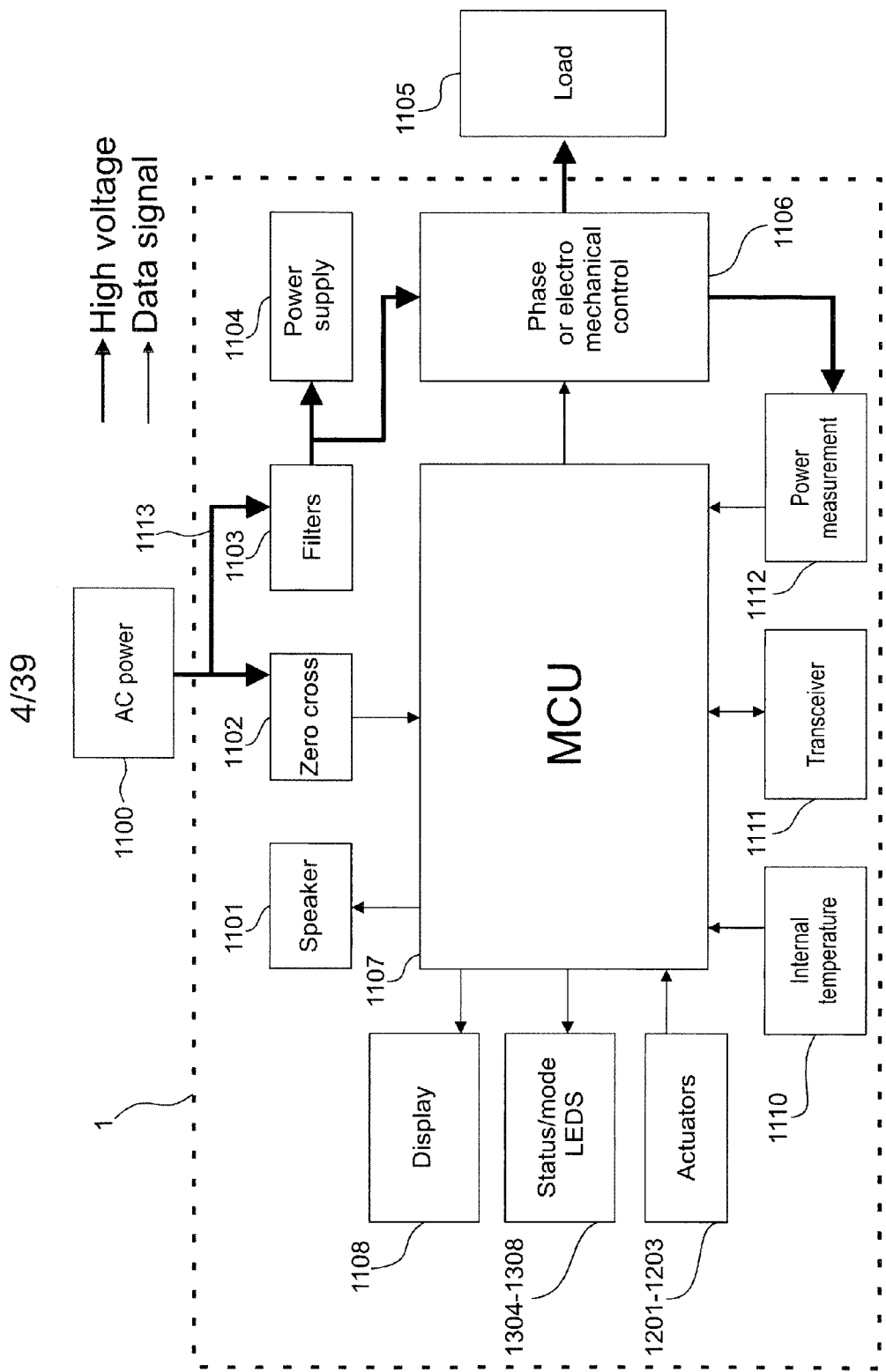
FIG. 4 A smart load control unit (LCU) block diagram

FIG. 4 details a smart load control unit LCU 1 block diagram, comprising: AC line filters 1103 reduce interference to and from the AC power line, A zero cross detector 1102, detects the zero cross from the power line and converts it to an MCU input, A DC power supply 1104, distributes DC Power to the devices.

Actuators 17 enable executing user commands. In the present invention, actuators are input devices such as switches, noncontact input means, pushbuttons.

An optional text and graphic display 1108, capable of displaying text and graphics, enables the user to set up the unit from an interactive Textual menu and to display on the smart load control unit 1 detailed textual and graphics status information;

An internal temperature sensor 1110 can be configured to reduce the power of the Smart load control unit 1, in case of high internal temperature, for example by turning off the load.

An MCU 1107, micro controller unit, input, output, processing and storing data with the devices, A load power measurement device 1111, measures in real time the load 24 power consumption. In one embodiment, an MCU (micro controller unit) and Analog to Digital port reads the AC wave amplitude with an operational amplifier IC connected to a shunt resistor. At fixed time intervals, the amplitude is measured and an average or RMS value is computed, then it is translated to a factor number that represents the real-time power consumption.

A controllably programmable phase-control device (one or more) 1112, or any electro mechanical switch (relay, etc.) or electronic switch (SCR, triac, power transistors, etc.) coupling the AC source 1100 and at least one load 1105, are used to regulate the amount of energy supplied to the load 1105.

A load 1105, may be an illumination load or a shutters moving motor load, or any other load. The illumination load may be a lamp set, comprising one or more lamps. For example, the lamp set may include one or more incandescent lamps and/or other lighting loads such as electronic low voltage or magnetic low voltage loads.

A two-way wireless transceiver 1111 can communicate with any unit of the automated load control system.

The block 1106 is a controllably programmable phase-control device (one or more) 1106, or any electro mechanical switch (relay, etc.), coupled the AC source 1100 and at least one load 1105, to regulate the amount of energy supplied to the load 1105, A controllably programmable phase control device 1106 (one or more), may include electro mechanical switch (relay, etc.) or a solid state switching device, which may include one or more triacs or which may be thyristors or field effect transistor (FET), or MOSFET (metal oxide semiconductor FET), or an insulated gate bipolar transistor (IGBT), or a similar control devices.

To be use in a forward phase control technique, or in a reverse phase control technique. These techniques are well known and need not be described further.

LEDs—can be other electro optical devices, such as LCD, plasma. The small size switches may have LEDS indicators and the big switches may have an OLED display.

The Power source 1100 can also be DC, or AC at another voltage and/or frequency.

Figure 5:
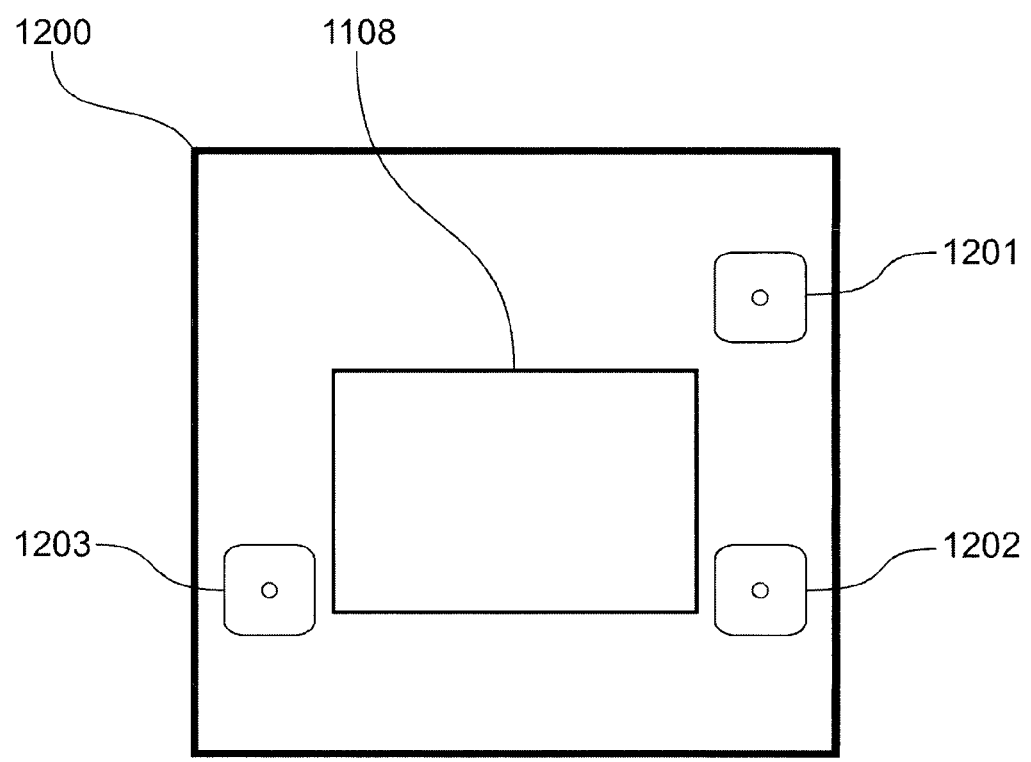
FIG. 5 A smart load control unit faceplate structure with display

FIG. 5 details a smart load control unit faceplate structure with display

*A—a smart load control unit 1 faceplate structure with display. faceplate 1200 may be from any material, the preferable faceplate size may be at a size to fit into an enclosure adapted to fit an opening of electrical standard wall box and preferable actuators or touch sensors BRI/UP 1201, DIM/DOWN 1202, MODE 1203 and a text AND optional graphics display 1108, preferably color Text and graphic OLED.

Figure 6:
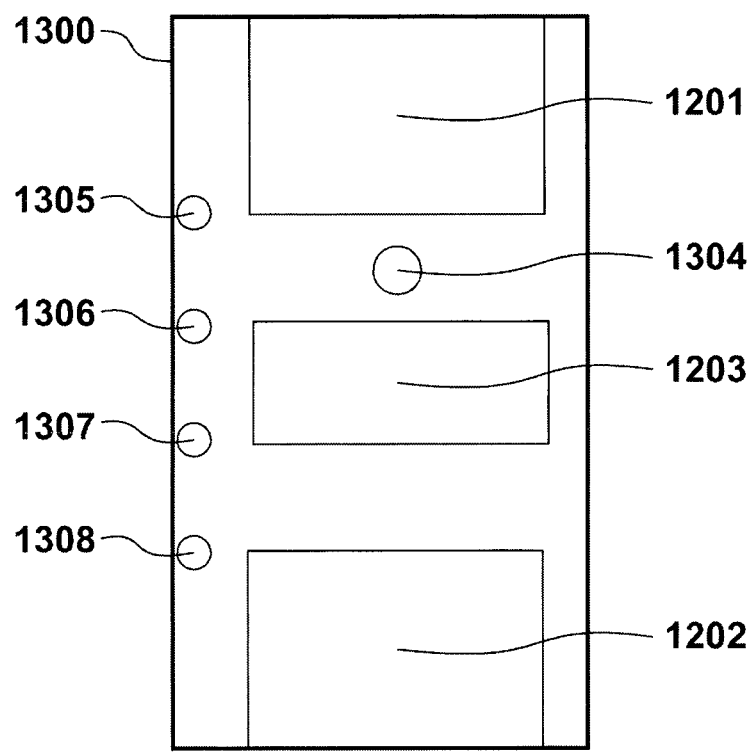
FIG. 6 A smart load control unit faceplate structure without display

FIG. 6 details a smart load control unit faceplate structure without display

*B—a smart load control unit 1 faceplate structure without display. faceplate 1300 may be from any material, the preferable faceplate size may be at a size to fit into an enclosure adapted to fit an opening of electrical standard wall box and preferable actuators or touch sensors BRI/UP 1301, DIM/DOWN 1303, MODE 1302 and status LEDS 1305-1308.

Figure 7:
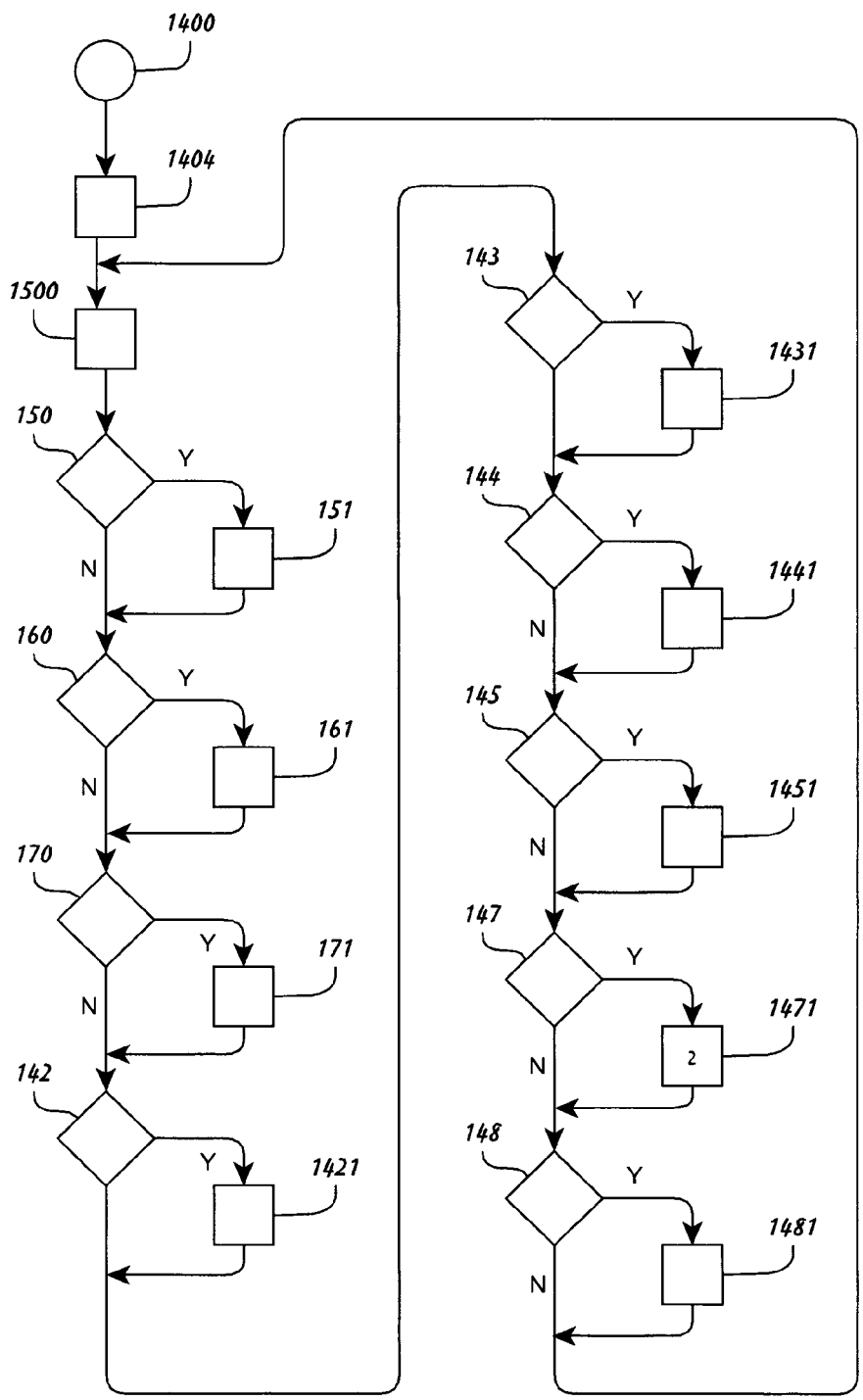
FIG. 7 A main loop flow chart
Figure 8:
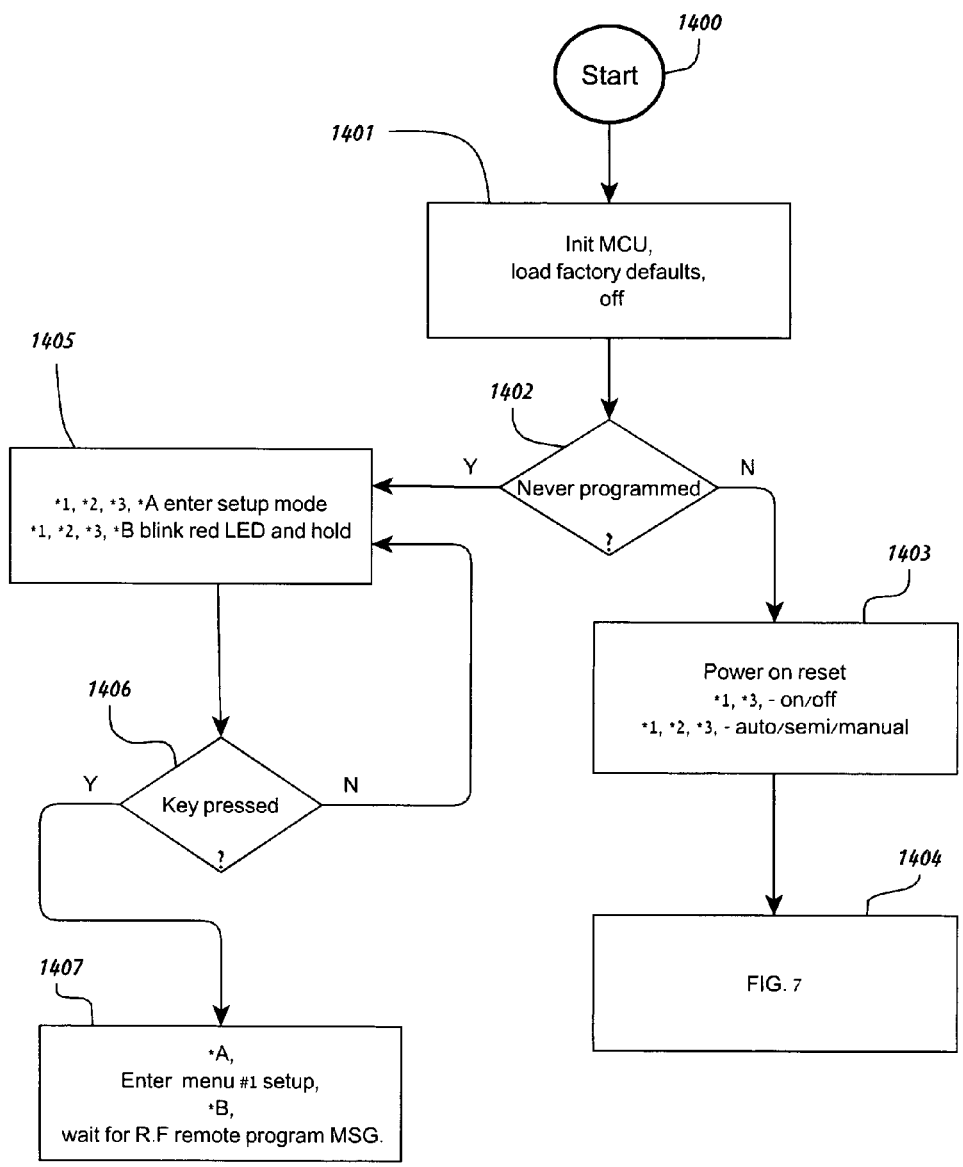
FIG. 8 A smart load control unit startup flowchart
Figure 9:
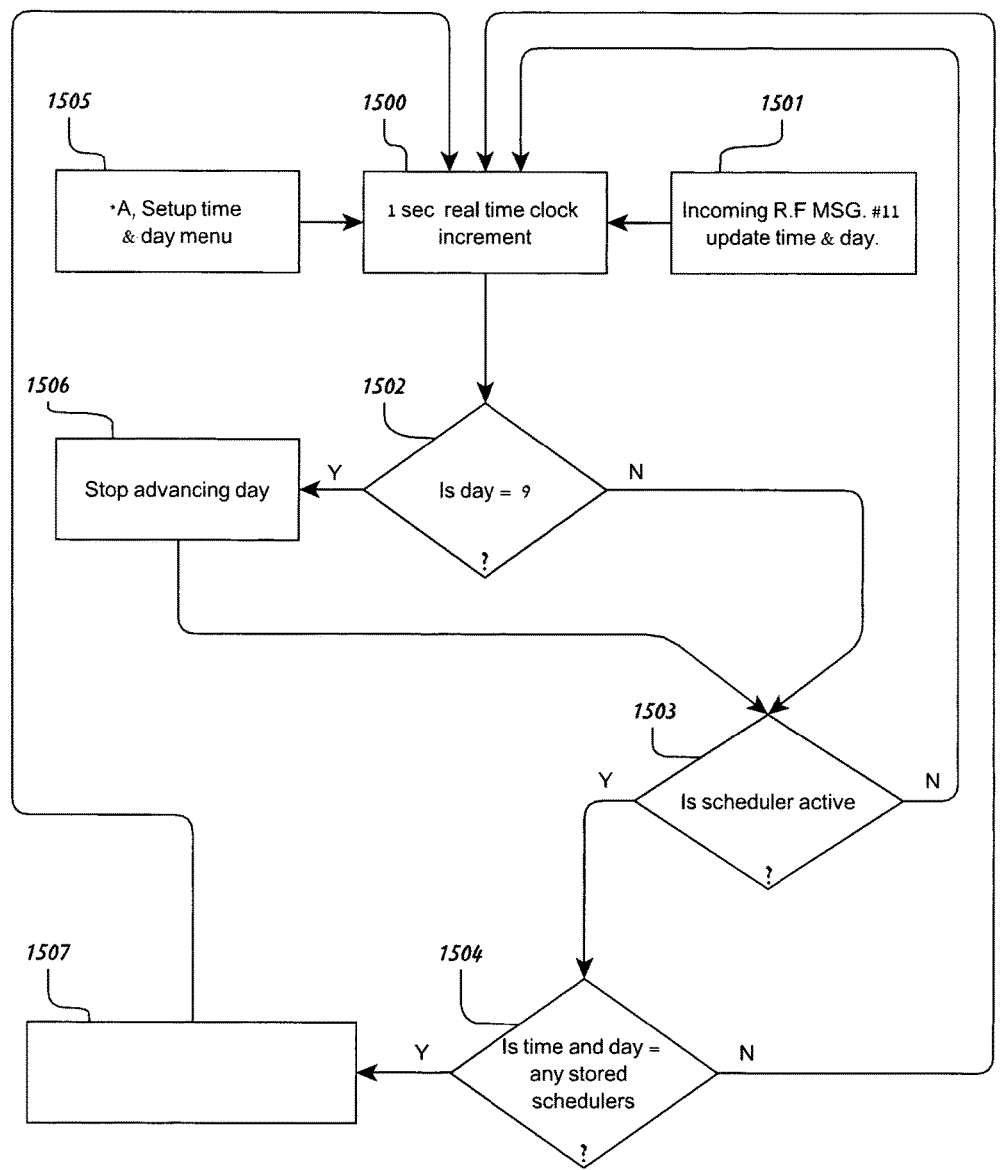
FIG. 9 A smart load control Real time clock flowchart
Figure 10:
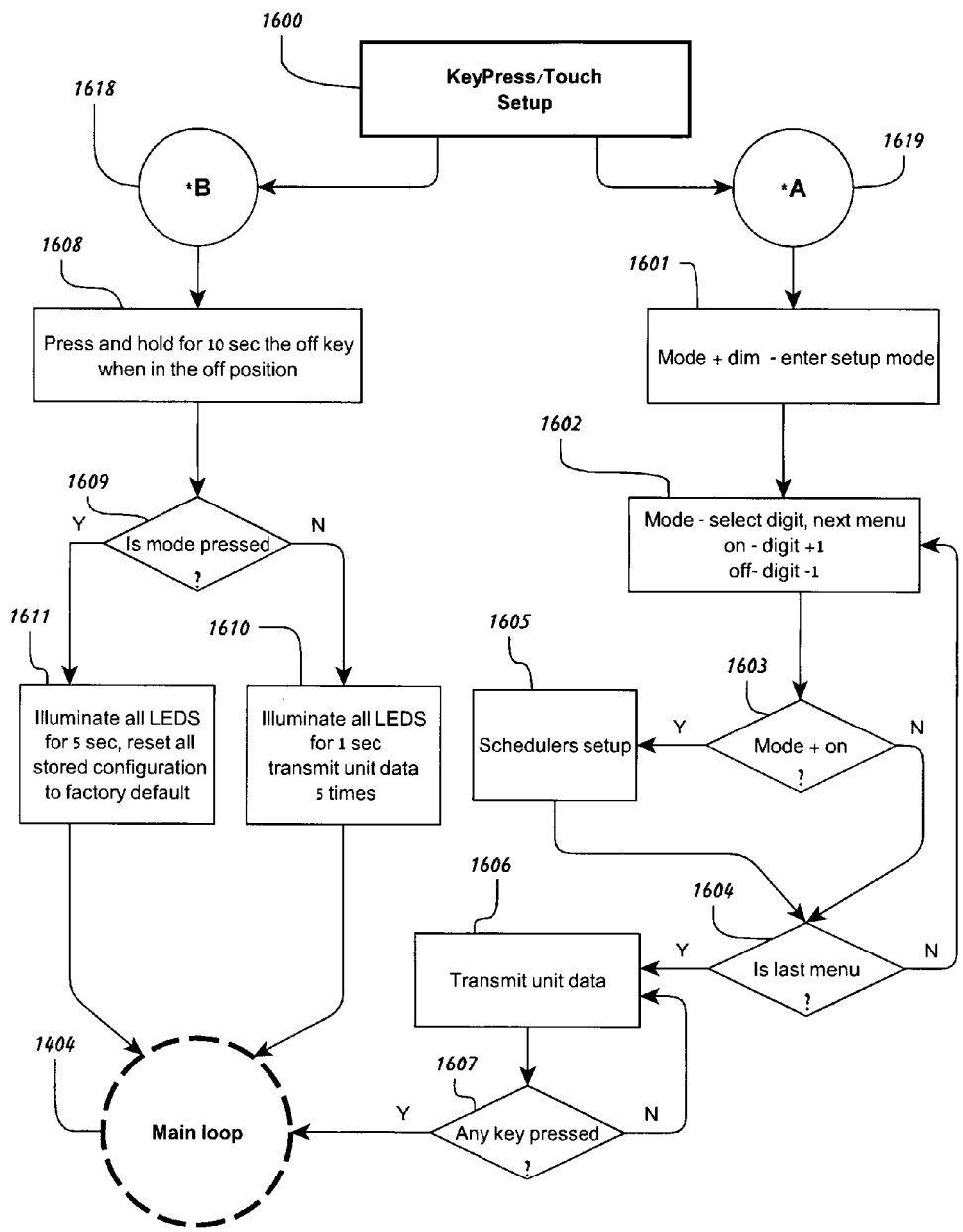
FIG. 10 A smart load control key press routine flowchart
Figure 11A:
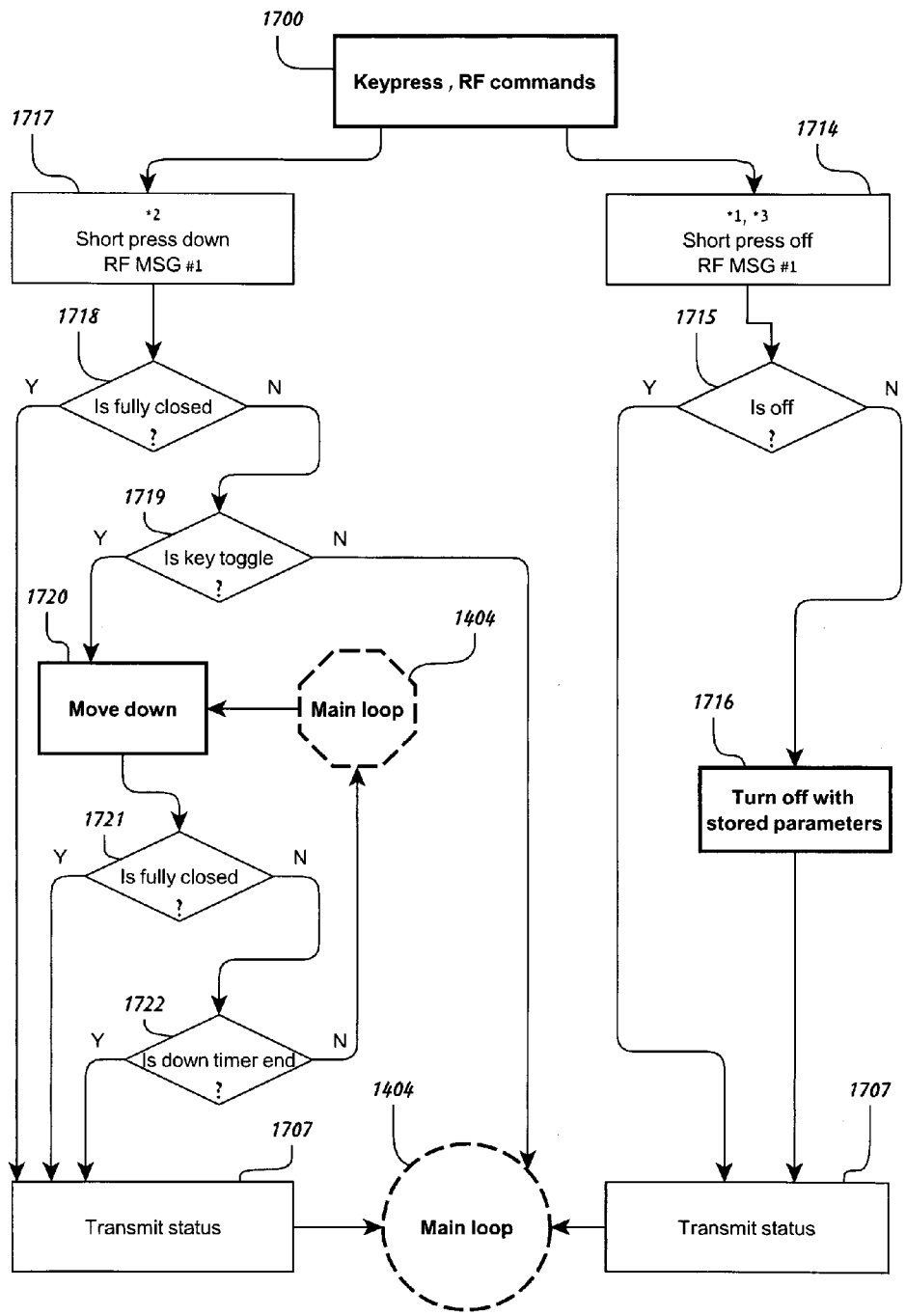
FIGS. 11A, 11B A smart load control key press routine flowchart
Figure 11B:
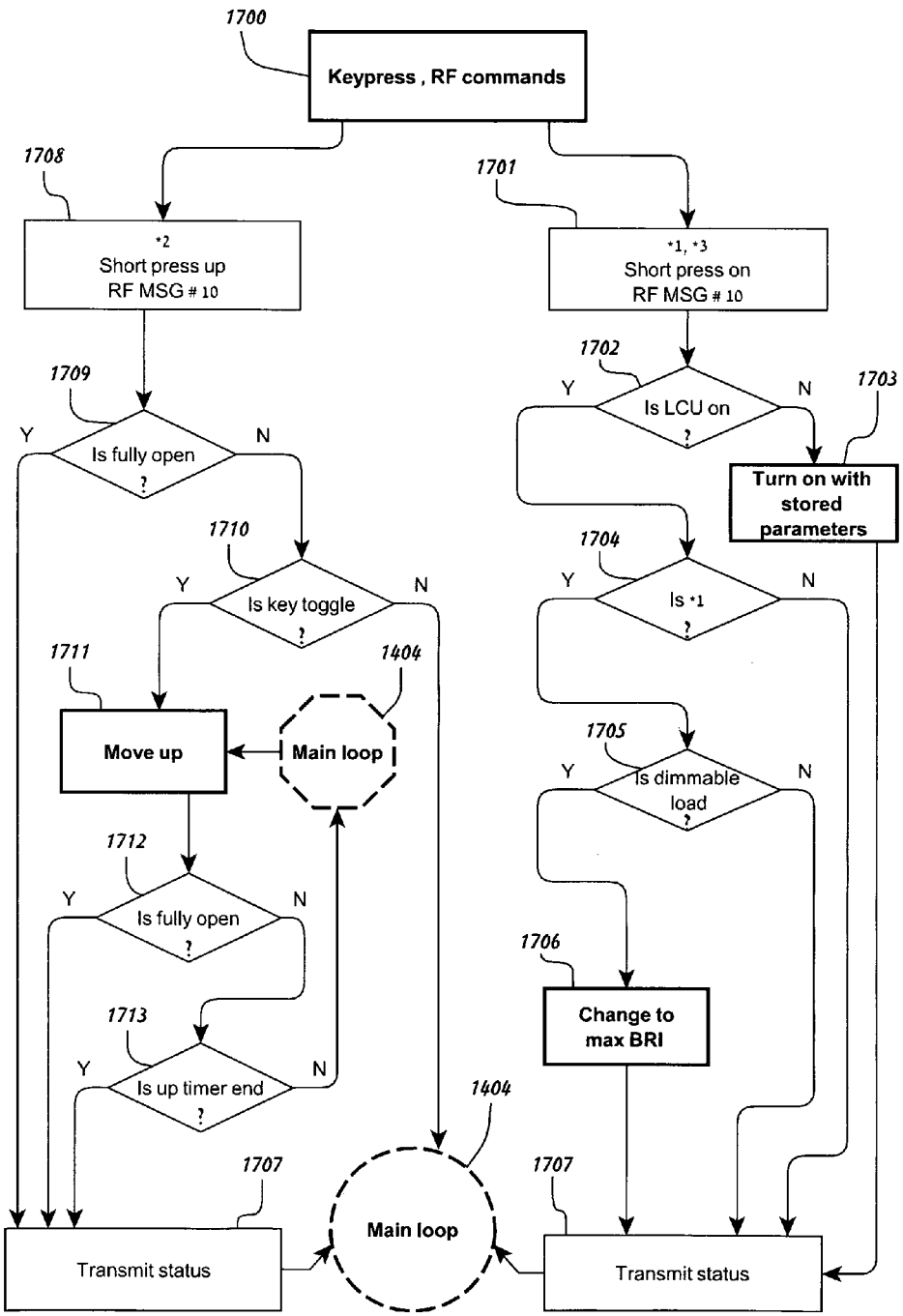
Figure 12A:
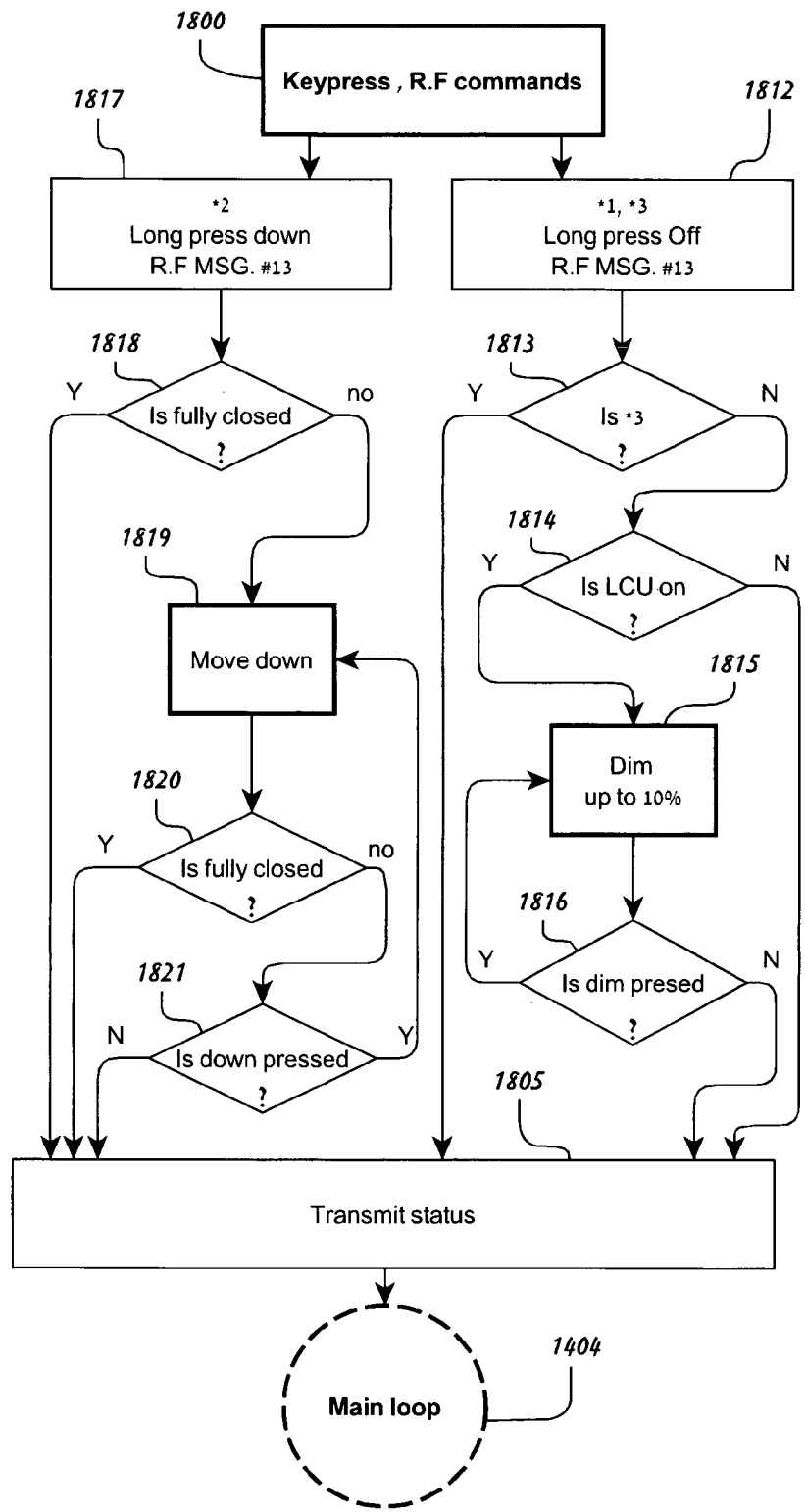
FIGS. 12A, 12B A smart load control key press routine flowchart
Figure 12B:
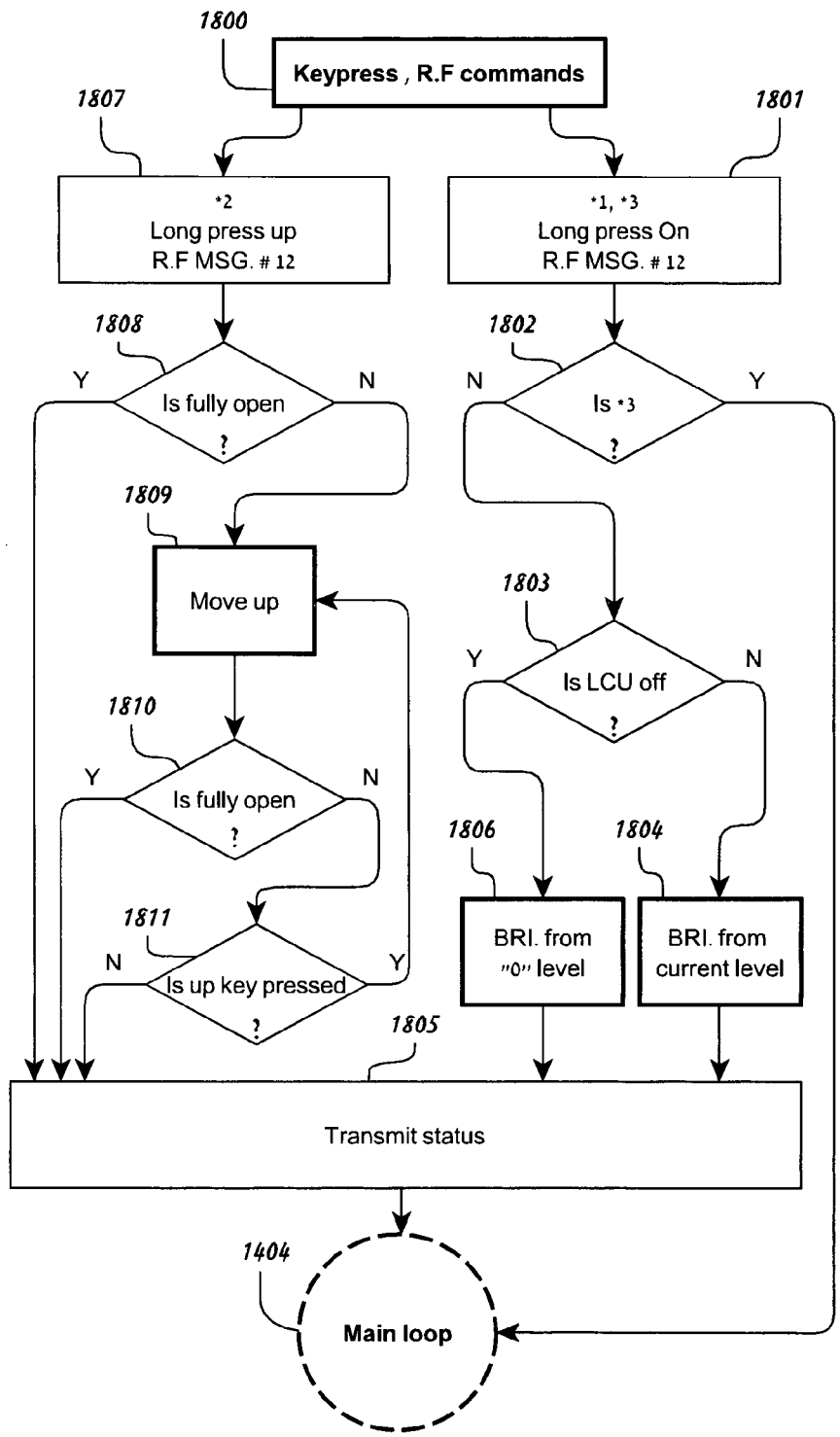
Figure 13A:
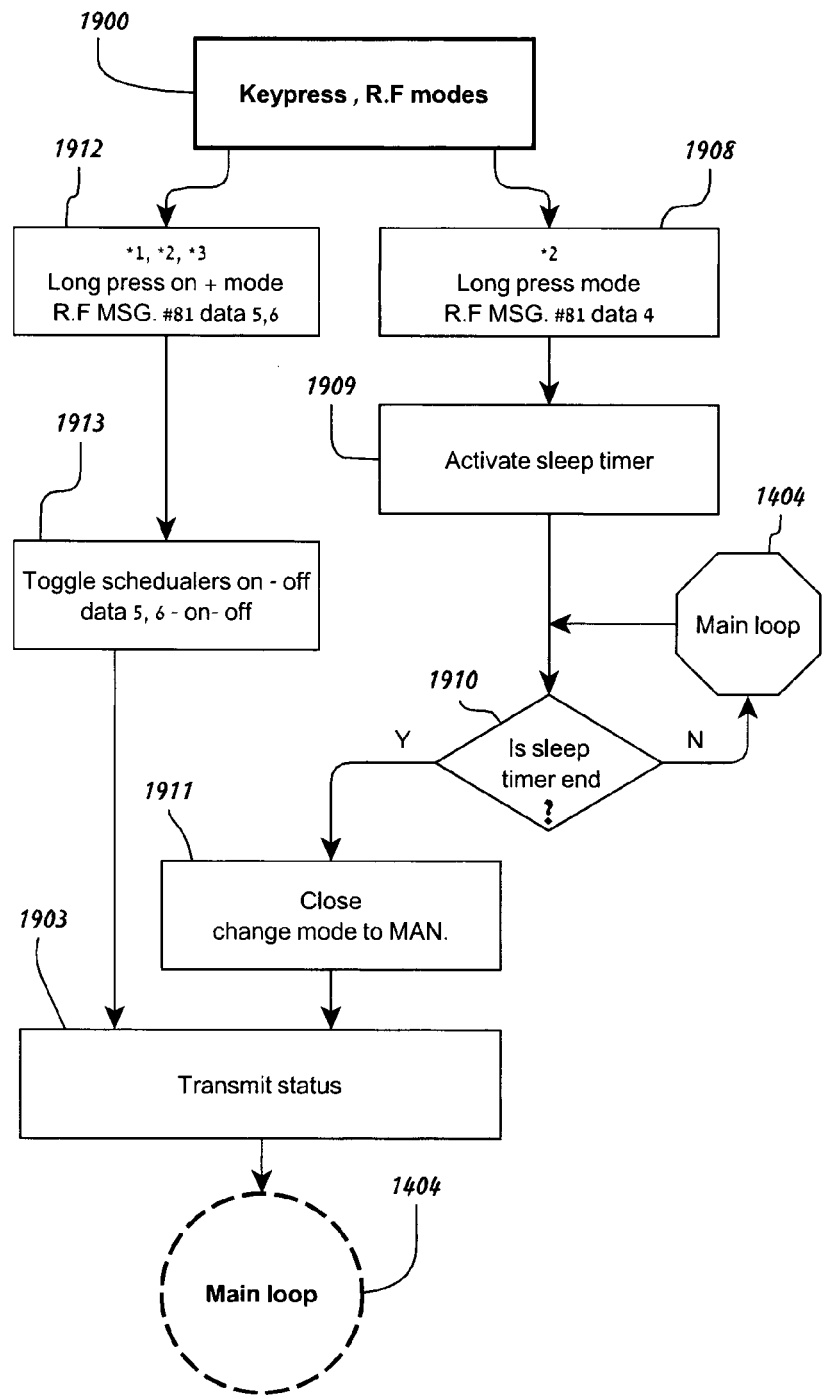
FIGS. 13A, 13B A smart load control key press routine flowchart
Figure 13B:
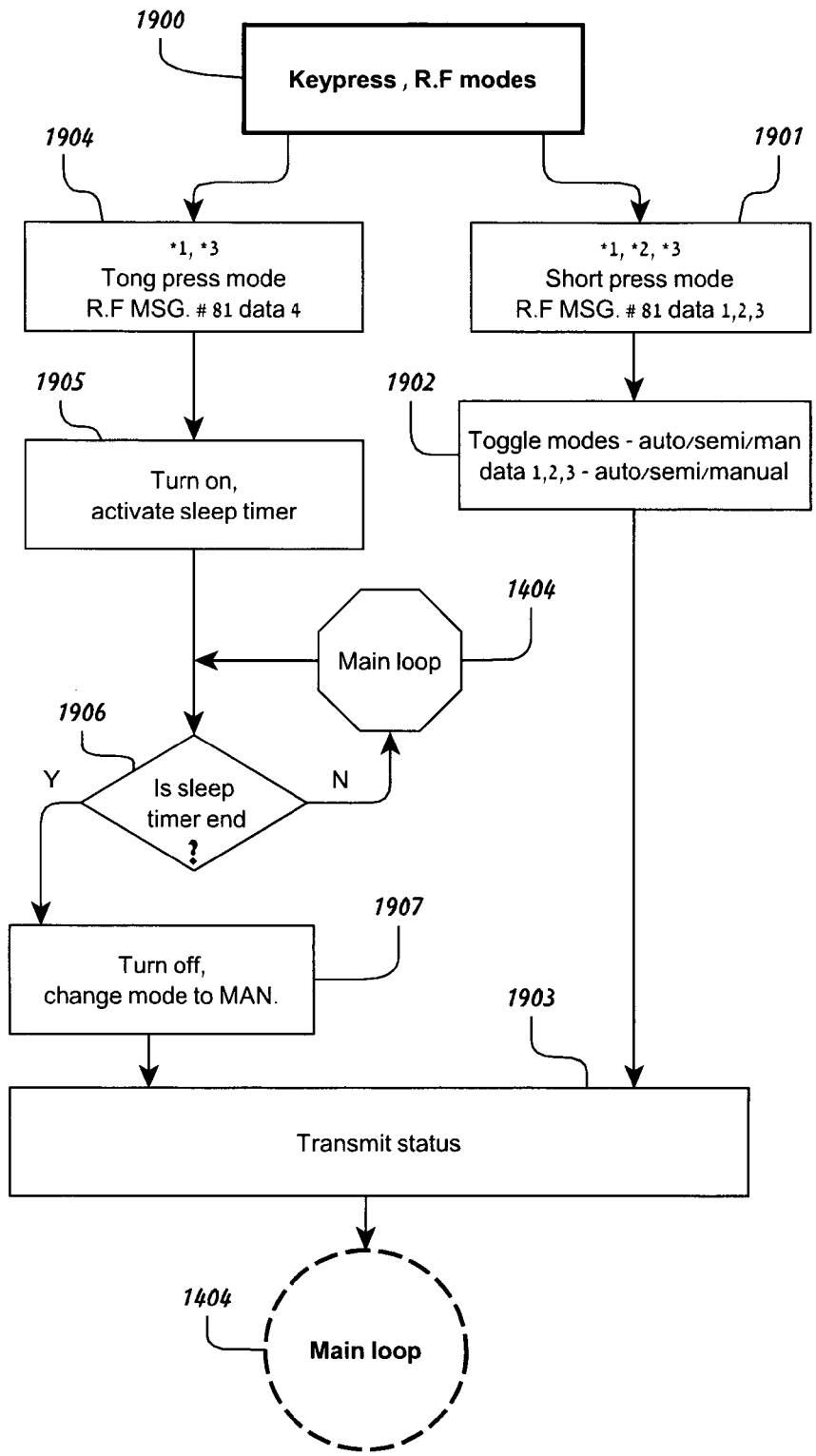

Overall System Control Method
FIG. 7 details a main loop flow chart, including:
start 1400, to implement Init 141
Key pressed or RF message received? 150
Setup 151
Key pressed? 160
Keypress touch module 161
Key pressed or RF command received? 170
Keypress and RF commands module 171
Timer/watchdog/interrupt? 142
Read power consumption and internal temperature 1421
Received sensor RF message? 143
Read and process message 1431
Received message? 144
Read and process message 1441
Sleep mode? 145
Act accordingly 1451
Manual mode? 147
Act accordingly 1471
Auto/semi mode? 148
Act accordingly 1481.
FIG. 8 details a smart load control unit startup flowchart.
FIG. 9 details a smart load control Real time clock flowchart.
In 1502, in regular days there is overflow to 1 if=8. However, in 1500 day 1-7 only.

Day 9 comes from msg #11 or #16 when the user selects on the sensor unit operation in a Holy Day is active. Day 9 is a Holy Day, using a different method. For example, for observant Jews it is forbidden that a sensor be activated by a person on such a day; accordingly, the present invention includes means for disabling the sensor units in Holy Days.

Note: The value "9" is arbitrary, it is only meant to indicate a state outside the 1-7 regular days of a week. Any other numeric value or other indication of a special day or a Holy Day may be used.

During a holyday or "Holy Day" as meant by observant persons, the LCU (smart Load Control Unit) can change its mode of operation. A different set of schedules tasks, specifically programmed for that holyday, are performed. The LCU can enter the holyday mode manually (activated by the user). or by changing a switch on it paired sensor unit. Exit from the holyday mode may be manual or by return holyday switch on its paired sensor unit to normal; in this case, the, the day of week will return automatically to the current day of week.

At the holyday mode the LCU will perform the programmed schedules tasks on a 24 hour base loop.

Operation of the Smart Load Control Unit (LCU)
The Smart load control unit 1 comprises:
An AC power line input 1100, can be any standard voltage and any standard frequency like 220 VAC 50 Hz or 110 VAC 60 Hz.

In the current invention the smart load control unit 1 is switching an AC power line, it can control and switch any kind of power line like DC, or dry contact.

A line filter 1103, reduces electrical noise to and from the AC line (EMI, RFI).

A zero cross detector 1102, determines the zero-crossing points of the input waveform.

Gate duration is predetermined and fully user configurable. The microcontroller sets up gate control signals to operate the switching device included in the controllably programmable phase control device 1106, to provide voltage from the power line 1100, to the load 1105, at predetermined and fully user configurable times relative to the zero-crossing points of the waveform. The zero-crossing detector may be a conventional zero-crossing detector, and need not be described here in further detail. In addition, the timing of transition firing pulses relative to the zero crossings of the waveform is also known, and need not be described further.

A power supply 1104, delivers direct current low voltage to operate all the low voltage devices that pertain in the smart load control unit 1,

*A—text and graphic display 1108, placed on the faceplate 1200, of the Smart The load control unit 1 displays its status and acts as an interactive display enables the user to store any parameters or configurations to the smart AC load control unit 1,

*B—Modes and status LEDS 14, placed on the faceplate 1300, of the Smart AC load control unit 1, indicate different modes selection and operation status of the Smart load control unit 1, A controllably programmable phase control device 1106 (one or more), may include electro mechanical switch (relay, etc.) or a solid state switching device, which may include one or more triacs or which may be thyristors or field effect transistor (FET), or MOSFET (metal oxide semiconductor FET), or an insulated gate bipolar transistor (IGBT), or similar control devices, To be use in a forward phase control technique, or in reverse phase control technique.

These techniques are well known and need not be described further.

An MCU 1107 microcontroller unit may be any processing device able to get information from the zero-crossing detector. The zero-crossing detector determines the zero-crossing points of the input waveform from the AC power line 1100, the microcontroller sets up gate control signals to operate the controllably programmable phase control device 1106, to provide voltage from the AC power line 1100, to the load 1105, at predetermined times relative to the zero-crossing points of the waveform.

The zero-crossing detector may be a conventional zero-crossing detector, and need not be described here in further detail.

In addition, the timing of transition firing pulses relative to the zero crossings of the waveform is also known, and need not be described further.

The MCU 1107 may operate the optional text and graphics display 1108, preferably locate at the faceplate of the Smart load control unit 1, by output ports via SPI bus, to display text and graphics on the text and graphics display 1108, or the status LEDS by its i/o ports.

FIG. 10-13B details a smart load control key press routine flowchart, the MCU 1107 receives inputs from actuators 1109 (switches or touch sensors pads) preferably locate at the faceplate of the smart load control unit 1, and executing different operations and commands according to the actuator that has been used. The MCU 1107 receives input from internal temperature sensor 1110.

Figure 14A:
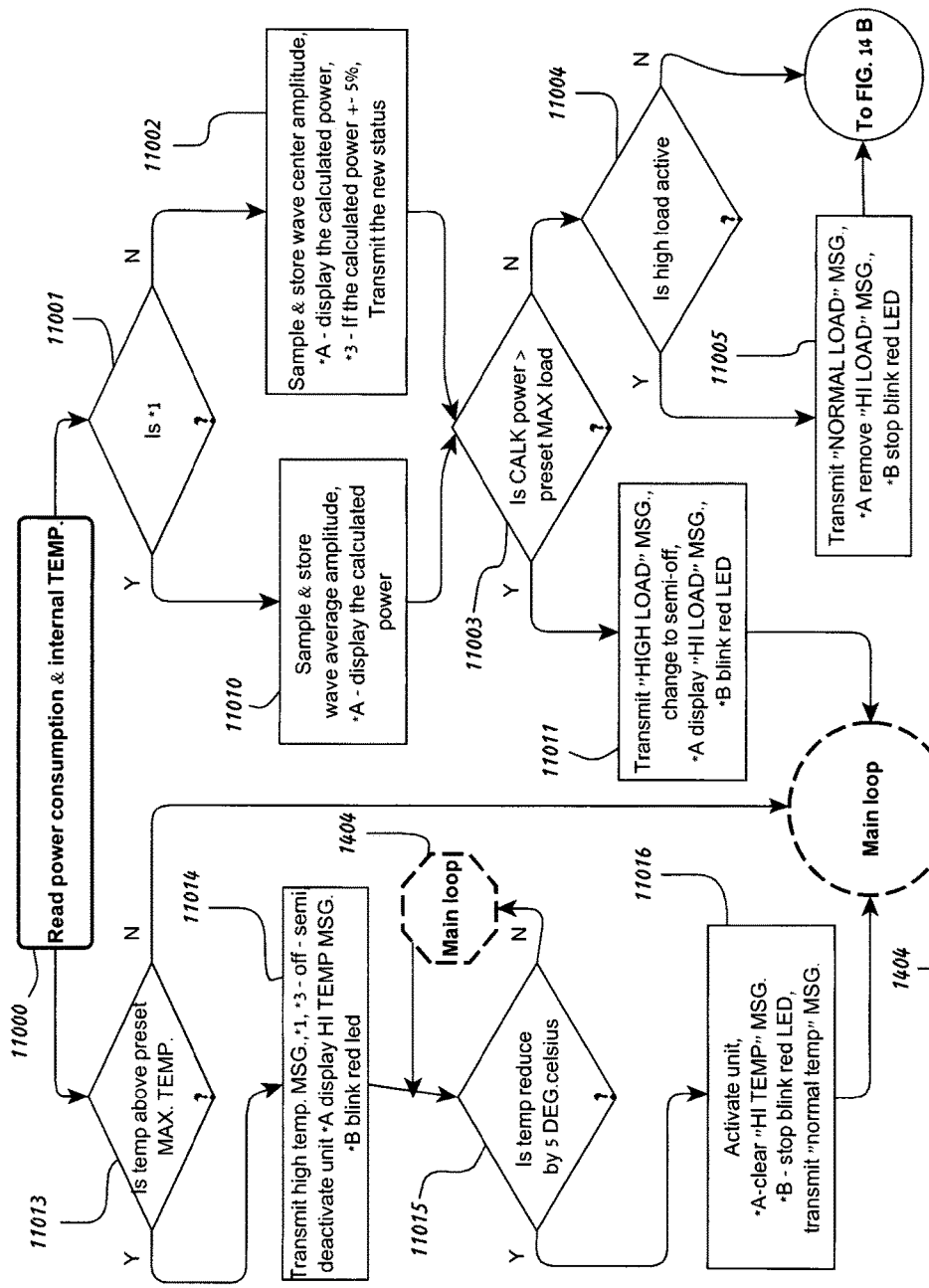
FIGS. 14A, 14B A smart load control power consumption flowchart
Figure 14B:
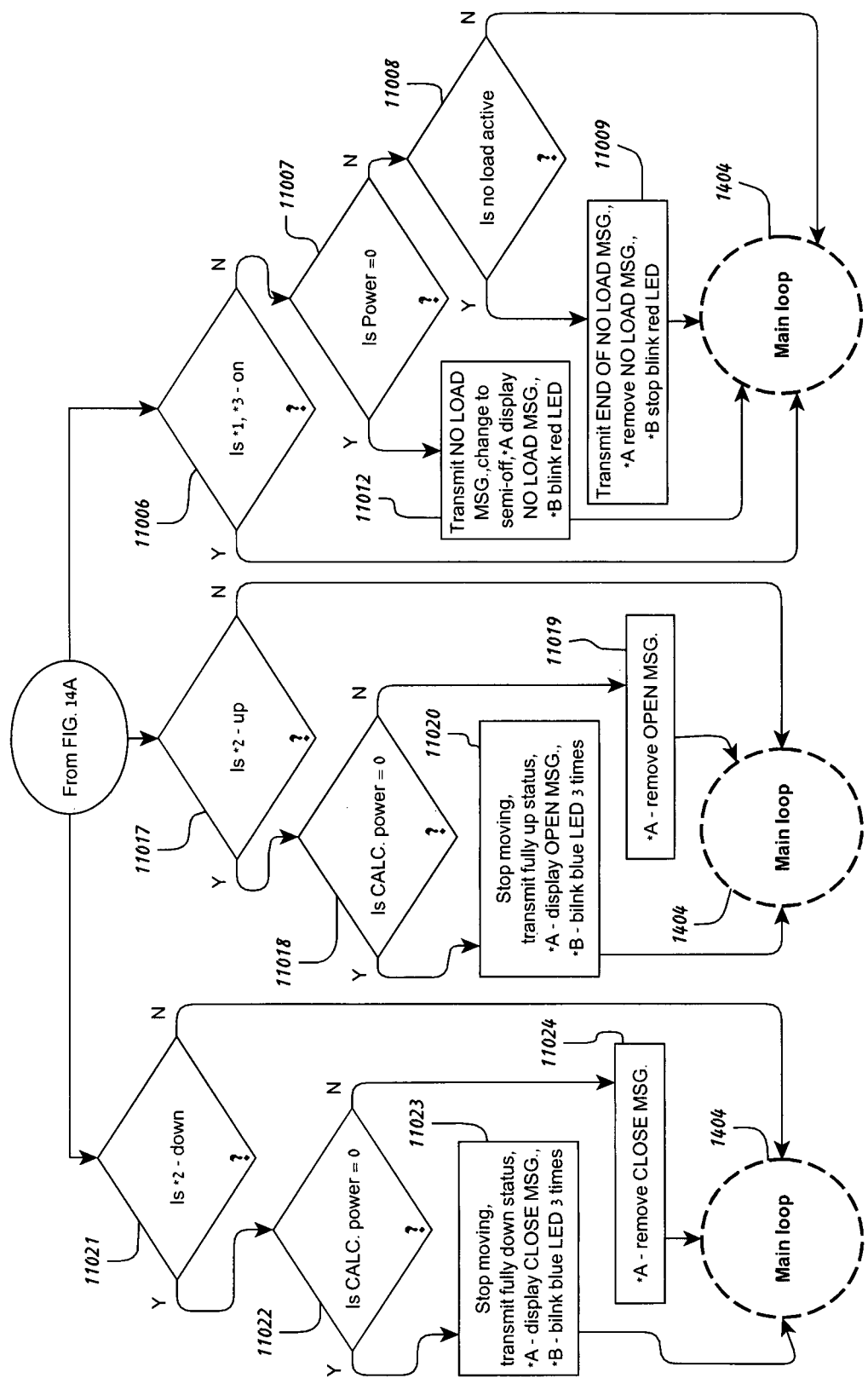
Figure 15:
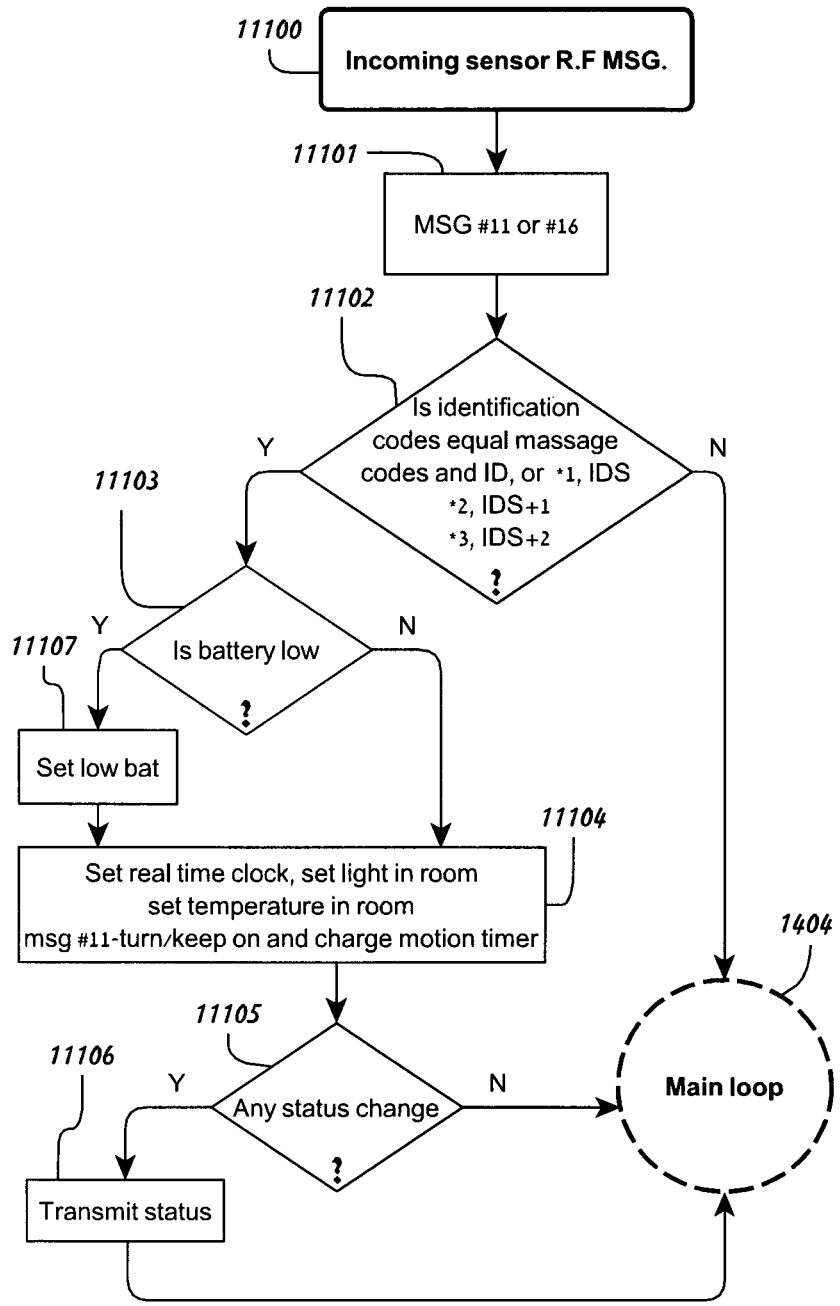
FIG. 15 A smart load control unit sensor MSG. flowchart
Figure 16A:
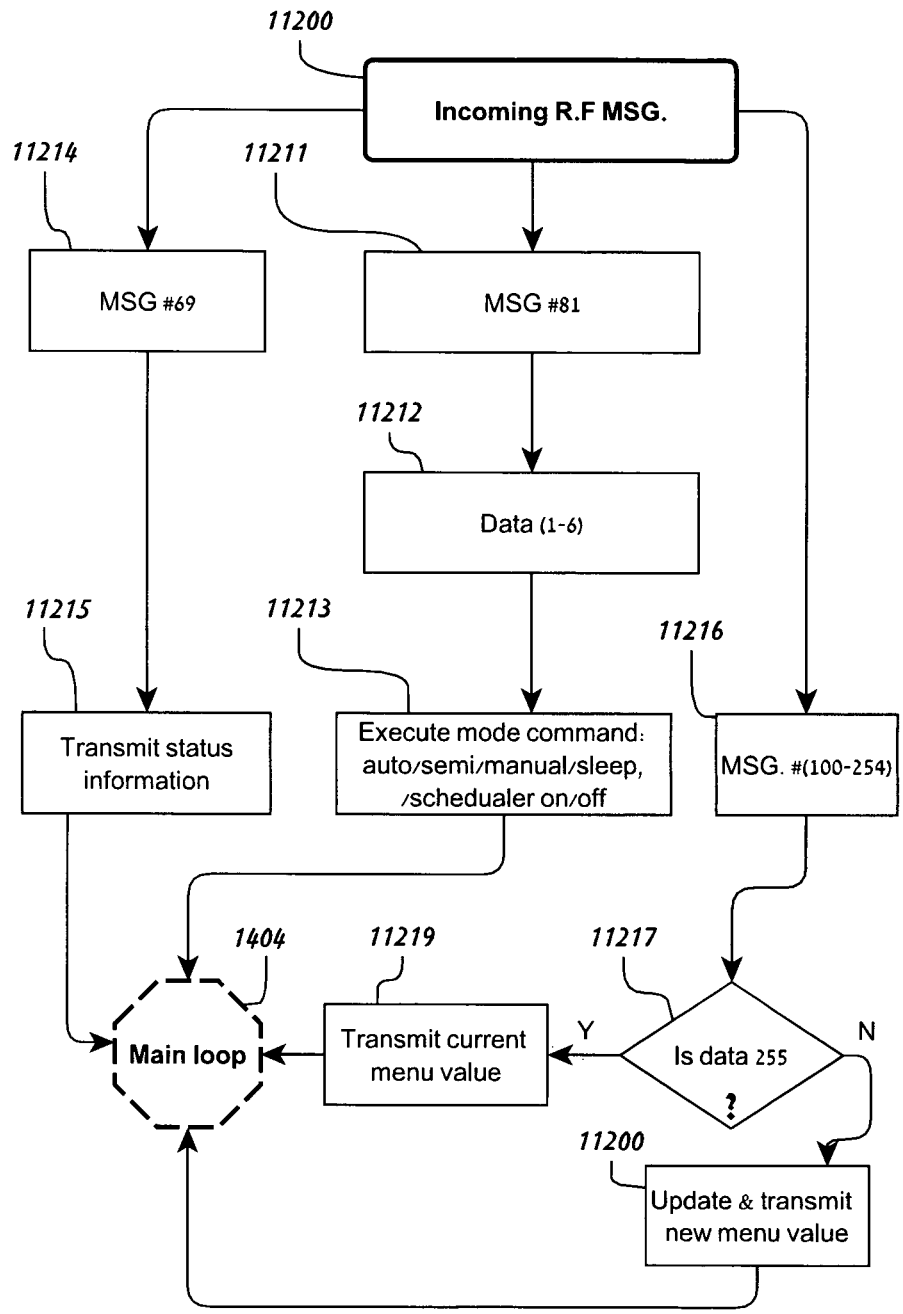
FIGS. 16A, 16B A smart load control unit R.F. messages flowchart
Figure 16B:
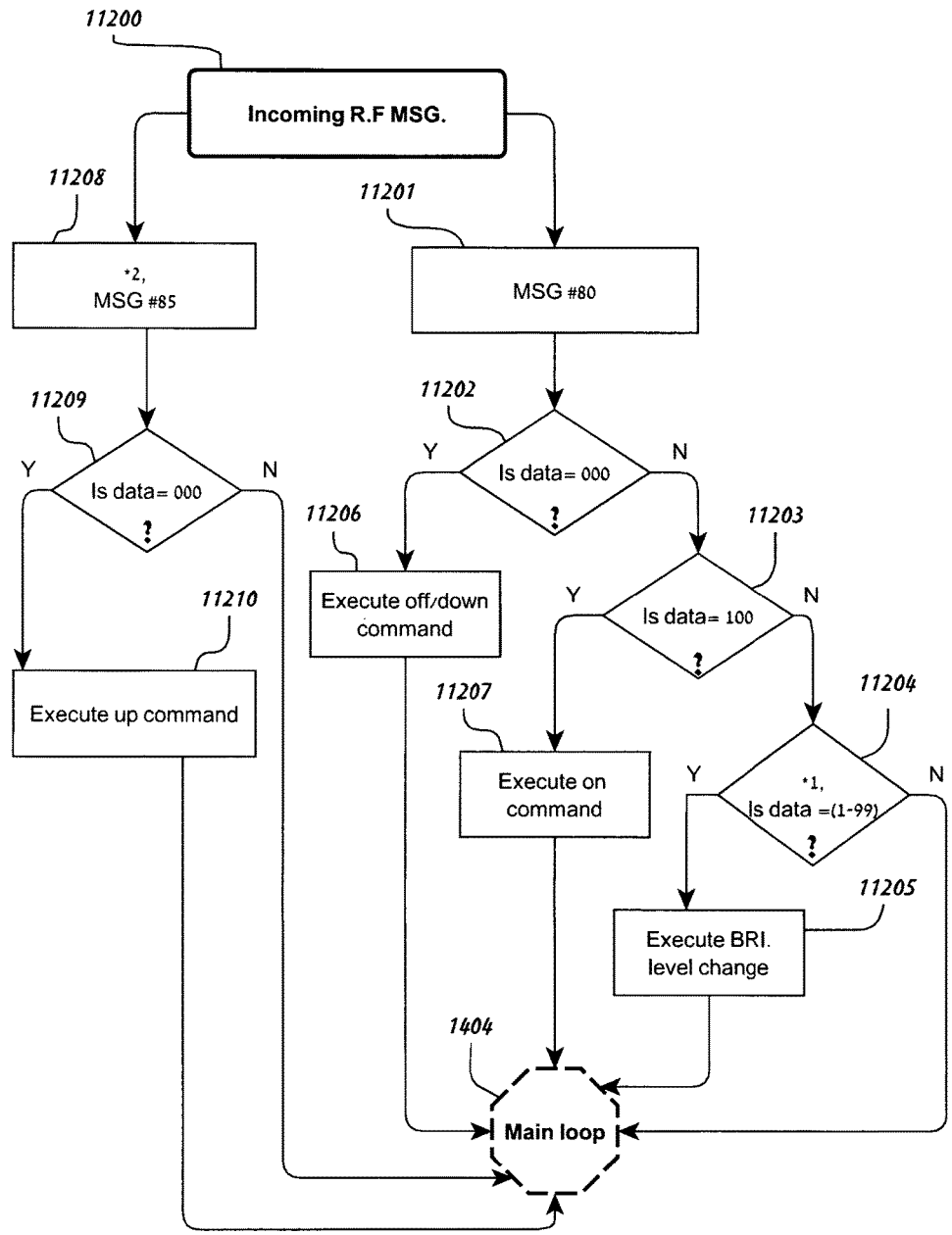
Figure 17:
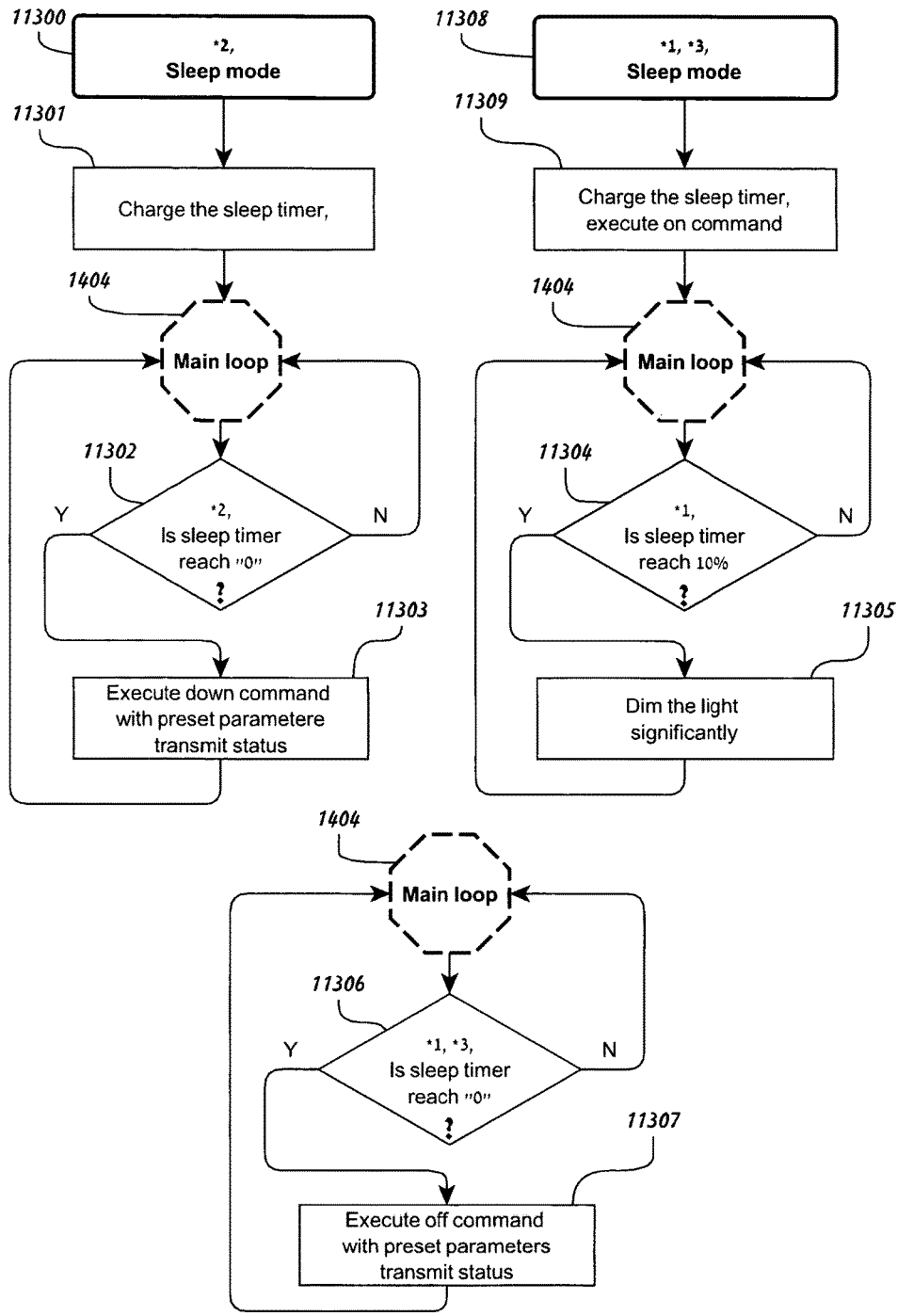
FIGS. 17, 18, 19A, 19B A smart load control unit modes and MSG. flowchart
Figure 18:
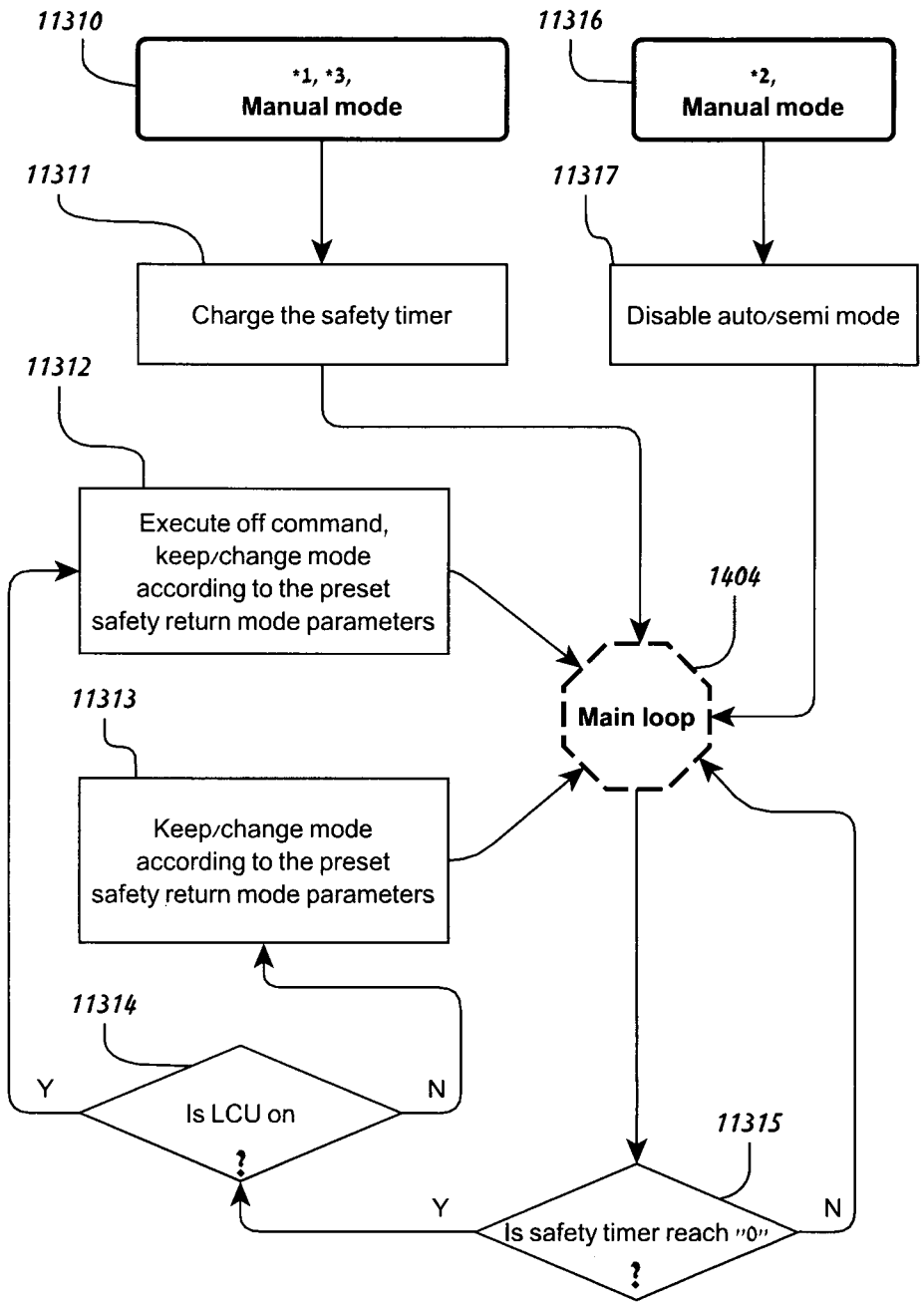
Figure 19A:
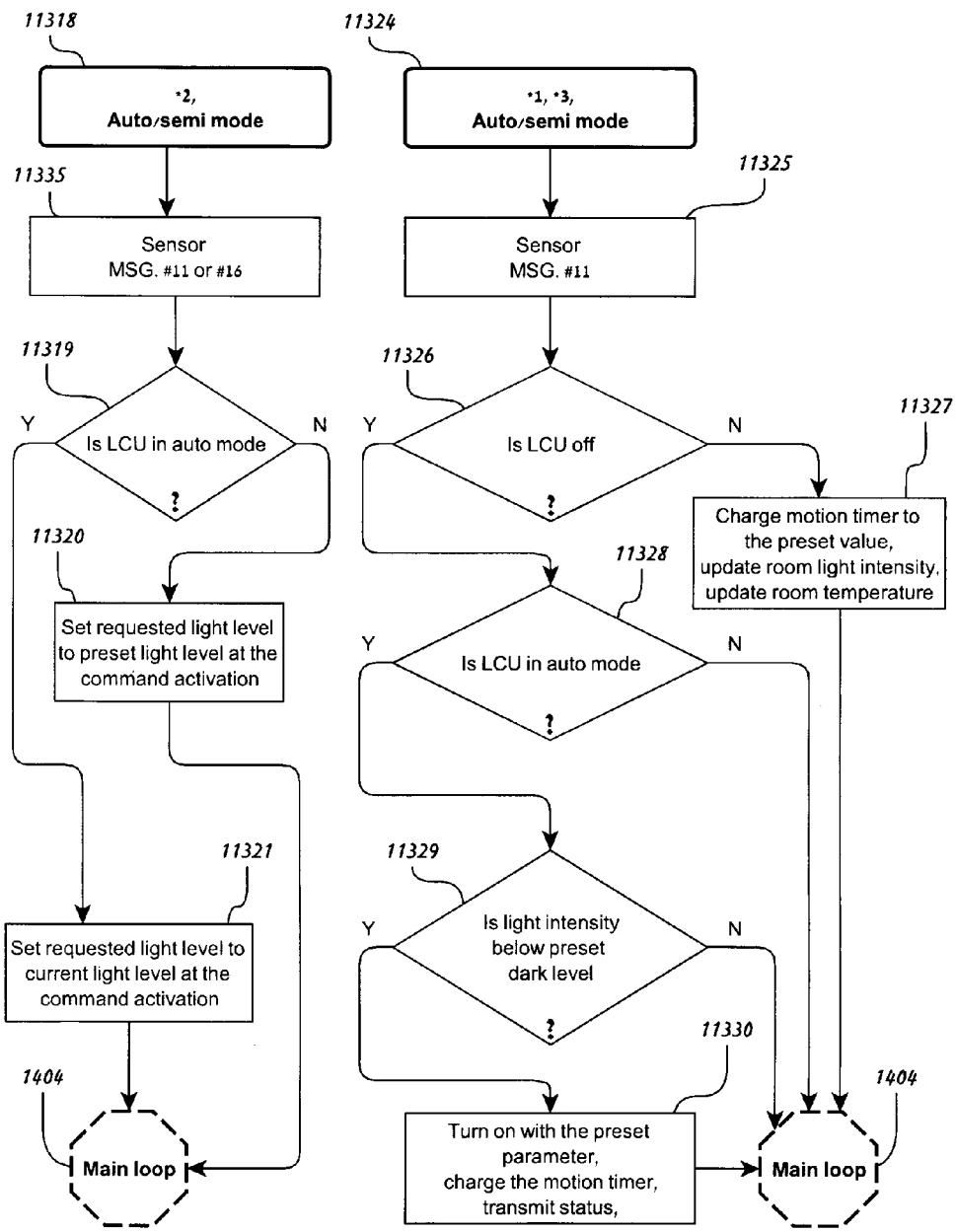
Figure 19B:
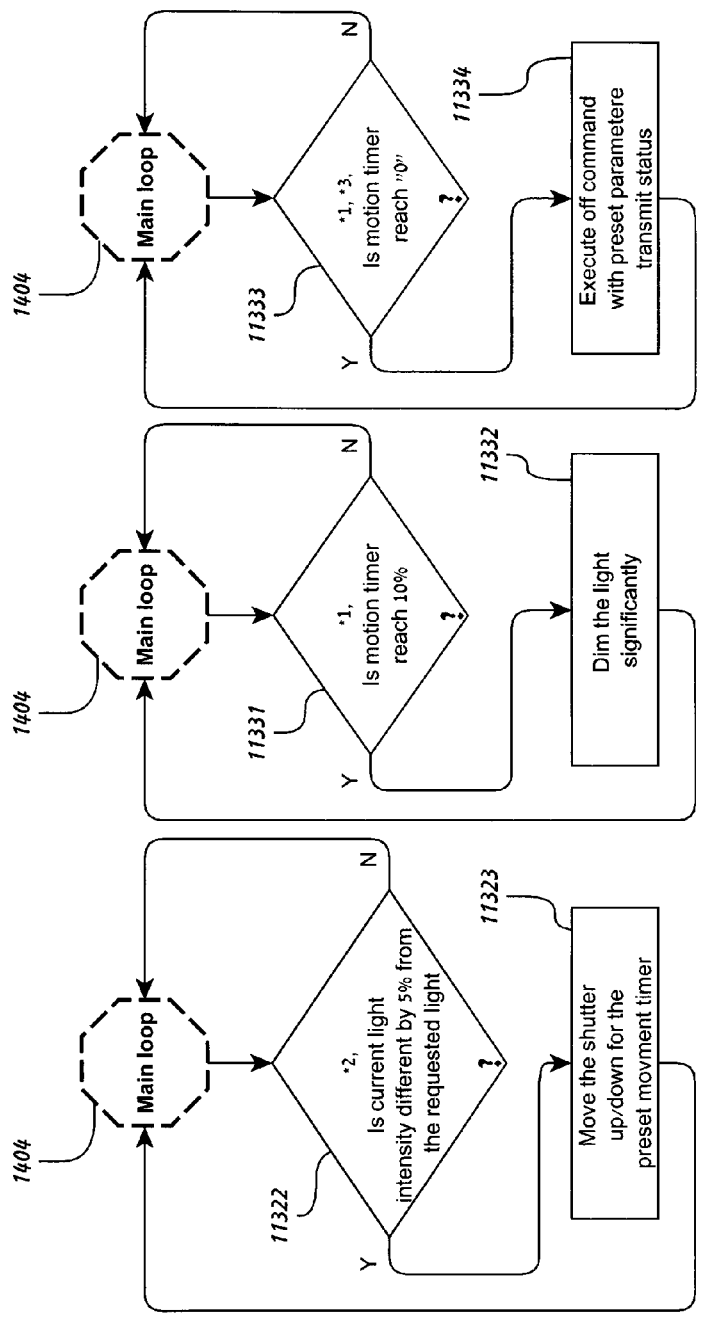

FIGS. 15A-19B detail smart load control flowcharts, the MCU may communicate via SPI protocol data to and from the R.F wireless Transceiver 1111, in order to receive messages from any automated load control system unit and to transmit messages to any automated load control system unit via the wireless link 7. FIGS. 14A, 14B detail a smart load control power consumption flowchart, the MCU receive input from the load power measurement device 1112, displaying the amount of power consumption in watts on the optional text and graphics display 1108, or store it and use the power consumption measurement to protect the smart load control unit 1.

When power consumption reads more than the user maximum power consumption pre define configuration, the Smart load control unit 1, will automatically disconnect the power from the load 1105. In the present invention the load control unit 1, able to control lights and/or electric shutters/shades or any type of load 1105, and therefore the optional text and graphic display 14, or the status LEDS acts differently between these options.

Local Configuration or Remote Configuration

These commands enable the user to configure all the internal menus. The LGU with a display can be configured from its display or remotely by RF, whereas the LGUH (smaller size) can only be configured remotely from RF.

When the Smart load control unit 1 *A, is in the setup mode the optional text and graphic display 1108, will show menus for each selectable options of the smart load control unit 1. Each menu display includes a menu number, textual header and three digits input variable. Each menu number stored address is menu number +100. Either load control unit 1 with optional text and graphic display *A or Smart load control unit 1 without the optional text and graphic display *B can be remotely configure by sending R.F. configuration command #100-254 to read and update each addressable menu.

When the Smart load control unit 1 *A, is in the setup mode the optional text and graphic display 1108, will show menus for each selectable options of the smart load control unit 1. Each menu display menu number, textual header and three digits input variable.

*1,*2,*3,*AB, A Menu number 1 named "RTN STATUS", the value will set the time from the last status change of the Smart load control unit 1 through secondary ID code(IDS), until the Smart load control unit 1, wirelessly transmit a message with the new status.

When=000 disable RTN STATUS. When >0 enable after 500 ms status return through ID and return status multiple of 200 ms, status return through IDS.

When >200 will not return status when command received from computer interface unit or keypad unit 6.

The unit will transmit its new status after preferably 500 ms to ensure the user does not wish to change unit status anymore. This can avoid transmission of status messages between fast, possibly accidental status mode changes.

*1,*2,*3, *A, A Menu number 2, named "OLED SAVER" may display in number 0-254 seconds until the display will turn off(screen saver).

*AB, A Menu 3, named "BRIGHT" or "COLD/HOT",

*1, the input number will set the brightness level 0-100 that the Smart load control unit 1, will use after an AC or DC power failure and When light turn on and menu number 15 named: "RTN LEVEL" selected to 2.

*3, =1 COLD will operate until temperature is below menu #15 , =2 HOT will operate until temperature is above menu #15.

*1,*2,*3,*AB, A Menu number 4 named "RTN POR", after power failure the Smart load control unit 1, will be set to selected state.

*1,*2,*3—>100 Scheduler ON

*1,*3, =1—ON and AUTO, 2—OFF and AUTO, 3—ON and SEMI, 4—OFF and SEMI,

*5—ON and Manual,

*6—ON and Manual.

*2=1—AUTO, 2—SEMI, 3—Manual.

*1,*2,*3,*AB, A Menu number 5 named "SAFETY RTN" or "SWITCH TYPE", when safety timer countdown will reach zero, the smart load control unit 1, will change to selected mode or selected switch type,

*1,*3—=1 AUTO, =2 SEMI, =3 MANUAL

*2, =1 momentarily switch only, =2 toggle and momentarily switch.

*1,*2,*3,*AB, A Menu number 6 named "AUDIO" or "LEDS STATUS", enables the Smart load control unit 1 *A, to have different audible feedback to different mode selection and actuators operations and display RSSI level. *B, select modes and operation LEDS status, On Smart load control unit 1

*A, =0 no audible feedback, =1 with audible feedback, >100 display R.F.

Received signal strength indication (RSSI level).

*B=1 Always use modes and status LEDS, =2 use modes and status LEDS only when ON state, =3 when any mode or state change use modes and status LEDS for 5 seconds and then turn them off.

*AB, A Menu 7, named "OFF DELAY" or "UP TIMER", or "ON DELAY"

*1, the input number 0-255 will set the "OFF DELAY" number of seconds from an OFF command that is generated by any wireless unit in the automated load control system like the Sensors unit 2, or the computer interfacing unit 3, or by end period of any timer or by user actuating the OFF actuator, until the smart load control unit 1, will change to the OFF state, When the countdown of the off delay timer will reach zero. If the OFF command received from the remote control 4/keypad unit 6, the off delay timer will be ignore by the Smart load control unit 1,

*2, the input number 0-255 will set the "UP TIMER" maximum number of seconds for the up timer.

*3, the input number 0-255 will set the "ON DELAY" number of detections needed for the smart load control unit 1 to consider as "presence detected" within a tie frame of (number of detection multiple by 2) in seconds.

A menu 8, named "MOTION TMR" or "DOWN TIMER",

*1,*3, the input number 0-255 will set the number of minutes for the motion timer countdown in the "AUTO" and "SEMI" mode. Every motion detection will preset the motion timer to the pre-configured value again. When the motion timer reach zero the Smart load unit 1, will set to OFF state.

*2, the input number 0-255 will set the maximum number of seconds for the DOWN timer.

*AB, *1,*2,*3, A Menu 9, named "SLEEP TMR" the input number 0-255 will set the number of minutes to the sleep timer countdown. When the sleep timer reach zero the Smart load unit 1, will set to OFF/DOWN state and change the Smart load unit 1, mode to "MANUAL",

*AB, A Menu 10 named "SAFETY TMR", "ACTIVE TMR"

*1,*3, the input number 0-255 will set the number of hours for the safety timer countdown. The safety timer will activate each time the Smart load control unit 1, change to "MANUAL" mode and safety timer is not set to zero. When the safety timer reach zero it enable the smart load control unit 1, to change to "OFF" state and to change/keep the mode of the load control unit 1, according to the pre selected option at menu 5,

*2, the input number 0-255 will set the number of seconds for the active timer countdown, to execute up/down command in auto/semi mode.

*1,*2,*3,*AB, A Menu 11, "SENSOR TYPE" if set to 1, enable the Smart load unit 1, to receive and use wireless messages information from all the available sensors comprised in the sensors unit 2, if set to 2 enable the Smart load unit 1, to receive and use wireless messages information from only the light sensor, if set to 3 the Smart load unit 1, will not use any sensors comprised in the sensors unit 2,

*1,*AB, A Menu 12, named "SWITCH TYPE" if set to 1, define the load as dimmable load, if set to 2, define the load as energy saving like fluorescent load with limited dimming capability, if set to 3 define the load as ON (brightness 100)/OFF (brightness 0) state only,

*1,*AB, A Manu 13, named "FADE SPEED" the input number 0-255 define in ⅒ second, the time for the fade in and out, in according with fitted load as selected in menu 12, scalable to the range the level need to be change to.

*1,*2,*AB A Menu 14, "DARK LEVEL",

*1, the input number 0-255 will define the user preference for a light level that user would like the Smart AC load unit 1, to consider as a night.

*A, While stationary on this menu if a sensors unit 2 is available the display will show also three digits blue color number representing the current room light.

*2, number 0-255 will define the user preference for a light level that user would like the Smart load unit 1, to use as pre define requested light at semi mode.

*1,*3,*AB, Menu 15, named "RTN LEVEL" or "MIN/MAX TMP",

*1, if set to 1, after an OFF state the Smart load control unit 1, will return to the last brightness level that was in use, if set to 2 after an OFF state the Smart load control unit 1, will set to the pre-configured brightness level at menu 3.

*3, the input number will set a requested temperature in number of degrees Celsius, for example.

*1,*2,*3,*A, A Menu 16, named "MN CONTRAST", the input number 128-146, will set the minimum contrast level the display 14, will be set for when in OFF state.

*1,*2,*3,*AB, A menu 17, named "CHANNEL", the input number 0-255, will define the RF wireless transceiver 19, operation frequency in the selected Band.

*1,*2,*3,*AB, A Menu 18, named "HOUSE 1", the input number 0-255 define HOUSE 1, code to privately identify the Smart load control unit 1,

*1,*2,*3,*AB A Menu 19, named "HOUSE 2", the input number 0-255 define HOUSE 2 code add to the HOUSE 1, code and both codes will privately identify the particular Smart load control unit 1,

*1,*2,*3,*AB, A Menu 20, named "ROOM", the input number 0-255 define ROOM code add to the HOUSE 1 code and the HOUSE 2 code together this codes will privately identify the particular Smart load control unit 1,

*1,*2,*3,*AB, A Menu 21, named "UNIT SY" or "GROUP" the input number 0-255 define UNIT SY code add to the HOUSE 1 code and HOUSE 2 and room codes, together this codes will privately identify the particular Smart load control unit 1.

*1,*2,*3,*AB, A Menu 22, named "UNIT ID", the input number define UNIT ID code add to the HOUSE 1 code and the HOUSE 2 code and the ROOM code and the UNIT SY code, together this codes will privately identify the particular Smart load control unit 1

*1,*2,*3,*AB, A Menu 23, named "SEC UNIT ID", the input number 0-255 define the secondary identification code to create group for several Smart load control units 1

*1,*2,*3,*AB, A menu 24, named "UNIT TEMP", the input number 40-90 will define the maximum Celsius degrees of the internal temperature allowed to be in the Smart load control unit 1. In case the internal temperature of the Smart load control unit 1, reach this value the unit will execute off command and disable the smart load control unit and wirelessly transmit high temperature Message, until the smart load control unit 1, will resume to the internal temperature limits.

*1,*AB, A Menu 25, named "TIMERS WARN", the input number will define at what reaming percent of the current active "MOTION TMR" the light will significantly dimmed, in order to warn the user that the time period is about to end and light will go OFF shortly.

*1,*2,*3,*AB, A Menu 26, named "MAX LOAD", the input number 0-255 will define the maximum power that the Smart load control unit 1, will deliver to the load 1105, before it will reduce the power to match the limitation and wirelessly transmit and high load Message.

*1,*AB, A Menu 27, named "GATE", the input number is 20-255 define number in micro second for the gate duration.

*1,*AB, A Menu 27, named "GATE", the input number. The delay is defined in milliseconds, that is half AC wave is 8-10 milisec at 50/60 Hz, so 0.1 is the needed resolution to set up limits.

*1,*AB, A menu 28, named "MN SWITCH", the input number 0-100 define number multiply by 0.1 ms define the minimum time between the zero cross to the time of firing the switching device at a maximum brightness.

*1,*AB, A menu 29, named "MAX SWITCH", the input number 0-100 define number multiply by 0.1 ms for defining the maximum time between the zero cross to the time of firing the switching device at minimum brightness.

*1,*2,*3,*AB, A menu 30-33, switches 1-4, named "SWITCHS SENSATIVIY", the number set the different in level required to acknowledge a key press.

*A, When the last menu ends, the Smart load control unit 1, will enter into continually transmit mode and display a vertical color bar moving on the optional text and graphic display 14, notifying the user that the smart load control unit 1, is now transmitting definitions and identification codes to the remote control 4, selected channel and to the sensors unit 2, in order to pair (program with the selected HOUSE1, HOUSE 2, ROOM, UNIT SY, UNIT ID, and SEC UNIT ID) with the particular Smart load control unit 1.

*AB, Each time a remote configuration message received, the Smart load control unit 1 will transmit an Acknowledge Message with the menu number and with the current menu value.

*1,*2,*3,*AB, A menu 100-139*, schedulers 1-8, Each has a menus for time, day, operation and mode commands.
Time—HH:MM
Day—1-7 and 9
Operation commands—
*1,*2,*3, =000 OFF/DOWN, =100 ON/UP.
*1, =001-099 brightness level.
Mode commands—
*1,*2,*3, =001 AUTO, =002 SEMI, =003 MANUAL, =004 SLEEP, =005 SCHEDULER ON, =006 SCHEDULER OFF.

Configuration Schedule tasks with any load locally and remotely

*A, The Smart load control unit 1, has 8 schedules tasks. At each option the user can select the particular schedule, the hour (0-24), minutes (0-59), DAY (1-7), COMMAND (0-100) and MODE (1-6).

A real-time clock update time input will be display for the user to update.

After the updating the smart load control unit 1, will reset and return to normal operation mode.

*AB, The Smart load control unit 1, has 8 schedules tasks. By R.F. commands 100-139 the user can configure the particular schedule with the hour (0-24), minutes (0-59), DAY (1-7), COMMAND (0-100) and MODE (1-6).

*1,*3, Command 000, will execute an OFF command or *2, will execute a DOWN command.

*1, Command 1-99, will execute a brightness level change command, if the light was in the OFF state it will also change to the ON state.

*1,*3, Command 100 will execute an ON command or *2, will execute an UP command.

Operation Mode with Lights or Other Load, Display Information

*A, The Smart load control unit 1, will show on the optional text and graphic display 14, the following information.

Mode description: "MANUAL", "SEMI", "AUTO", "SLEEP" in a white color, power consumption three digits number with "W" at the Suffix in a white color,
*1, vertical changeable size bar calculated to show a scale of 100 brightness levels in a white color, Warning messages "HI LOAD", "NO LOAD", "HI TMP", "LOW BAT" in red color, Active timer will be display as vertical changeable size bar calculated to show a scale of 10 levels of the reaming amount of time, with on top 3 digits dynamic moveable with the bar numbers showing reaming time and suffix character showing the current type of time units in use on the active timer, "S" for seconds, "M" for minutes and "H" for hours. Each timer has different colors. Graphical square indicators will be display for transmit in red and for receive in yellow.

When the Scheduled mode is active a real-time clock will be display on the left upper corner.

*B, the Smart load control unit 1, will illuminate LEDS as follow, Modes LEDS 1305-1308—Manual All LEDS off, Auto LED on, Semi LED on, Sleep LED on, Scheduler on LED on.

Operation status LEDS 1304—ON on, OFF off
Warning status LEDS 1304—Blinking red.

The warning status, such as a blinking red LED for example, may indicate a High load, high internal temperature, or No load.

Receive or transmit message status LEDS 1304—Receive/transmit blink led.

Operation mode with shutter load display information

*A, The Smart load control unit 1, will show on the optional text and graphic display 14, the following information, Mode description: "MANUAL", "SEMI", "AUTO", "SLEEP" in white color, Power consumption: three digits number with "W" at the Suffix in white color, vertical changeable size bar calculated to show a scale of 255 current room light level in yellow color, vertical changeable size bar calculated to show a scale of 255 user require room light level in white color, warning messages "HI LOAD", "HI TMP", "LOW BAT" in red color.

Active timer will be displayed as vertical changeable size bar calculated to show a scale of 10 levels of the remaining amount of time, with on top three digits dynamic moveable with the bar numbers showing remaining time and suffix character, showing the current type of time units in:
use on the active timer, "S" for seconds, 'M' for minutes, 'H' for hours.

When Scheduled mode is active, a real-time clock will be display on the left upper corner Graphical square indicators will be display for transmit in red and for receive in yellow.

*B, the Smart load control unit 1, will illuminate LEDS as follow,

Modes LEDS 1305-1308—Manual All LEDS off, Auto LED on, Semi LED on, Sleep LED on, Scheduler on LED on.

Operation status LEDS 1304—ON on, OFF off
Warning status LEDS 1304—Blinking red.
Receive transmit message status LEDS 1304—Receive/transmit blink led.
Fully open/close—blinking 3 tomes status LED.
General Operation of the LCU with any Load

*A, Each time any command is executing by the Smart load control unit 1, the optional text and graphic display 1108, may change its brightness from the configured low brightness level previously describe in menu 16, to the max brightness of the display when the smart load control unit 1, change to idle mode the brightness of the display will change from the maximum brightness to the pre-configured low brightness level previously describe in menu 16, after a time period, preferably 5 seconds.

While any command is executing, text and graphics display 1108, will remain at maximum brightness.

*AB, In the present invention Actuators 1109, has three different actuators as show in FIG. 1,2 and FIG. 1,3, UP/BRIGHT/ON actuator 1201/1301, DOWN//DIM/OFF actuator 1202/1303, mode selection MANUAL, SEMI, AUTO actuator 1203/1302, preferably mark on the faceplate of the smart load control unit 1, as, UP for shutter load 1105, and BRI for light load 1105, and
DOWN for shutter load 1105,
and DIM for light load 1105,

*AB, in the present invention, the R.F wireless transceiver is configured by the MCU to the selected operation parameters previously describe in the setup or remote configure menus number 17-23, The Smart load control unit 1, may have three actuators preferably located at the faceplate of the Smart load control unit 1, *A, when actuating and hold DOWN/DIM and then actuating the MODE simultaneity the unit will enter into the setup mode with 29 menus.

*A, Upon entering to menu 1, there will be a point marker over the first of the three input digit of each menu. The point marker show the current select digit, each actuating on the mode actuator will move the pointer to next digit, at the third digit the menu will be change to next one with the pointer again marking the first digit of the new menu. By actuating the UP/BRI the pointed digit will increase its value by one and the change will be shown. By actuating the DOWN/DIM the pointed digit will decrease its value by one and the change will be shown.

*A, In the setup mode when the user actuates DOWN/BRI and then actuate the MODE simultaneously with the smart load control unit 1, will leave the setup mode and enter the schedules setup mode.

When done the smart load control unit 1, will return to the normal operation mode.

*A, when reach the end of the last menu the Smart load control unit 1, will start transmitting its stored identification codes, actuating any actuator may terminate the continues transmitting process and the Smart load control unit 1, will return to normal operation mode. During the setup mode at any given time the user can actuate and hold the MODE and then actuate the DOWN/DIM simultaneity to exit the setup mode into the identification transmitting mode.

*B, when select OFF for more than 20 seconds, the Smart load control unit 1, will start transmitting its stored identification codes for 5 times, and then will return to normal operation mode. The use of transmissions:

1. Long press OFF then unit TX its data out, by doing so you can TX all LGU identification codes to any remote control or keypad to program a channel, eliminate the need to use the CIU computer bridge or any software.

2. The user can listen in an application software via the IGHC to transmit it on to recover the identification code from IGHH.

3. When a long press OFF and MODE, the unit will do a full hardware reset returning all its menus to factory defaults.

*B, when select OFF for more then 20 seconds and also select the MODE the Smart load control unit 1, will return all its stored information to the factory default values.

*AB, When the Smart load control unit 1, transmit its identification codes it acts as wireless programmer to pair the remote control unit 4, selected channel, and the sensors unit 2, or any other unit of the automated load control system that needs to be pair to this particular Smart load control unit 1, by transmitting the following codes HOUSE1 HOUSE2, ROOM, UNIT SY, UNIT ID, SEC UNIT ID to be store by the receiving unit.

By using this method of programming the units is automatically, error free, programmed. In this mode the transceiver of the Smart load control unit 1 may be automatically configure to a fix frequency channel and fix identification codes, the receiving component may also be configured to the same fix frequency channel and fix identification codes, enabling the communication between this units.

When the day equals 9 by receiving message #16 from sensors unit, the internal real time clock of the smart load control 1 will not advance the internal day until new message #16 from sensor unit received with day not equal to 9. The special day #9 scheduler tasks, if configured, will be executing on a 24 hour loop base, without using the motion sensor.

During a Holy Day, the usual days counting 1 to 7 and rollover to 1 is suspended. Usually, an internal clock will keep days in 1-7 loop, when RCV MSG 16 with the 9 the LGU will not advance the day any longer until MSG 16 will be received indicating a normal day.

On day 9 the LGU can execute schedulers set for a holy day forever.

System Operation During a Holy Day

When schedule mode is activated and one of the eight schedule tasks time and day is equal to the current time, the Smart load control unit 1, will execute the preconfigured commands and mode change, for the particular scheduled task.

The schedule tasks with day equal 9 will operate in continuance 24 hour loop forever until the day will not be equal 9.

A schedule task with a mode change to mode 5 (Activate Schedules), will work even when the schedule mode is deactivated.

Regarding the operation description use of the phrase "executing" and then "command name" means, any command from the following:

UP/BRI/ON/DOWN/DIM/OFF/MANUAL/AUTO/SEMI/SLEEP activated by Actuated on that particular actuator on the faceplate of the smart load unit 1. The BRI command is able from the time the user actuate and hold the BRI actuator until it is no longer activated.

The DIM command is enabled from the time the user actuates and holds the DIM actuator until it is no longer activated.

The MANUAL/SEMI/AUTO command is toggle by actuating the MODE actuator, or it's select by receiving message number 81 from either the remote control 4, or the computer interface unit 3, or any other system unit.

The SLEEP command is select when actuating and hold the MODE actuator for at least preferable one second. Or it is select by receiving message number 81 from either the remote control 4, or the computer interface unit 3, or any other system unit.

The SCHEDULER ON/OFF command is select when *A, actuating and hold the BRI+MODE actuators for at least preferably one second. *B or by actuating and hold the ON/UP actuator for more then 10 seconds,*AB Or it's select by receiving message number 81 from either the remote control unit 4, keypad unit 6, or the computer interface unit 3, or any other system unit.

In the normal operation mode, the Smart load control unit has an user friendly, simple operation modes supported by the actuators 1203/1302, remote control 4, keypad unit 6, and computer interface unit 3. Although operation is very simple the smart load control unit 1, has a smart process to be able to control, user commands and other automated load control system units messages in order for the Smart load control unit 1, to perform the task's it designs to do.

Errors Handling

*1,*3, When state is ON and the load 1105, blown (zero power consumption), the smart load control unit 1, will recognize this state, and *A, it will show on the optional text and graphic display 1108, a red message "NO LOAD", or *B, blink status red LED, and it will activate the status message number 77, transmitter timer, if pre-configured. When the internal temperature is above a maximum pre-configured value, the smart load control unit 1 will recognize this state, and *A, it will show on the optional text and graphic display 14, a red message "HI TEMP", or *B, blink status red LED, disabling itself and it will activate the status message transmitter timer, if so pre-configured.

When power consumption is above a maximum pre-configured value, the smart load control unit LCU 1 will recognize this state, and

*A, it will show on the optional text and graphic display 1108, a red message "HI TEMP", or

*B, blink status red LED, de-activate itself, and it will activate the status message transmitter timer, if so pre-configured.

Operation Mode with an Illumination Load

Executing an "ON" command when light state is OFF

Turn ON the light to the brightness of the *A, visual graphical brightness level bar showing on the optional text and graphics display 1108. According to the limitation and specification of the switching type configuration and all other pre-configuration parameters, *B, illuminate status on LED,

*A, The optional text and graphics display 1108 will show the current power consumption of the load 1105, Activates the relevant timer according to the current selected mode, Activates the transmitter timer if pre-configured to send status message number 69, Executing an "ON" command when light state is ON The light will change to the maximum intensity available by the load 1105,

*A, The new power consumption will be shown on the optional text and graphics display 1108,

*A, The relevant timer will preset in accordance to the current selected mode,

Activates the transmitter timer if pre-configured to send status message number 69.

Executing a "BRI" command when the light state is ON

The light will bright in a scale of 100 levels in a pre-configured rate, from preset light level to the desired light level,

*A, Display the new visual graphical bright level bar,

*A, The new power consumption will be shown on the text and graphics display 1108, Activates the transmitter timer if pre-configured to send status message number 69.

Executing a "BRI" command when the light state is OFF

The light brightness level sets first to zero and then a normal ON and BRI command execution is perform.

Executing an "OFF" command when the light state is OFF

*A, Bright the optional text and graphics display 1108, for preferably 5 seconds to its maximum intensity.

Activate the transmitter timer if pre-configured to send status message number 69.

The OFF activation is delayed, so this function can be of use if the user likes to turn OFF and also needs to see his way out. Then—Off after a time delay.

Executing a "OFF" command when the light state is ON

The light will change state to OFF, with the limitation and specification of the switch type configuration and all other pre-configuration parameters,

*A, The new zero power consumption will be shown on the optional text and graphics display 1108,

*B, turn status on LED OFF.

When an OFF DELAY option is pre-configured to any amount of seconds, the state changing to OFF, will be delayed until the off delay timer will reach zero, while off delay timer is activated, it will be shown on the optional text and graphic display 14, during the activation of the off delay timer, sensors messages will be ignored.

When executing an OFF command not from the faceplate actuators of the load control unit 1, the off delay timer will be ignored by the load control unit 1.

The next ON light level will be selected by the optional configuration menu for the last light level or to a pre-configured light level and *A, a new visual graphical bright level bar will be shown on the optional text and graphic display 14, Activates the transmitter timer if pre-configured to send status message number 69.

Executing a "DIM" command when the light state is ON

The light will dim in a scale of 100 levels in a pre-configured rate, from preset light level to the desire light level,

*A, The new power consumption will be shown on the text and graphics display 1108,

*A, Display the new visual graphical bright level bar,

When reducing the brightness to 10%, further dimming commands will be ignored.

The minimal illumination level is limited because:

1. When dimming down it is hard to stop at low level without going to zero or OFF.

2. Regulations do not allow to dimming to a light level so low that the user cannot see, while there is power consumption.

Activates the transmitter timer if pre-configured to send status message number 69, Executing an AUTO"/"SEMI"/"MANUAL" modes commands AUTO/SEMI mode are the most energy saving and common. When sensors unit 2 detects motion, it transmits via the wireless link 7, to its paired AC load control unit 1 a message including: motion detected report, room current light level, room current temperature, status of the internal supporting battery of the sensors unit 2, and other sensors information.

The load control unit 1, checks and compares if the current room light equal or of less than the pre-configured dark level parameter value, and if so executes automatically the ON command and additionally activates and displays the motion timer for the pre-configured time.

The light will remain in the ON state until motion timer reach zero, an OFF command will be execute automatically.

If during the period of the motion timer a new motion detect message receive from the sensors unit 2, the motion timer will be preset to its pre-configured value.

At a pre-configured percentage of the motion timer minutes, preferably 10%, if the motion timer reach this level a significantly DIM command will be executed to notify and warn the user that light will change its state to OFF shortly, if the user executing any command or make a move in order for the sensors unit 2 to send new motion detect message, the motion timer will be preset and the light level will return to the light level that was in use before the significantly dim process, if the motion timer reach zero it will execute an OFF command.

While in the "AUTO" mode, if the user executes an ON command, the load control unit 1, will consider the command as a motion detect message, or if the user execution an OFF command the state of the light will change to OFF and the unit will remain in the "AUTO" mode.

The "SEMI" mode has the same function as the "AUTO" mode with one difference: it will never execute an ON command. The ON command must be executed by the user, and the load control unit 1 will load the motion timer and will process as if it is in the "AUTO" mode, if timer reach zero and light state change to OFF the light will not change to ON state again until the user will execute an new ON command.

Benefits of the Semi mode:

1. In lights—it will only turn light OFF automatically but not on.

If there are LGUs in the living room, one of them can be auto mode and all others can be semi, when enter the room auto mode IGH will turn on, the user manually turn on the semi mode IGH.

As long as the user is in the room all lights will remain on, when going out

All light will turn off automatically.

2. In the shutters, the SEMI set requires pre-selected light for it to keep.

The MANUAL mode will lock the state of the load control unit 1, for a pre configure period selected in the safety timer if any. When the safety timer reach zero if the unit was at ON state it will change to the OFF state, and it will change to the pre-configured option either to AUTO/SEMI mode or it will remain in the Manual mode.

Executing the SLEEP command, if light is OFF it will change state to ON activate pre-configured sleep timer, each time SLEEP mode is reselect by executing the ON command the sleep timer is preset, if executing an OFF command the mode will change to MANUAL. At a predetermined percent of the sleep timer minutes, preferably 10%, if the sleep timer reach this level a significantly dim command will be execute to notify the user that light will change state to OFF soon. When the sleep timer reach zero an OFF and MANUAL/AUTO/SEMI commands will be executed.

*A, Each time mode command is executing it will display the selected mode.

*B, Each time mode command is executing it will illuminate the correspondent modes LED. Each time mode command is executing it will activate the status message number 69, transmitter timer, if so pre-configured.

Operating Mode with Shutter Load

Executing an "UP" command

If pre-configured select to disable toggle UP/DOWN, the command will be ignored.

If other commands are executing now, terminate the command and delay for a predetermined period and continue, Move the shutter up for the pre-configured time in seconds configured in the up timer,

*A, display current power consumption of the load 1105, activate the relevant timer according to the current selected command 20

Activate the status message number 84, transmitter timer, if so pre-configured.

Executing a "DOWN" command

If pre-configured select to disable toggle UP/DOWN, the command will be ignored.

If other command is executing now, terminate the command and delay for a predetermine period and continue;

Move the shutter down for the pre-configured time in seconds configured in the down timer;

*A, Display current power consumption of the load 1105, and activates the relevant timer according to the current selected command.

Activates the status message number 84, transmitter timer, if pre-configured.

The message number 84 is the same as message 69 for light status message for shutters.

Transmitter timer can be an about 500 msec time delay, or when using IDS a time value as per menu number 1 pre-configured.

Executing a "BRI" command

If other commands are executing now, terminate the command and delay for a predetermined period, then continue:

The shutter will move up while the BRI command is executing.

The BRI command: A Long press on UP will move up shutter as long as it is pressed.

*A, The power consumption will be display on the display 14,

Activates the status message number 84, transmitter timer, if pre-configured.

Executing a "DIM" command

If other commands is executing now, terminate the command and delay for a predetermine period and continue.

The shutter will move down while the command is executing

A Long press on down will move down the shutter as long as it is pressed.

If there is another command, and the shutter was moving in any direction, it will stop its movement first and then execute the other command.

Note: shutter at end position may be indicated by zero power consumption if there is a control unit to stop its movement; otherwise, if the motor still moves the shutter and its movement is prevented, the power may increase. All the shutters preferably have edge limit switches.

*A, The power consumption will be display on the display 14,

Activate the status message number 84, transmitter timer, if pre-configured.

If the shutter reach fully open or fully close position determined by the zero power consumption while UP or DOWN command are active, UP or DOWN commands will be terminated,

*A, the OPEN/CLOSE will be display or

*B, status Blue LED will blink 3 times, and activates the status message number 84, transmitter timer, if so pre-configured.

Executing "AUTO" command sensors unit 2, send a wireless detect message when motion detect occur to its paired load control unit 1, the messages includes motion detect, room current light level, room temperature, status of the internal supporting battery of the sensors unit 2, and other sensors information.

The paired load control unit 1, take the current room light as the desired room light *A, displaying current room light level in a vertical bar and a desires room light level vertical bar side by side, the load control unit 1, in accordance to pre-configured parameters will try to keep and match the current room light with the desired room light by moving the shutter UP or DOWN and *A, displaying the new room light level bar side by side with the desire light level bar, each time a correction or movement of the shutter is performed.

Activate the status message number 84, transmitter timer, if pre-configured.

Executing "SEMI" command

The load control unit 1 performs the same functions of the AUTO mode. The desire light level is selected from a pre-configured parameter instead of the room current light that is in use at the Auto mode.

Activate the status message number 84, transmitter timer, if pre-configured.

Executing "MANUAL" command

The load control unit 1, will operate only from user command.

Activate the status message number 84, transmitter timer, if so pre-configured.

Executing "SLEEP" command

Executing the SLEEP command, will activate and pre-configure a sleep timer.

At a predetermined percent of the sleep timer minutes, preferably 10%, if the sleep timer reach this level a *A,3 a beep will sound to notify the user that the shutter will close soon. When the sleep timer reach zero a DOWN and MANUAL/AUTO/SEMI commands will be executed.

The command sets a timer that, when reaching zero, will close the shutter.

*A, Each time mode command is executing it will display the selected mode.

*B, Each time mode command is executing it will illuminate the correspondent modes LED.

Each time mode command is executing it will activate the status message number 84, transmitter timer, if so pre-configured.

Operation Mode with a Power Load

Executing an "ON" command when load state is OFF

Turn ON the load,

*A, The optional text and graphics display 1108 will show the current power consumption of the load 1105,

*B, illuminate ON LED,

Activates the relevant timer according to the current selected mode,

Activates the transmitter timer if pre configure to send status message number 69.

Executing an "ON" command when load state is ON

*A, The relevant timer will preset in accordance to the current selected mode,

Activates the transmitter timer if pre-configured to send status message number 69.

Executing an "OFF" command when the load state is OFF

*A, Bright the optional text and graphics display 1108, for preferable 5 seconds to its maximum intensity.

Activate the transmitter timer if pre configure to send status message number 69.

Executing a "OFF" command when the load state is ON

Turn OFF the load

The light will change state to OFF,

*A, The new zero power consumption will be shown on the optional text and graphics display 1108,

*B, turn ON LED OFF.

When an OFF DELAY option is pre-configured to any amount of seconds, the state changing to OFF, will be delayed until the off delay timer will reach zero.

While the off delay timer is activated it will be shown on the optional text and graphic display 1108, during the activation of the off delay timer, sensors messages will be ignored. When executing an OFF command not from the faceplate actuators of the load control unit 1, the off delay timer will be ignored by the load control unit 1. The next ON light level will be selected by the optional configuration menu for the last light level or to a pre-configured light level and *A, a new visual graphical bright level bar will be shown on the optional text and graphic display 14.

Activates the transmitter timer if pre-configured to send status message number 69.

Executing an "AUTO"/"SEMI"/"MANUAL" mode commands

AUTO/SEMI mode are the most energy saving and common, when sensors unit 2, detects motion, it transmits via the wireless link 6, to its paired AC load control unit 1, a message with motion detect, room current light level, room current temperature, status of the internal supporting battery of the sensors unit 2, and other sensors information.

The load control unit 1, if temperature option selected check and compare if the current room temperature equal to the pre configure required temperature value, and if so executes automatically the OFF/ON command and additionally if a motion detect activate and *A, display the motion timer for the pre-configured time. The load will remain in the ON state until motion timer reach zero, an OFF command will be executed automatically.

If, during the period of the motion timer, a new motion detect message is received from the sensors unit 2, the motion timer will be preset to its pre-configured value.

At a pre-configured percent of the motion timer minutes, preferably 10%, if the motion timer reach this level *A, 3 beeps will sound, notify and warn the user that load will change its state to OFF shortly, if the user executing any command or make a move in order for the sensors unit 2, to send new motion detect message, the motion timer will be preset, if the motion timer reach zero it will execute an OFF command.

Motion timer minutes: Each time there is a PIR detection, this timer is charge to its pre-configured value in minutes, i.e. 5 or 10 minutes. When there is no detection, this timer is counting down to zero; at zero an Off command will be executed.

The beeper is optional; if Off, only On switches with display.

While in the "AUTO" mode if the user executing an ON command the load control unit 1, will consider the command as a motion detect message, or if the user execution an OFF command the state of the load will change to OFF and the unit will remain in the "AUTO" mode.

The "SEMI" mode has the same function as the "AUTO" mode with one different it will never execute an ON command. The ON command must be execute by the user, and the load control unit 1, will load the motion timer and will process as if it is in the "AUTO" mode, if timer reach zero and load state change to OFF the load will not change to ON state again until the user will execute an new ON command.

The MANUAL mode will lock the state of the AC load control unit 1, for a pre configure period selected in the safety timer if any. When the safety timer reach zero if the unit was at ON state it will change to the OFF state, and it will change to the pre configure option either to AUTO/SEMI mode or it will remain in the Manual mode.

Executing the SLEEP command, if load is OFF it will change state to ON activate pre configure sleep timer, each time SLEEP mode is reselect by executing the ON command the sleep timer is preset, if executing an OFF command the mode will change to MANUAL. At a predetermined percent of the sleep timer minutes, preferably 10%, if the sleep timer reach this level *A, a 3 beep sound to notify the user that load will change state to OFF soon. When the sleep timer reach zero an OFF and MANUAL/AUTO/SEMI commands will be executed.

In Sleep mode, the user would like to go to sleep with lights on; after a Sleep timer ends, the lights will go off automatically.

The sleep first turns On the light, sets it to manual in order to keep On for the Sleep time setting. When a timer reaches zero, then lights will go off and manual, to allow the user to sleep without any light. The user, if he so desires, can subsequently turn the lights On again manually.

*A, Each time mode command is executing it will display the selected mode.

*B, Each time mode command is executing it will illuminate the correspondent LED.

Each time mode command is executing or change in power consumption accrue it will activate the status message number 69, transmitter timer, if so preconfigured.

Remote control unit (RCU)

Figure 26:
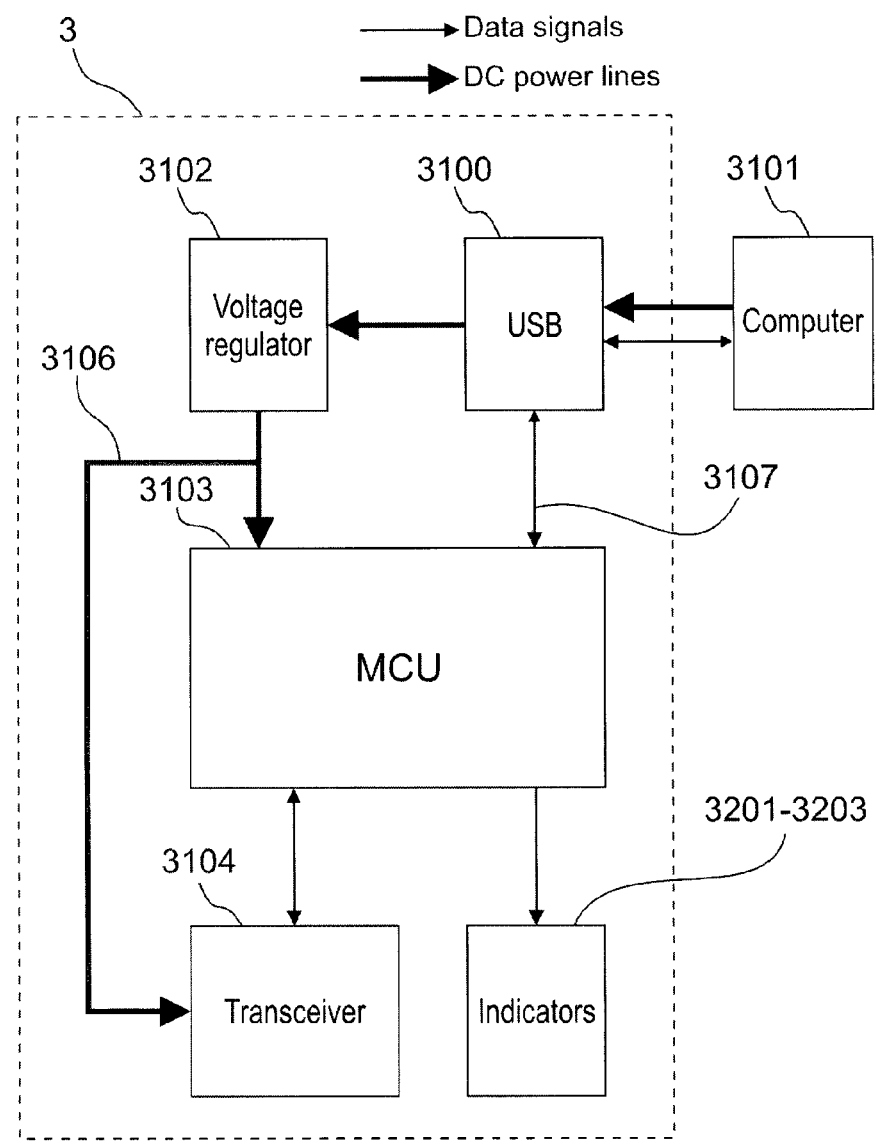
FIG. 26 A remote control unit (RCU) block diagram

FIG. 26 A remote control unit block diagram

Remote control unit 4, an electric block diagram, comprises:

An MCU 1400, micro controller unit, input, output, processing and storing data with the devices, A Battery 1402, distributes DC power to the devices A Wireless transceiver 1405, two way communication with other units in the automated load control system, An Actuators 1404, enables to execute user commands, A LEDs array display 1403, enable to display information needed on the LEDs array, A movement tilt sensor 1401, enables the unit to "wake—up" upon movement.

The remote control unit 4 comprises:

A battery 1402, distribute the DC power need to operate the remote control unit 4. In order to save power when the unit is not in use for a pre-configured period of time, the unit will change to a very low power mode "sleeping mode", The wireless transceiver 1405, enables the unit to receive programmable identification codes via a message from the Smart AC load control unit 1, or computer interface unit 3, and to transmit messages and commands to any paired smart AC load control unit 1.

Actuators 1404 are used by the user to execute and transmit different commands.

The LEDs 1403 will display the current Channel by illuminating a selected channel, and for special functions detailed elsewhere in this disclosure.

Movement sensor 1401 will sense any movement of the remote control unit 4, makes the unit wake up from the "SLEEP" mode, An MCU 1400 activate store and control all the others device connect to it, and enable all the required tasks to be performed by the remote control unit 4.

Figure 27:
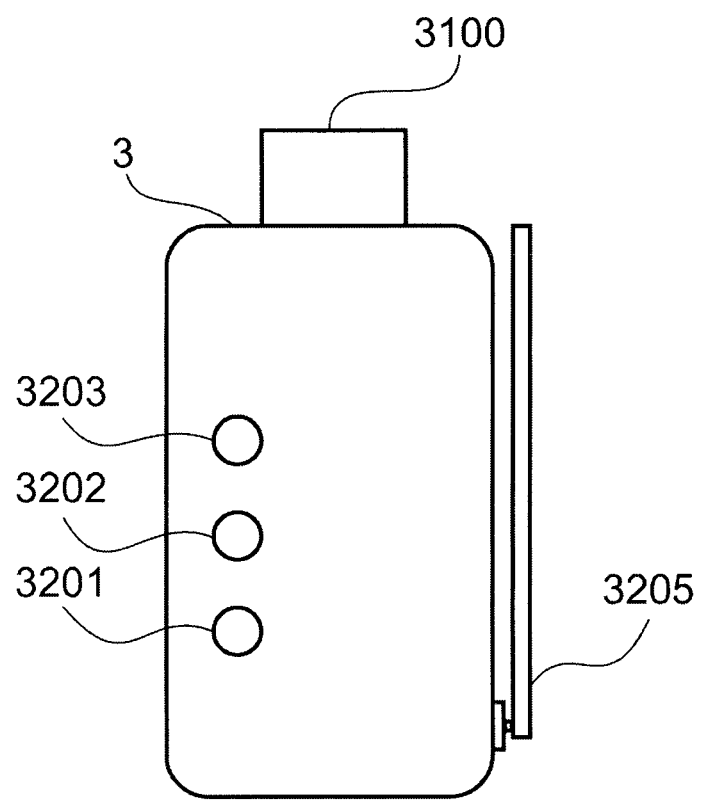
FIG. 27 A remote control unit faceplate structure

FIG. 27 A remote control unit faceplate structure

A remote control unit 4 faceplate, preferable layout is shown.

A LEDs 4205, mark from 1 to 20, indicate program options and selected channel.

Actuators 4206 and 4207 can change the selected channel and will mark it by illuminating the channel corresponding LED.

Actuator 4206 increments one channel and actuator 4207 decrements one channel Using a print faceplate 4208, the user can label each channel.

On the remote control and keypad there are programmable channels, each can store information and identification of a different smart LCU; it allows the user to operate this particular smart LCU from this channel.

Each LGU 1 has its own ID and IDS.

ID—Identification private code

Each LGU 1 has a fixed private channel assigned to it. The user can select a channel, to send commands via RF to the assigned IGHU.

IDS—Secondary Identification code (group).

Many LGUs 1 can use same IDS, the channel can send commands to the IDS (group) that is a group of devices, for example to turn Off several lamps at once, whereas using the ID (private) activates only one lamp.

Thus, one command can be executed on many LGUs sharing the same IDS.

A DIM/OFF/DOWN actuator 4204, will be described in details later on,

A BRI/ON/UP actuator 4203, will be described in details later on

A MODE MANUAL/SEMI/AUTO/SLEEP selection by actuator 4202, will be described in details later on A LEARN mode actuator 4201; to be detailed elsewhere in this disclosure.

Figure 28:
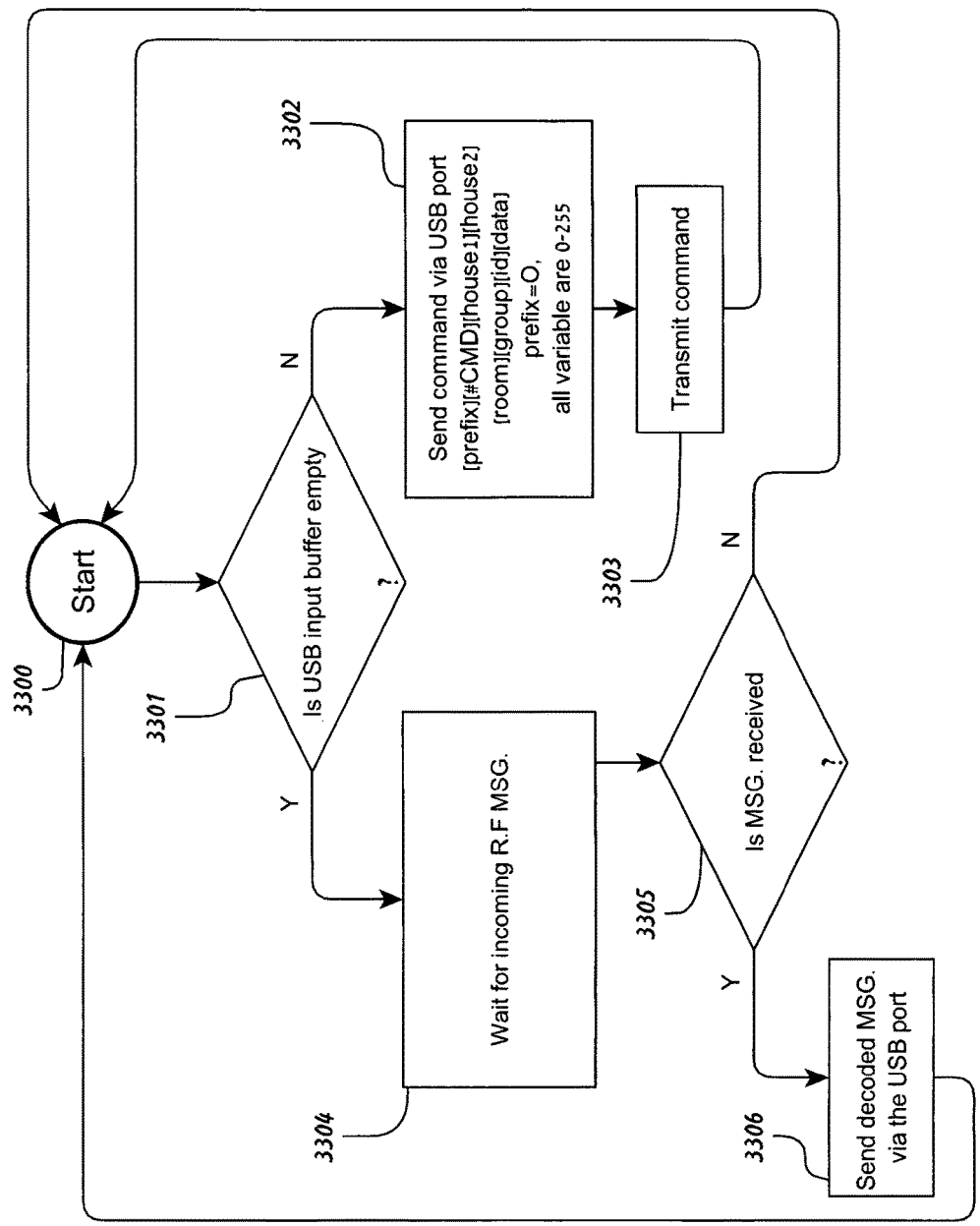
FIG. 28 A remote control unit flowchart

FIG. 28 A remote control unit flowchart for the Remote control unit 4, in normal and learn modes.

Although the operation of the remote control unit 4, is simple, it uses a highly intelligent smart algorithm that enables it to perform very complex commands.

In order to get started, the user need to pair selected channel in the Remote control unit 4, to particular smart AC load control unit 1.

The method to configure/program the remote control unit 4, channel is done automatically by receiving a configuration/identification message from the smart AC load control unit 1, you would like to be paired to.

The way the user does it is simple: all he needs to do is to select a desired channel with actuators 4206 and 4207, actuate the LEARN actuator 4201 twice, it will change the remote control unit 4, to the receive mode and illuminate LED on channel 20, to show that the remote control unit 4 is ready to receive configuration/identification message.

When the desired AC load control unit 1 will enter by the user a command to transmit its identification codes and When the configuration/identification message is received correctly by the remote control unit 4, it will flash the LED four times at channel 20 and four times the LED of channel 19, and return to the selected channel.

When there is a short press on the Learn switch 4305; when a long press on Learn switch, other function.

The selected channel is now paired and configured to operate the particular smart AC load control unit 1. If during the process the remote control unit 4, finds that the Smart AC load control unit 1, has a configured secondary ID that acts as a group with other smart AC load control unit 1, it will automatically configure the opposite LED 4205, channel on the faceplate in the remote control unit 4, to be able to pair to the group.

This option enables the user to execute any command, parallel to different smart AC load control units 1, that has the same secondary ID.

The remote control unit 4, is able to learn and record into any free channel any scenario dictated by the user. The way to do it is very simple, select a channel by actuating 4206 and 4207 and then actuate LEARN 4201, execute any command to any Smart AC load control unit 1, previously configured on the remote control unit 4, then execute any command to other, smart AC load control unit 1, previously configured on the remote control unit 4, and so forth. When done Actuate again the LEARN actuator, and the remote control unit 4, return to the normal operation.

Select the channel and actuate the BRI actuator, execute the recorded scenario at a very high speed, it will visually flash and run different LEDs to show start and end of the scenario.

In the normal operation mode, the remote control is straightforward and simple to use. The user selects a channel and then executes a BRI/ON/UP/DIM/OFF/DOWN.

To execute the ON command by actuating the BRI actuator, execute the brightness command by actuating and hold the BRI actuator until release, execute the UP command by actuating the BRI actuator, execute the OFF command by actuating the DIM actuator, execute the DIM command by actuating and hold the DIM actuator until release, execute the DOWN command by actuating the DIM actuator.

Sensors Unit (SU)

Figure 20:
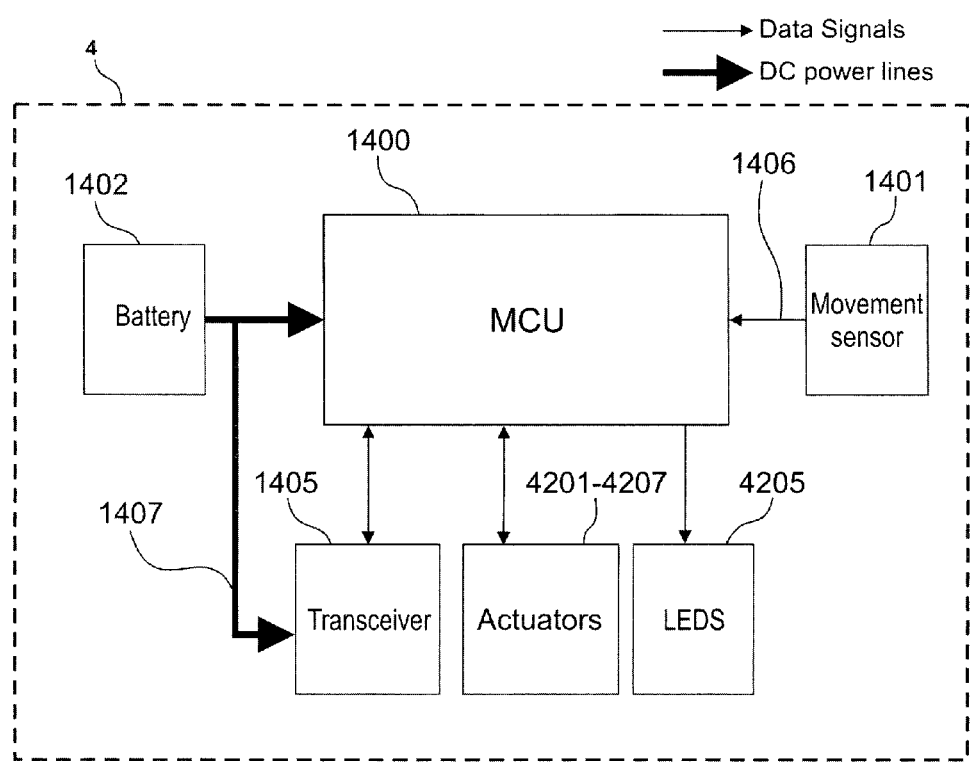
FIG. 20 A sensors unit (SU) block diagram

FIG. 20 A sensors unit block diagram

A sensors unit 2, an electric block diagram, comprises:

A light intensity sensor 2102, measures the light in the area,

A motion sensor 2101, detects the motion in the area,

A temperature sensor 2100, measures the temperature in the area,

An MCU 2104, input, output, processing and storing data with the devices,

A wireless transceiver 2108, two way communication with other units in the automated load control system, An Actuators 2107, will be described in details later on, A LEDs 2106, will be described in detail later on A solar panel 2103, collects the room light and converts it to electrical power, An automatic charger 2109, charges the battery from the solar panel, A rechargeable Battery 2110, NI-MH rechargeable battery, A optional smoke detector module 2105, Detects smoke in case of fire, A Real time clock 2111

The sensors unit 2 comprises:

A rechargeable battery 2110, distributes the DC power needed to operate devices A solar panel 2103, use the room light to supply power to the rechargeable battery, An automatic charger 2109, takes the power from the solar panel 43, and regulate it to the battery, A light intensity sensor 2102, check the current light in the room and send it to the MCU 46, A motion sensor module 2101, detects the motion in room, A temperature sensor 2100, measures the current room temperature, An optional smoke detector module 2105, detects fire or smoke in the room, A LEDs display 2106 illuminate when a motion has been detected and when the rechargeable battery 2110, is in low power condition, A wireless transceiver 2108, enable the unit to receive programmable identification codes via a message from the Smart AC load control unit 1, and to transmit messages and commands to any paired smart AC load control unit 1, and other system units.

An actuators 2107 will turn the sensors unit 2 ON, activate the LEARN mode, and disable the motion sensor An optional smoke detector module 2105, will activate in case of smoke detection, An MCU 2104, stores control and operating all the required tasks need to be performed by the sensors unit 2.

Figure 21:
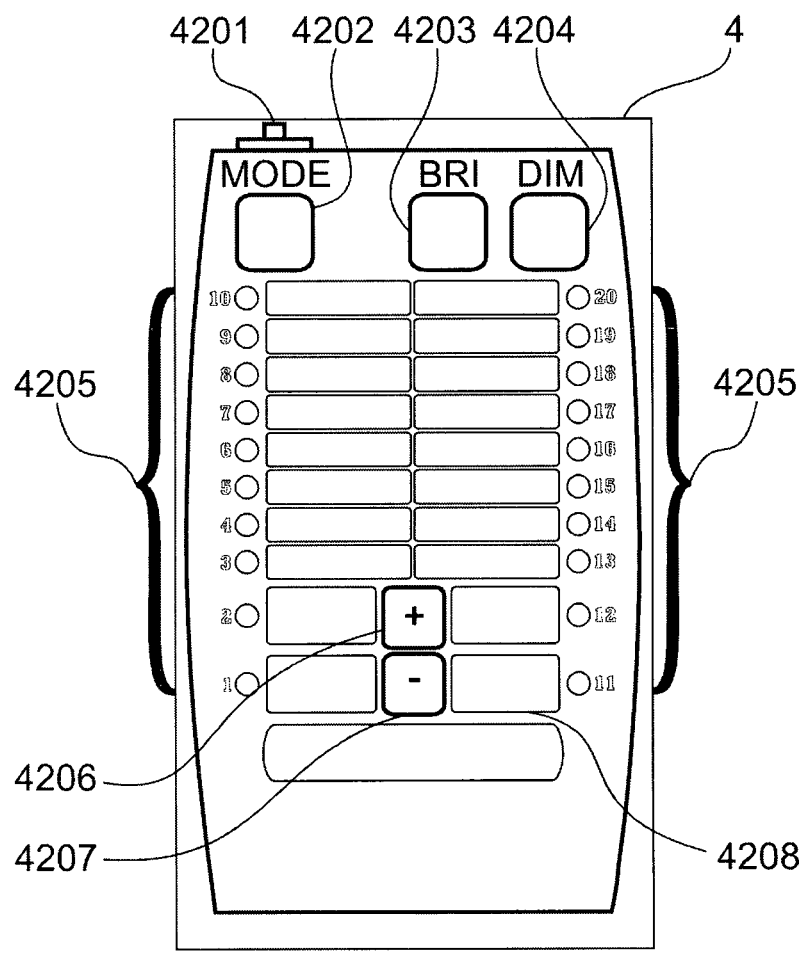
FIG. 21 A sensors unit faceplate structure

FIG. 21 A sensors unit faceplate structure

A sensors unit 2 faceplate, preferable layout,

A LED 2204, will illuminate each time an occupation sensor detects movements, A LED 2205, will illuminate when the internal rechargeable battery will drop below pre define voltage, An actuator 2203, will turn the unit ON, actuator 2202, will change the unit to the LEARN mode, An actuator 2201 will disable the motion/presence sensor and indication LEDs.

The sensors may include a Passive Infrared sensor (PIR sensor), other presence or movement detectors such as active infrared, microwaves, ultrasonic detectors or a combination thereof, etc.

A light intensity sensor 2206, measures the light in the area,

A Motion sensor 2207, detects the motion in the area,

A solar panel 2208, collects the room light and converts it to electrical power.

Figure 22:
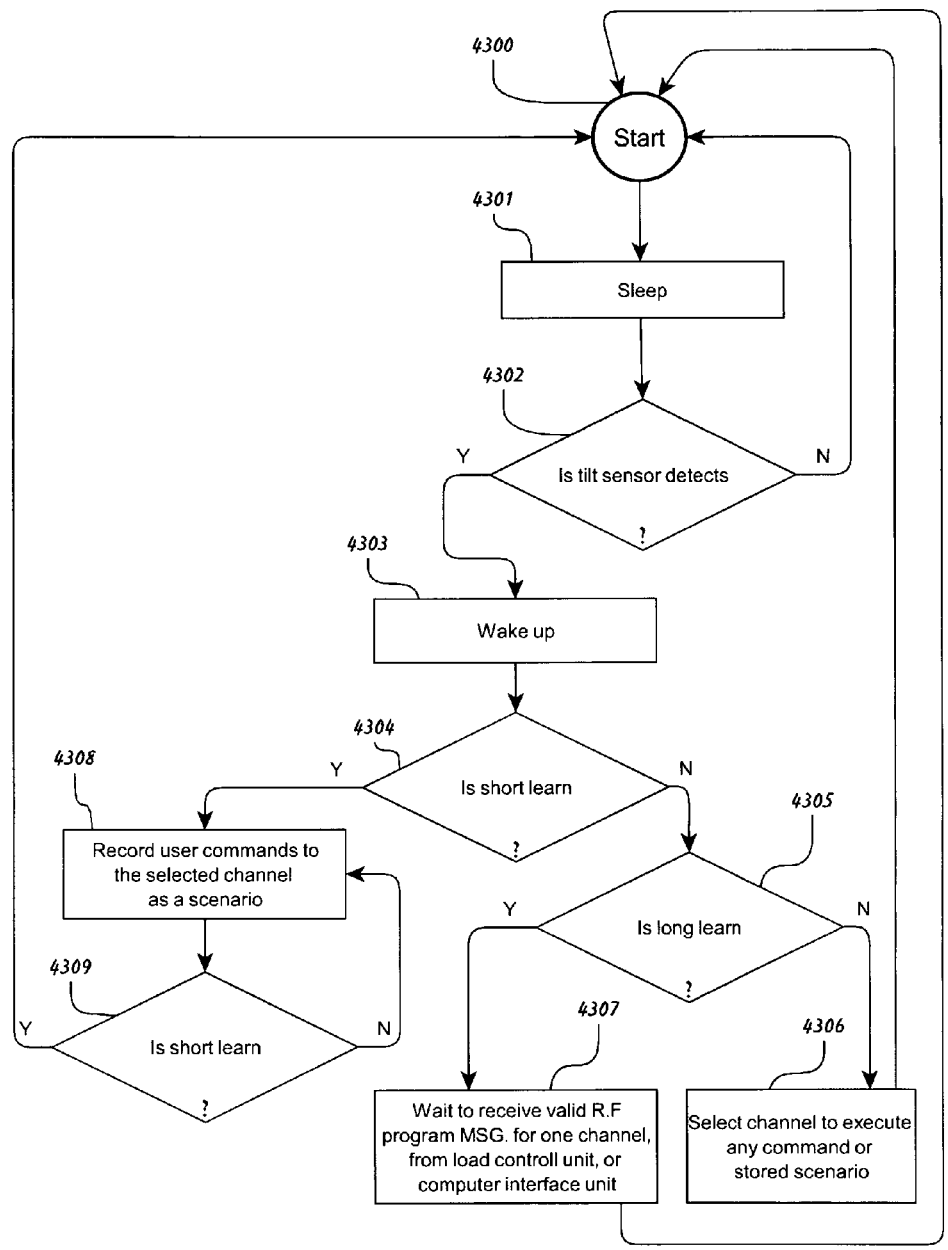
FIG. 22 A sensors unit flowchart

FIG. 22 A sensors unit flowchart

Sensors unit 2, NORMAL and LEARN modes

A LEARN mode configure/program method is done automatically by receiving a configuration message from the required pair smart AC load control unit 1. The way the user do it is very simple, actuating and hold the LEARN actuator 2202 and actuate the "ON" actuator 2203, the sensors unit 2, will change to the LEARN mode, flashing led 2204 for five times wait for three seconds and flash the led again for three times and illuminate the LED to show it is ready to receive.

When the desired pair of the AC load control unit 1 will entered by the user to the continues transmit mode, or by the computer interface 3, and when the configuration/identification message is received correctly, the sensors unit 2 the led will turn OFF and a normal operation mode of the sensors unit 2, resumes.

If during the learning process the sensors unit 2 find that the Smart AC load control unit 1 has a configured secondary ID that acts as a group with other smart ac load control unit 1, it will automatically configure the sensors unit 2, for the secondary ID code in order to be able to serve in parallel all the Smart AC load control unit 1, with the same the secondary ID code (GROUP).

The configuration/identification message also include the current time and day, deep sleep period in seconds, MSG #16 transmit interval in seconds.

In the normal mode the sensors unit 2, is at a "deep sleep" period follow by "normal sleep" waiting for A motion detection or the optional smoke detect that will "wake up" the sensors unit 2.

Each time the sensors unit 2, "wake up" from motion detection, it will transmit message number 11, to the pair's smart AC load control unit or units including the current room light, motion detect, room temperature, optional smoke detected, rechargeable battery condition and immediately change state to a deep "SLEEP" mode for a predefined time preferably one minute, when the time end it will change from deep "sleep" mode to "sleep" mode, enables the sensors to "wakeup" the sensors unit 2, in case of any event.

If MSG #16 interval configured, at every configured interval message #16 with all the information of message number #11 will be transmitted.

When activated the "PIR" actuator 2201, the sensors unit 2, will disable the motion sensor and LEDS display 2204/2205.

If disable the motion sensor (PIR) is selected, message number #16 DAY value will be 9, that is a Holy Day.

In the present invention, a light intensity sensor is used in the sensor unit 2 to get light intensity levels. There is an option that the MCU will read the voltage level of the solar panel 43 and translate it to light intensity, to eliminate the need for dedicated light intensity sensor.

Computer interface unit (CIU)

Figure 23:
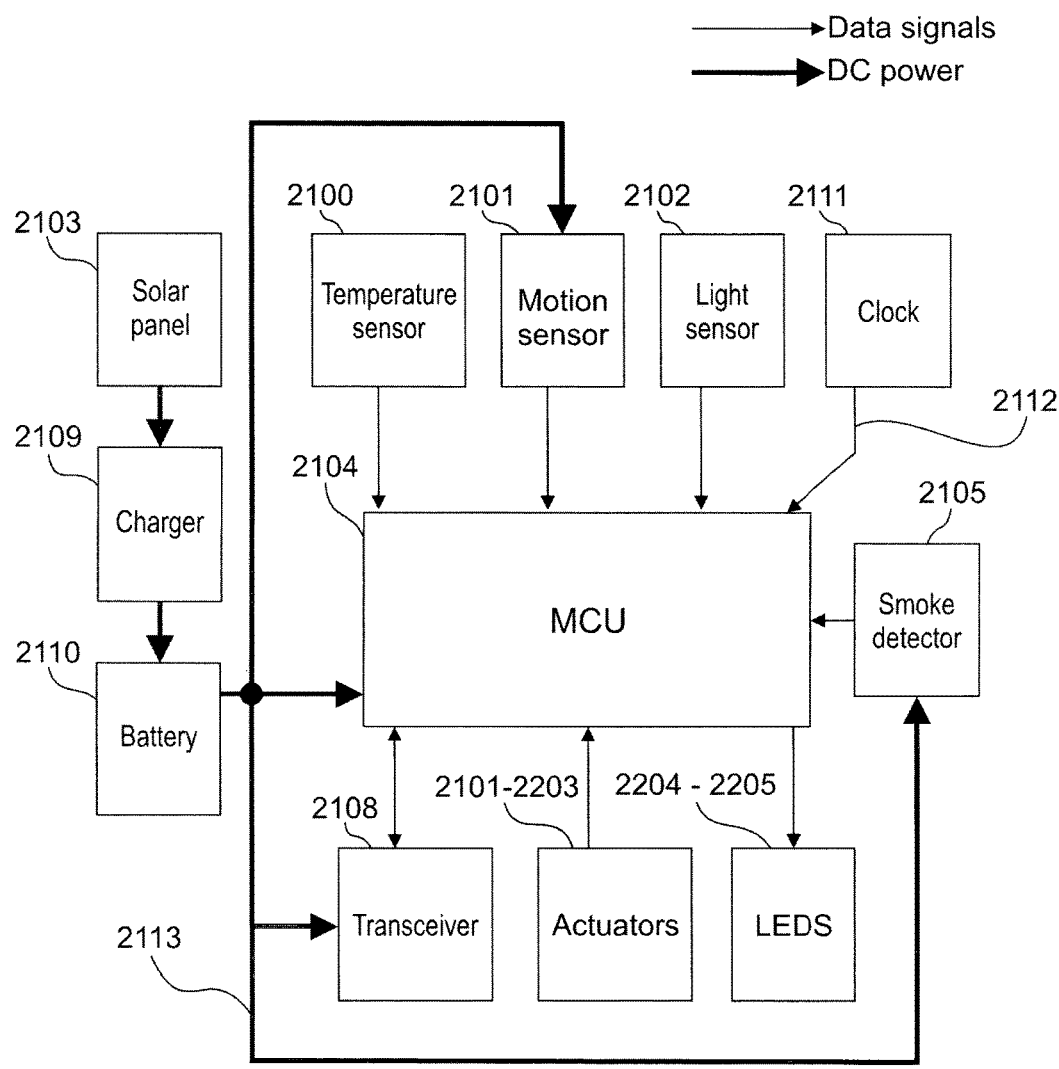
FIG. 23 A computer interface unit (CIU) block diagram

FIG. 23 A computer interface unit block diagram

A computer interface unit 3, a block diagram comprises:

A USB connector 3100, enables the computer interface unit 3, to communicate with any personal computer.

A regulator 3102, regulates the DC power from the USB to the computer interface unit, A wireless transceiver 3104, two way communication with other units in the automated load control system, A LEDs display 3105, will illuminate respectively during receive transmit and USB connection, An MCU 3103, input, output, processing and storing data with the devices Computer interface unit 3 comprises:

A USB connector 3100, enable the computer interface unit 3, to communicate with any personal computer. A regulator 3102, regulate the DC power from the USB to the computer interface unit, A wireless transceiver 3104, two way communication with other units in the automated load control system, A LEDs display 3105, will illuminate respectively during receive transmit and USB connection, An MCU 3103, input, output, processing and storing data with the devices.

The computer interface unit 3 has two-way communications, it can communicate to any unit on the automated load control system wirelessly and to a Personal Computer, via USB port. A personal computer USB software driver emulate serial port on the personal computer enable it to fully communicate with the computer interface unit 3.

Figure 24:
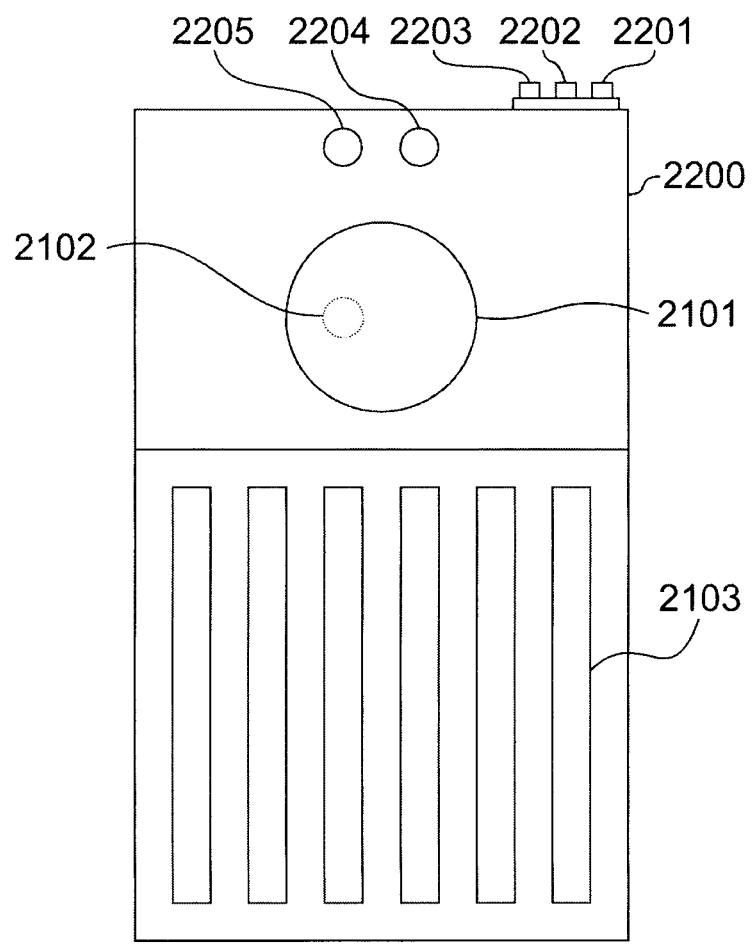
FIG. 24 A computer interface unit faceplate structure

FIG. 24 A computer interface unit faceplate structure

A computer interface unit 3, faceplate structure, preferable layout:

A wireless R.F antenna 3205, external antenna for extended range.

A USB Connector 3204, enables the computer interface unit 3, to communicate with any personal computer, or any other computer.

A LEDs display 3201-3203, will illuminate respectively during receive transmit and USB connection, Block 3302 connects for example via USB, or it may use another serial bus.

Figure 25:
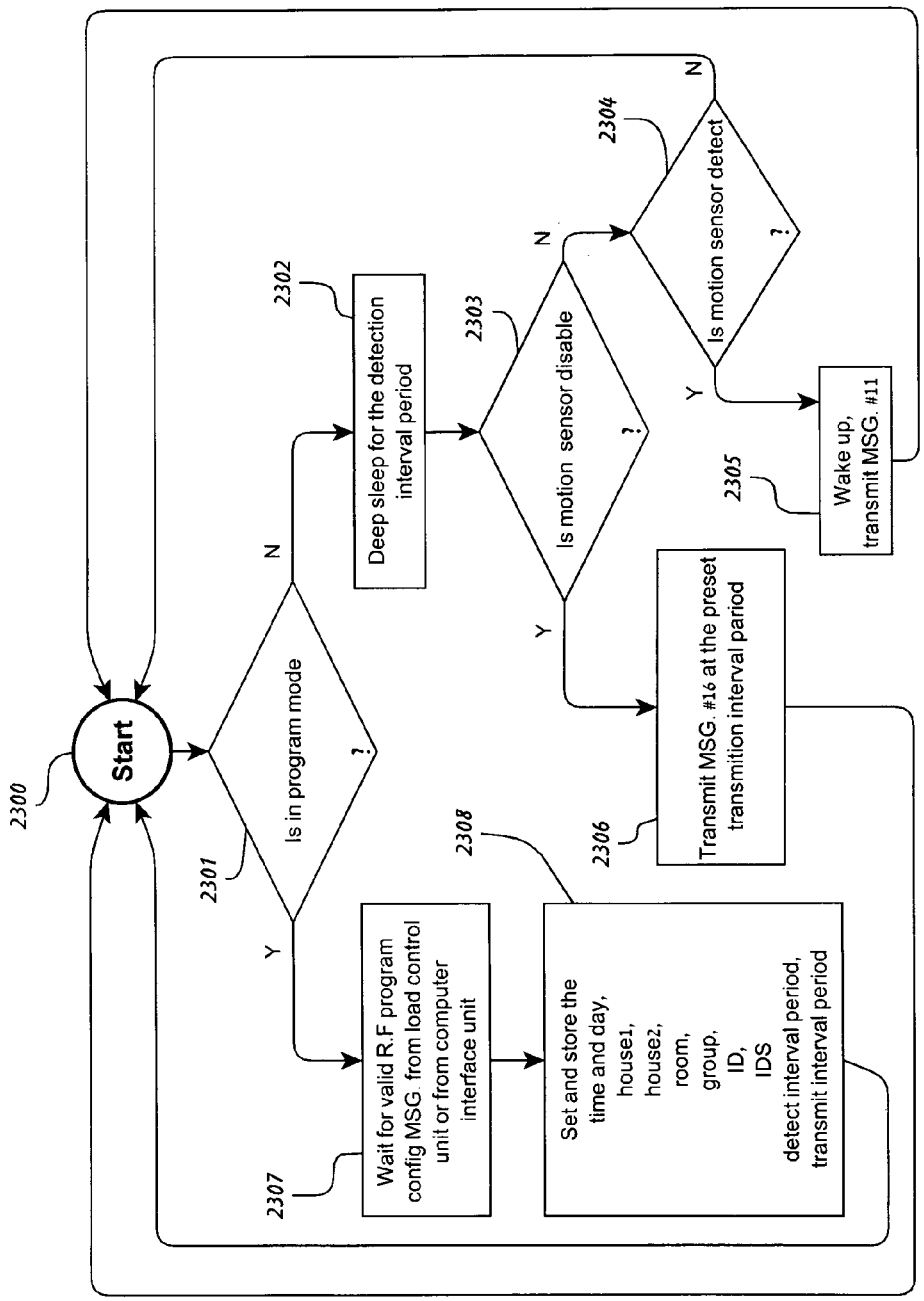
FIG. 25 A computer interface unit block flowchart

FIG. 25 A computer interface unit block flowchart.

The computer interface unit 3, receives commands from the personal computer, and transfers any broadcasted messages from the automated load control system to the personal computer via the USB.

In Block 3306, the message is decoded in unit 3.

Unit 3 may be an autonomous computer, or an MCU-based autonomous device.

Each command begin with the "O" character followed by three digits command number follow by three digits frequency channel, followed by three digits HOUSE 1 code, follow by 3 digits HOUSE 2 code, followed by three digits ROOM code, followed by three digits UNIT SY code, followed by three digits UNIT ID followed by three digits activation command. When connected to a personal computer, the computer interface unit 3 can be set to a Listen mode to display on the personal computer any wireless messages broadcasted by any units in the automated load control system.

An activation operational commands can be send via the pc to the computer interface unit 3 and may execute ON/OFF/LIGHT LEVEL/MODE/UP/DOWN command to any particular or group of smart AC load control units 1, or to any Infrared device that is controlled by the infrared control unit 5.

Any home automation control software or any software developer can read all these messages and activate any command in order to develop any application associate with the data and the operation command enable by the computer interface unit 3.

Infrared control unit (IRU)

Figure 29:
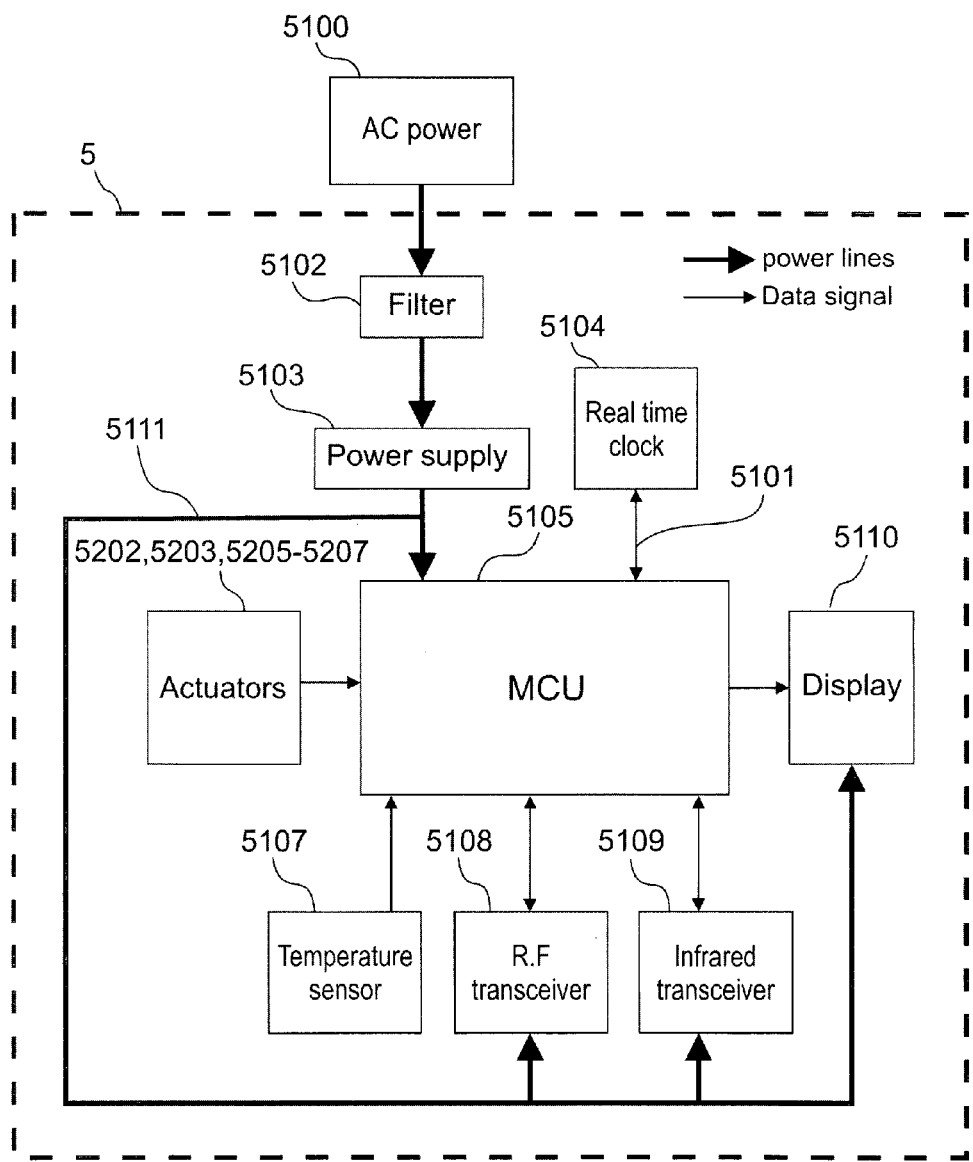
FIG. 29 An infrared control unit (IRU) block diagram

FIG. 29 An infrared control unit block diagram

An infrared control unit 5, blocks diagrams comprises:

A filter 5102, reduces interference from and to the AC power line,

A power supply 5103, distributes DC Power to the devices,

A real time clock with battery backup 5104, keeps the time and date in case of a power failure.

An actuators 5106, will be described in detail later on

A temperature sensor 5107, measures the temperature in the area. The readings are to LGU/P/S to store there the room temperature and display it on IGHU.

The computer bridge CIU 3 reads this information and can use or display on the computer.

A wireless transceiver 5108, two way communication with other units in the automated load control system, An Infrared transceiver modules 5109, Infrared receives and transmits infrared messages, An optional text and graphic display 5110, is detailed elsewhere in this application.

Figure 30:
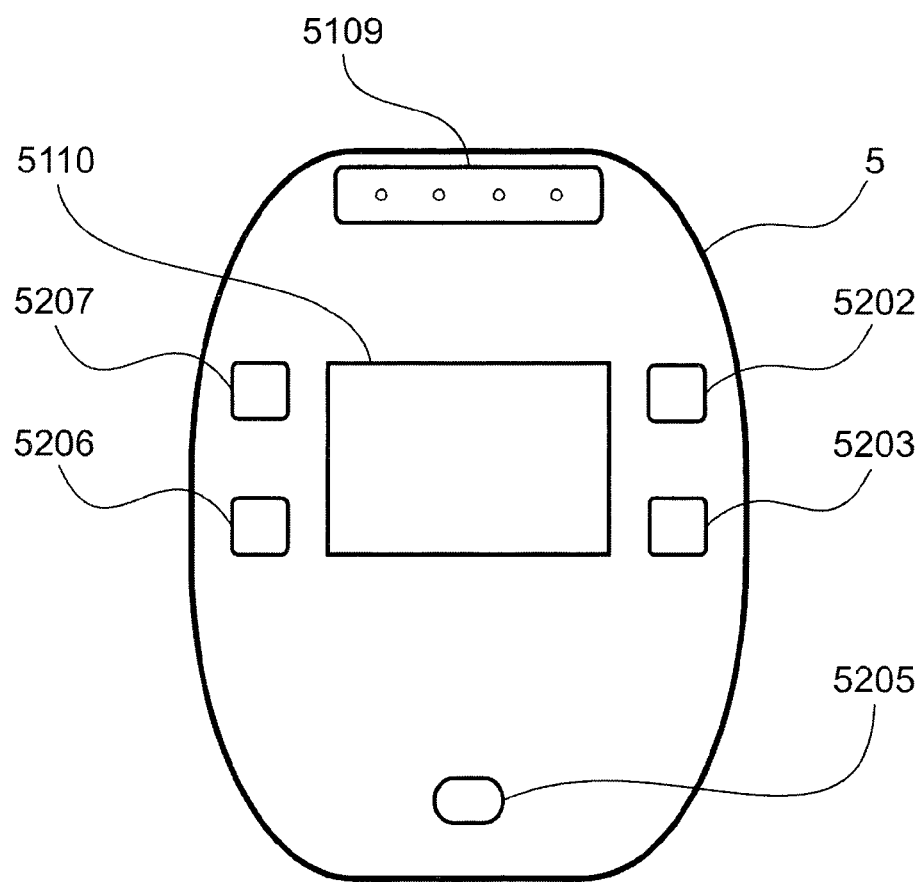
FIG. 30 An infrared control faceplate structure

An MCU 5105, input, output, processing and storing data with the devices,

The Infrared control unit 5 comprises:

An AC power line 5100, an AC line input voltage that can be any standard voltage and at any standard frequency like 220V 50 Hz or 110V 60 Hz, A line filter 5102, reducing interference to and from the AC power line, A power supply 5103, distribute DC Power to the devices, A optional text and graphic display 5110, placed on the faceplate of the infrared control unit 5, display the status of the infrared control unit 5, and act as an interactive display when the user need to store any parameters and configurations to the infrared control unit 5, An MCU 5105, input, output, processing and storing data with the devices, A real-time clock with backup battery 5104 enables the user also to create operation specification according to the real time clock, A temperature sensor 5107, enables the user also to create operation specification according to the temperature sensor, A wireless transceiver 5108, enables the infrared control unit to have two way communications with the automated load control system, An infrared transceiver module 5109, able to learn any specific electrical appliances infrared controlled messages, to store them, and to transmit them to any particular electrical appliances when required, an Actuators 5106, enable the user to operate interactively any requested task on the infrared control unit, Actuator 5202 mark with "+" sign actuator 5203, mark with "−" sign, actuator 5206 mark with SEL, The infrared control unit 5, text and graphics display 5110, shows the status and act as an interactive display, when the user want to store any parameters and configurations to the infrared control unit 5, FIG. 30 An infrared control faceplate structure An infrared control unit 5, faceplate the preferable layout, An infrared TX/Rx sensor 5201, receives and transmits infrared messages Actuators 5202, 5203, 5206, 5207 are detailed elsewhere in this disclosure.

Infrared control unit 5, Normal and Setup mode

At any given time when the user actuate and hold actuator 5203 "−" sign and actuate actuator 5205 "SEL" simultaneously, the infrared control unit will enter the "SETUP" mode. The infrared unit will display on top of the first page the channel number, the name of the electrical appliance and the automated load control system identification string. Each parameter has three digit, HOUSE 1 code, HOUSE 2 code, ROOM code, UNIT SY code, UNIT ID code, SEC UNIT ID code.

If the user does not actuate the "SEL" 5205, then the Actuators 5202 and 5203 "+" and "−" will scroll between the configured channels, When the user actuating the "SEL" 5205 the cursor marker will mark the channel number to be selected with actuators 5202 and 5203 to move between the fields.

When the user actuate the SEL 5205, when reach last digit of the last parameter on this page a new page will be display with on top the current channel number, the cursor marker will point the first digit of "NAME" the user may enter any alpha numeric character by using actuators 5202 "−" and 5205 "+" and 5205 "SEL" to move the cursor to the next position. Any alpha numeric character by using actuators 5202 "−" and 5205 "+" and 5205 "SEL" to move the cursor to next position ACTIVE three digits code in minutes.

When receiving an activation command from the automated load control system or from any sensors unit pair with the infrared control unit, it will execute the command after this time.

OPERATE ONLY1 four digits start time and four digits end time, the operation is limit to this time frame or to OPERATE ONLY2.

OPERATE ONLY2 four digit start time and four digit end time, the operation is limit to this time frame or to OPERATE ONLY1.

NOT OPERATE1 four digits start time and four digits end time, the operation will be disable in this time frame.

NOT OPERATE2 four digits start time and four digits end time, the operation will be disable in this time frame.

The infrared control unit will enter into continues infrared receiving mode, when the infrared transceiver gets an infrared correct message the infrared control unit 5, will exit the receive mode and normal operation will resume.

In the NORMAL operation mode the actuators 5202 "−" and 5203 "+" will scroll and display the channel number, name of the electric device, operation description, and the pre-configured operation parameters.

If the user actuates 5205 "SEL" the channel will change mode from ACTIVE/DEACTIVATE the channel and mark it on the optional text and graphic display 65.

Keypad unit (KU)

Figure 31:
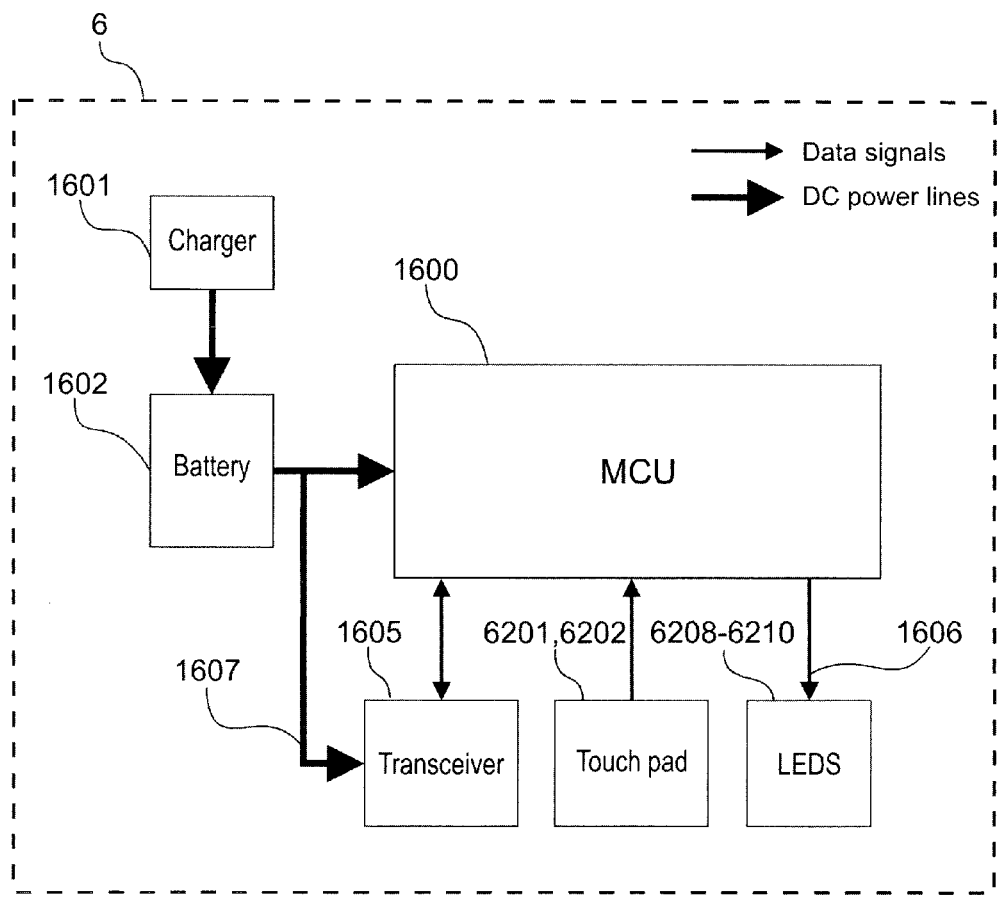
FIG. 31 A keypad unit (KU) block diagram

FIG. 31 A keypad unit block diagram.

KEYPAD unit 6, an electric block diagram, comprises:

An MCU 1600, micro controller unit, input, output, processing and storing data with the devices, A Battery 1602, distributes DC power to the devices A Wireless transceiver 1605, two way communication with other units in the automated load control system, Actuators 1604, preferably touch sensors, enable to execute user commands, A LEDs array display 1603 can display information needed on the LEDs array.

The keypad unit 6 comprises:

A battery 1602, distribute the DC power need to operate the keypad control unit 4. In order to save power when the unit is not in use it change state to "Sleep" mode until sensing any key press/touch on any actuator.

The wireless transceiver 1605, enable the unit to receive programmable identification codes via a message from the Smart AC load control unit 1, or computer interface unit 3, and to transmit messages and commands to any paired smart AC load control unit 1. Actuators 1604, are used to select and execute different channels and commands. The LEDs 1603 will display the current Channels selection or functions by illuminating selected actuator LED, and to be use for special functions to be described elsewhere in this disclosure.

An MCU 1600 activate store and control all the others device connect to it, and enable all the required tasks to be performed by the keypad unit 6.

The source/input to the charger 1601 may be an external normal charger.

Figure 32:
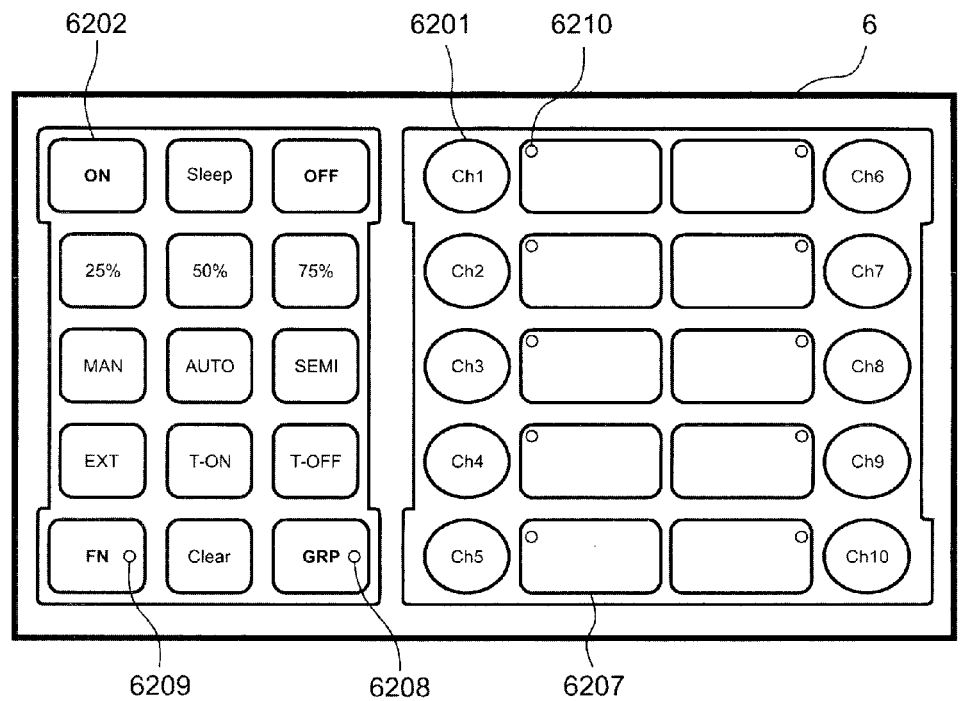
FIG. 32 A Keypad unit faceplate structure

FIG. 32 A Keypad unit faceplate structure

A keypad unit 6 faceplate, preferable layout,

A LEDs 6210, mark from CH1 to CH10 indicate selected channel,

An actuators 6201, will select channel, 6206 with its 6208 LED will select group of channels, 6204 with its 6209 LED will select function enable setup and program commands, 6205 will clear all channels selection, 6209 will execute on the selected channel/s label command.

A user print face plate 6207 allows the user to label each channel description on it.

Figure 33:
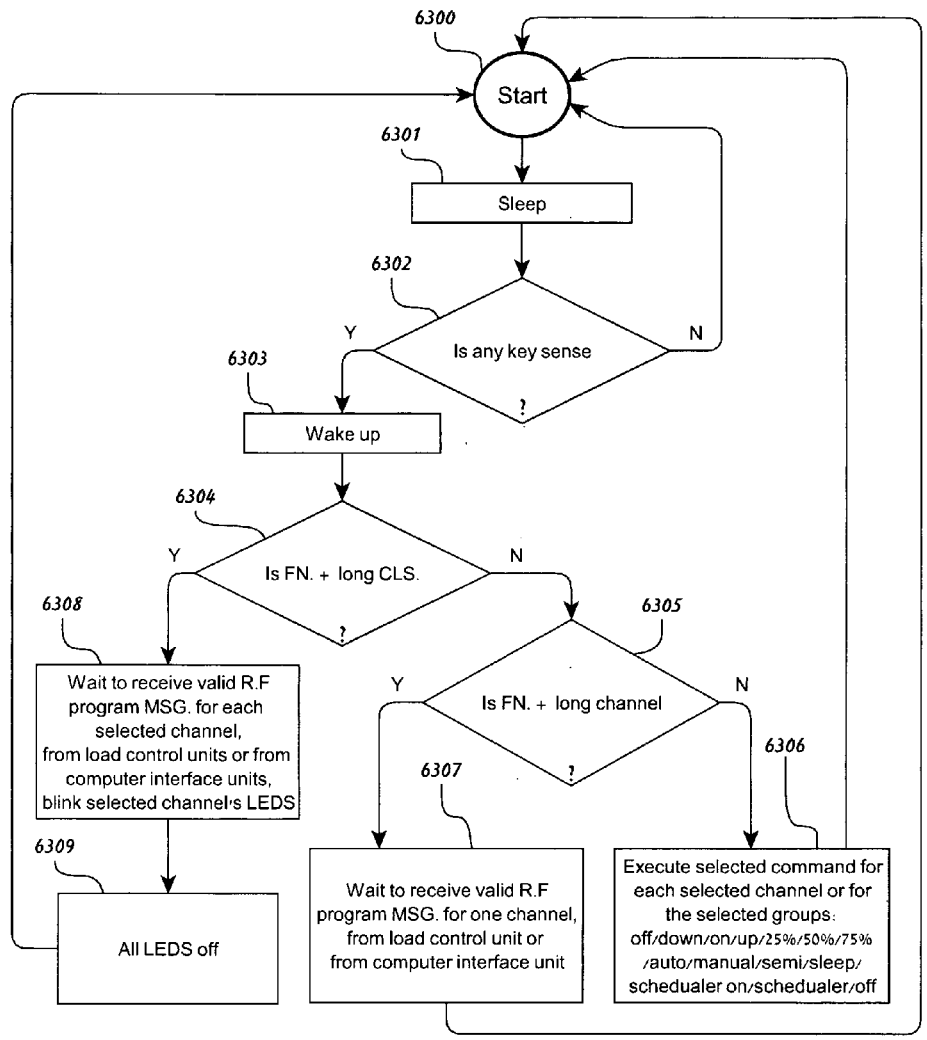
FIG. 33 A keypad unit flowchart

FIG. 33 A keypad unit flowchart

To prevent conflicting commands:

Each IGH RCV has its commands and responds from its paired sensor.

Messages are very short, so there is a very little chance that two messages will be TX at the same time (Milisec resolution).

In case of a collision, messages are checked and re-transmitted.

When a KEYPAD/REMOTE CONTROL/IGHC sends a command to an LGU IDS (group), the units will TX their status either on request only from IGHC or at a different time from each other, thus avoiding sending messages at the same time.

With the CIU (or IGHC) all messages/commands can be read/write via an USB/Serial interface.

Keypad unit 6—operation/programming

When the Keypad unit 6 actuators (preferably touch sensors keyboard) sense finger tip touch it will automatically wake up from the energy saving sleep mode.

Each IGH receives its commands and responds from its paired sensor.

Massages are very short, so there is a very little chance two massages will be TX at the same time.(Mil sec resolution).

When the KEYPAD/REMOTE CONTROL/IGHC send command to LGU IDS(group) the units will TX there status either on request only from IGHC or at different time from each other avoiding sending massages at the same time.

Programming

To get started, the user need to pair selected channel in the keypad unit 6, to particular smart AC load control unit 1.

The method to configure/program the keypad unit 6, channel is done automatically by receiving a configuration/identification message from the smart AC load control unit 1 or the computer interface unit 3, you would like to be paired to. The way the user do it is very simple all he needs to do is to select FN 6204+ long select desire channel 6201, the channel LED will Blink until valid identification message received, when so select channel LED will illuminate.

The way to configure/program more the one channel at the time is to select FN 6204+ long CLS 6205, All Channels LEDS will blink until all selected channels received valid identification message from the computer interface unit 3.

The way to transmit all stored keypad unit 6 channels identification to the computer interface unit 3 is to select FN 6204+ long AUTO 6202. All channels identification codes will be transmitted and LEDs will blink 5 times for example.

Operation

By selecting one or more channel follow by selecting command to be executed for the selected channels.

If no command select 30 seconds from any channel selection the keypad unit 6 will change state to "SLEEP MODE".

Follow command execution: If a new command is selected, it will be executed for the previous selected channels.

If a new channel select follows command execution, all other channels selection will be removed.

If there is no new selection within 5 seconds from command execution, all channels selection will be remove.

CLS—all channels selection will be removed.

FN+ON Illuminates backlight LEDS.

FN+T on/T off—Turn audio key press feedback ON/OFF

Channels selection-short press on the channel illuminate correspondence LED, if the GROUP selected with one or more channels the command will be executed ones for each secondary ID of the selected channels.

Commands-ON, UP, OFF, DOWN, 25%, 50%, 75% (brightness level) AUTO, SEMI, MANUAL, SLEEP, SCHEDULER ON/OFF.

This disclosure describes the present invention by way of example and referring to the attached drawings. Various other embodiments will become apparent to persons skilled in the art upon reading this disclosure together with the drawings; such embodiments also pertain 20 in scope and spirit of the present invention.

INDUSTRIAL APPLICABILITY

The present invention relates to a system for controlling electrical loads in a house, apartment, office or any other living environment, to replace the wall switches for lights and shutters.

The new system pertains in novel electronic hardware and therefore complies with the industrial applicability criteria.

The methods used in controlling the new systems and its parts (units) all refer to controlling hardware equipment and thus have industrial applicability.

The invention claimed is:

1. A smart load control unit (LCU), comprising: an input for receiving an alternating current (AC) voltage supply signal;
    a microcontroller and a power regulator that is controlled by the microcontroller;
    wherein the power regulator is arranged to directly supply to an electrical load an AC electric power;
    wherein the microcontroller is configured to control the power regulator by autonomously applying a process that is responsive to a mode of operation of the LCU and to timing information;
    wherein the LCU is arranged to be remotely controlled; and
    wherein the LCU is shaped and sized to replace a single wall switch.

2. The LCU according to claim 1 comprises a transceiver that is coupled to the microprocessor; and at least one out of actuators, a display and light emitting diodes that are coupled to the microcontroller; wherein the LCU is arranged to be remotely configured.

3. The LCU according to claim 1, further comprising an input for receiving the AC voltage supply signal and a zero cross detector that is configured to detect a zero crossing of the AC voltage supply signal and notify the microcontroller about the zero crossing.

4. The LCU according to claim 1, wherein the LCU is arranged to receive information from an external source and wherein the process is responsive to the information and to user predefined data; wherein the information represents at least one out of temperature, motion detection, ambient light intensity and real time clock information.

5. The LCU system according to claim 1 wherein the LCU is configured to supply to the electrical load the AC electric power after filtering the input AC voltage supply signal without direct voltage (DC) converting the AC voltage supply signal.

6. The LCU according to claim 1, wherein the LCU comprises means for measuring in real time the AC electric power delivered to the electrical load.

7. The LCU according to claim 1, wherein the LCU is arranged to change the mode of operation in response to an input provide by a person; wherein the mode of operation is selected out of a manual mode, a semi-automatic mode, an automatic mode, and a sleep mode; wherein when operating in the semi-automatic mode the microcontroller is prevented from turning on the electrical load by applying the process.

8. The LCU according to claim 1, further comprising:
    a transceiver that is coupled to the microprocessor;
    at least one out of actuators, a display and light emitting diodes that are coupled to the microcontroller; and
    a zero cross detector that is configured to detect a zero crossing of the AC voltage supply signal and notify the microcontroller about the zero crossing.

9. The LCU according to claim 1, wherein the LCU is arranged to change, in response to an input provide by a person, timing constraints that affect the delivery of the AC electrical power to the electrical load.

10. The LCU according to claim 1, wherein the LCU is arranged determine whether to stop a provision of the AC electrical power to the electrical load based upon a comparison between a consumption of the AC electrical power delivered to the electrical load and a predetermined power consumption constraint.

11. The LCU according to claim 1, wherein the LCU comprises an internal temperature sensor that is arranged to measure a temperature of the LCU; wherein the LCU is arranged to reduce the AC electrical power delivered to the electrical load if the temperature of the LCU exceeds a predetermined temperature threshold.

12. The LCU according to claim 1, wherein the LCU is arranged to detect that the electrical load is faulty, to stop providing the AC electrical power to the electrical load and to generate an alert.

13. The LCU according to claim 1, wherein the LCU is arranged to detect that the electrical load is faulty.

14. The LCU according to claim 1, wherein the LCU is arranged to wirelessly transmit information.

15. The LCU according to claim 1, wherein the LCU is arranged to change a frequency of wireless transmittal.

16. The LCU according to claim 1, wherein the LCU comprises a real time clock that is synchronized with timing information wirelessly received by the LCU.

17. The LCU according to claim 1 wherein the electrical load is a shutter and wherein the LCU is arranged to determine a location of a shutter based upon a power consumption of the shutter and a direction of propagation of the shutter.

18. The LCU according to claim 1 wherein the electrical load is arranged to control an amount of ambient light that enters a room and wherein the LCU is arranged to determine a location of the electrical load based upon a power consumption and a direction of propagation of the electrical load.

19. The LCU according to claim 1 wherein the electrical load is a shutter and wherein the LCU is arranged to activate the shutter to keep an optimum requested sun light level in a room that is affected by the position of the shutter.

20. The LCU according to claim 1, wherein the LCU is arranged to receive motion detection indications from a motion detection sensor and is arranged to detect a detection event if receiving a predefined amount of motion detection indications within a predefined time frame.

21. The LCU according to claim 1, arranged to transmit an indication when an electrical power consumption of the electrical load changes.

22. The LCU according to claim 1, wherein the LCU is arranged to perform time based actions while ignoring sensor information.

23. A system comprising a smart load control unit (LCU) that is coupled to a sensor unit that comprises a switch to facilitate an activation in a holiday mode, wherein when the holiday mode is activated the sensor unit is arranged to trigger the LCU to enter a holiday mode and to disable the sensor unit; wherein the LCU comprises an input for receiving an input alternating current (AC) voltage supply signal; a microcontroller and a power regulator that is controlled by the microcontroller; wherein the power regulator is arranged to directly supply to an electrical load an AC electric power; wherein the microcontroller is configured to control the power regulator by autonomously applying a process that is responsive to a mode of operation of the LCU and to timing information; wherein the LCU is arranged to be remotely controlled; and wherein the LCU is shaped and sized to replace a single wall switch.

24. A system comprising at least one smart load control unit (LCU) that is coupled to a gateway that couples the LCUs to the Internet; wherein each LCU comprises an input for receiving an input alternating current (AC) voltage supply signal; a microcontroller and a power regulator that is controlled by the microcontroller; wherein the power regulator is arranged to directly supply to an electrical load an AC electric power; wherein the microcontroller is configured to control the power regulator by autonomously applying a process that is responsive to a mode of operation of the LCU and to timing information; wherein the LCU is arranged to be remotely controlled; and wherein the LCU is shaped and sized to replace a single wall switch.

25. The LCU according to claim 8, further comprising at least one out of:
 a temperature sensor for sensing a temperature of the LCU;
 one or more filters for filtering the AC voltage supply signal;
 a power measurement unit for providing feedback to the microcontroller about the AC electric power that is supplied by the regulator to the electrical load.

26. The system according to claim 24, further comprising:
 a temperature sensor for sensing a temperature of the LCU;
 one or more filters for filtering the AC voltage supply signal; and
 a power measurement unit for providing feedback to the microcontroller about the AC electric power that is supplied by the regulator to the electrical load.

27. The LCU according to claim 1 that comprises a temperature sensor for sensing a temperature of the LCU; wherein the process is further responsive to the temperature of the LCU.

28. The LCU according to claim 1 wherein the mode of operation of the LCU is selected out of a first mode of operation and a second first mode of operation; wherein when operating in the first mode of operation the LCU is configured to turn on the electrical load only under a control of a user; and when operating in the second mode of operation the microcontroller is configured to turn on the electrical load even when applying the process.

29. The LCU according to claim 28 wherein when the mode of operation of the LCU is the first mode of operation the microcontroller is prevented from turning on the electrical load by applying the process.

30. The system according to claim 23 wherein the mode of operation of the LCU is selected out of a first mode of operation and a second first mode of operation; wherein when operating in the first mode of operation the microcontroller is configured to turn on the electrical load only under a control of a user; and when operating in the second mode of operation the microcontroller is configured to turn on the electrical load even when applying the process.

31. The system according to claim 30 wherein when the mode of operation of the LCU is the first mode of operation the microcontroller is prevented from turning on the electrical load by applying the process.

32. The system according to claim 24 wherein the mode of operation of the LCU is selected out of a first mode of operation and a second first mode of operation; wherein when operating in the first mode of operation the microcontroller is configured to turn on the electrical load only under a control of a user; and when operating in the second mode of operation the microcontroller is configured to turn on the electrical load even when applying the process.

33. The system according to claim 32 wherein when the mode of operation of the LCU is the first mode of operation the microcontroller is prevented from turning on the electrical load by applying the process.

* * * * *